United States Patent
Buist

(10) Patent No.: US 6,408,282 B1
(45) Date of Patent: Jun. 18, 2002

(54) SYSTEM AND METHOD FOR CONDUCTING SECURITIES TRANSACTIONS OVER A COMPUTER NETWORK

(75) Inventor: Walter D. Buist, Hasbrouck Heights, NJ (US)

(73) Assignee: Wit Capital Corp., New York, NY (US)

(*) Notice: Subject to any disclaimer, the term of this patent is extended or adjusted under 35 U.S.C. 154(b) by 0 days.

(21) Appl. No.: 09/292,553

(22) Filed: Apr. 15, 1999

Related U.S. Application Data

(60) Provisional application No. 60/122,208, filed on Mar. 1, 1999.

(51) Int. Cl.$^7$ ............................................... G06F 17/60
(52) U.S. Cl. ........................................... 705/37; 705/36
(58) Field of Search ....................................... 705/36, 37

(56) References Cited

U.S. PATENT DOCUMENTS 3,573,747 A * 4/1971 Adams ......................... 705/37

(List continued on next page.)

FOREIGN PATENT DOCUMENTS

| EP | 0407026 A2 | * | 9/1991 |
| WO | WO9506918 | * | 3/1995 |
| WO | WO9634357 | * | 10/1996 |
| WO | WO9852133 | * | 11/1998 |

OTHER PUBLICATIONS

"Morgan Stanley Deploys Black Box Trading System"; May 1991; Trading Systems Technology; Dialog file 636, Accession No. 01493468.*

(List continued on next page.)

Primary Examiner—Tariq R. Hafiz
Assistant Examiner—Romain Jeanty
(74) Attorney, Agent, or Firm—Pennie & Edmonds LLP

(57) ABSTRACT

The system and method of the preferred embodiment supports trading of securities over the Internet both on national exchanges and outside the national exchanges. The preferred embodiment supports an improved human interface and a continuous display of real-time stock quotes on the user's computer screen. The ergonomic graphical user interface (GUI) of the preferred embodiment includes several functional benefits in comparison with existing on-line consumer trading systems. In the preferred embodiment, the users are subscribers to a securities trading service offered over the Internet. Preferably, each subscriber to this service is simultaneously connected from his own computer to a first system which provides user-to-user trading capabilities and to a second system which is a broker/dealer system of his/her choice. The system providing the user-to-user trading services preferably includes a root server and a hierarchical network of replicated servers supporting replicated databases. The user-to-user system provides real-time continuously updated stock information and facilitates user-to-user trades that have been approved by the broker/dealer systems with which it interacts. Users of the preferred system can trade securities with other users of the system. As part of this user-to-user trading, a user can accept a buy or sell offer at the terms offered or he can initiate a counteroffer and negotiate a trade.

7 Claims, 69 Drawing Sheets

U.S. PATENT DOCUMENTS

| | | | |
|---|---|---|---|
| 5,809,483 A | | 9/1998 | Broka et al. .................. 705/37 |
| 5,873,071 A | | 2/1999 | Ferstenberg et al. .......... 705/37 |
| 5,924,082 A | * | 7/1999 | Silverman et al. ............ 705/37 |
| 6,014,643 A | * | 7/1999 | Minton ........................ 705/37 |
| 5,950,177 A | | 9/1999 | Lupien et al. ................ 705/37 |
| 6,012,046 A | * | 1/2000 | Lupien ........................ 705/37 |
| 6,243,691 B1 | * | 6/2001 | Fisher et al. .................. 705/37 |

OTHER PUBLICATIONS

Louis; "New breed of ECNs competes for market share"; Nov. 1998; Wall Street and Technology Online Trading Supplement PP: 16–17; Dialog file 15, Accession No. 01726082.*

Resnick; "Serial portfolio. (Online securities trading) (including listing of products and services"; Dec. 1992; Computer, V14, n11, p90(4); dialog filw 148, Accession No. 06184981.*

Lehman "Trading and liquidity on the Tokyo Stock Exchange: a bird's eye view"; Jul. 1994, Journal of Finance, v49, n3, p951(34); Dialog file 148, Accession No. 0752021.*

* cited by examiner

| VISUAL QUOTE AND ORDER BOOK DISPLAY | | | AFTER HOURS MKT. IS OPEN | | | $ | HELP PREF. | |
|---|---|---|---|---|---|---|---|---|
| IBM INTERNATIONAL BUSINESS MACHINES | | | | | | | | |
| | BUY SIDE | | PRICE IN 1/16 | SELL SIDE | | 148 | DAY | NITE |
| YOUR ORDERS | AON QTY. | LIMIT QTY. | DECIMALS | LIMIT QTY. | AON QTY. | YOUR ORDERS | | |
| | | | 145 | 100 | 500 | | 147 | |
| | | | 144.9375 | 500 | 1000 | 300 | | |
| | | | 144.876 | 400 | 500 | | | |
| 500 | | | 144.8125 | 400 | 500 | 200 | 146 | |
| | | | 144.75 | 150 | 1000 | | | |
| | | | 144.6875 | 1000 | 1000 | 100 | | |
| | | | 144.625 | 4500 | 2500 | | | |
| | | | 144.562 | 5000 | 3000 | | 145 | |
| | | | 144.5 | 2000 | 10000 | | | |
| | | | 144.4375 | | | | | |
| | | | 144.375 | | | | 144 | |
| | | | 144.3125 | | | | | |
| | | 9500 | 144.25 | | | | | |
| | 3000 | 3000 | 144.1875 | | | | 143 | |
| | 2500 | 1000 | 144.125 | | | | | |
| | 1000 | 100 | 144.0625 | | | | | |
| | 1000 | 200 | 144 | | | | YOUR POS. $142.50 | |
| VOL | HI | LOW | LAST NITE | CHNG.NITE | LAST DAY | CHNG.DAY | P&L$4,508 | |
| 980.000 | $144.50 | $143.00 | 144.5 | 2.25% | $143.00 | 1.50% | OVERALL P&L 19% | |
| ORDER BK. | CHART | MOST ACTIVE | SHOW NEWS | NEWS OUT | DAY MKT | NITE MKT | PRICE MAP SCALE | |
| TO SHOW NEW STOCK ENTER SYMBOL>> | | | SYMBOL | MOVEMENT UP | COMPRESS SPREAD | | | |

| TRADE TICKET | 510 | | | | PREF. | HELP | X |
|---|---|---|---|---|---|---|---|
| ACTION | | QUANTITY | SYMBOL | | PRICE TYPE | | |
| BUY ▽ | | ▽ | ▽ | | LIMIT | ▽ | |
| LIMIT PRICE | | STOP PRICE | ACCT. 93901031 | ☐ NEGOTIATIONS ALLOWED | | | |
| 52 ▽ | | ▽ | | ☐ ANONYMOUS | | | |
| DURATION | | CONDITION | ACCOUNT | | ROUTE TO | | |
| DAY ▽ | | NONE ▽ | CASH ▽ | | NONE | ▽ | |

REAL-TIME QUOTE SHOWN BELOW
OPEN      HI         LAST       CHANGE
CLOSE     LOW        VOL
BID:0.0   BID SIZE: 0.0   ASK: 0.0   ASK SIZE: 0.0

YOUR CURRENT BUYING POWER IS:                          $
IF YOU EXECUTE THIS TRADE YOUR BALANCE WILL BE         $
THE TOTAL COST INCLUDING COMMISSION WILL BE            $

| VERIFICATION | SHOW DSM | CANCEL |
|---|---|---|
| | CLEAR | HIDE DETAILS |

| WIT CAPITAL ON LINE | WELCOME TO THE NEW WIT CAPITAL DIGITAL STOCK MARKET | | | |
|---|---|---|---|---|
| | IBM +.9375, 144.5 | | | |
| WIT WATCH STKS. | | | | |
| YOUR STKS. | | | | |

| TRADE STOCKS | POS./P&L | ACCOUNT HISTORY | FINANCIAL SUMMARY |
|---|---|---|---|
| QUICK QUOTE | OPEN ORDERS | NEGOTIATIONS | MESSAGES |

FIG.5A

| BACK | FORWARD | HOME | BOOKMARKS | FIND | STOP | OTHER FUNCTIONS | HELP |

SEARCH

| DSM NEWS | PRE-OPENING | OPENING BELL | HOT SHOTS | NEWS OUT | CLOSING BELL |

HOT SHOTS    NEWS ON THE CURRENT 24 MOST ACTIVE STOCKS    <u>540</u>
- IBM REPORTS EARNINGS UP 22% OVER SAME PERIOD LAST YEAR.
- DELL IN AFTER HOURS NEWS, REPORTS EARNINGS UP 42% OVER LAST YEAR SAME QUARTER
- CMPT IN AFTER HOURS NEWS, REPORTS LAUNCH OF NEW DIRECT SALES PLAN FOR INTERNET

| SHOW HELP | SHOW EMAIL | SHOW NEWS | SHOW CHART | SORT NEWS | SHOW MY STKS. |

OPEN ORDER LIST    PREF. HELP X

| SYMBOL | ACCOUNT | ACTION | ORDER TYPE | LIMIT $ | QUANTITY | CURRENT |
|---|---|---|---|---|---|---|
| IBM | CASH | SELL | LIMIT | 121.00 | 200 | 121.1875 |
| IBM | CASH | SELL | LIMIT | 121.00 | 400 | 121.1875 |

<u>545</u>

BUYING POWER $0.00    BUY TOTAL $0.00    SELL TOTAL $4,144,440.32

| CANCEL | CANCEL ALL | | SORT | DETAILS> | REPORTS |

CURRENT POSITIONS  <u>550</u>    PREF. HELP X

| SYMBOL | ACCOUNT | PRICE | QUANTITY | COST | CHANGE | PROFIT/LOSS |
|---|---|---|---|---|---|---|
| AOL | CASH | 119.375 | 100 | | | 8,002 |
| AOL | CASH | 78.50 | 100 | | | 16,484 |
| CCI | CASH | 89.25 | 100 | | | 1,350 |
| CSCO | CASH | 60.00 | 100 | | | 855.00 |
| DELL | CASH | 75.375 | 100 | | | |

BUYING POWER $    TOTAL POSITIONS    $

| SELL | | SORT | DETAILS> | REPORTS |

FINANCIAL SUMMARY  <u>560</u>    PREF. HELP X

| | BALANCE | PROFIT/LOSS | CHANGE/DAY | CHANGE/YTD |
|---|---|---|---|---|
| EQUITIES | 32,868.00 | $65,031.25 | -2% | -1% |
| MUTUAL FUNDS | $56,987.98 | $9,031.25 | -1% | -2% |
| GRAND SUM | $1,525,332.00 | $9,031.25 | -1% | -2% |
| CASH ACCT. | $55,987.87 | | | |
| MARGIN | $34,657.98 | | | |
| OPEN ORDERS | $15,789.76 | | | |
| NEGOTIATIONS | $25,987.87 | | | |
| BUYING POWER | $40,987.87 | | | |

DETAILS>  REPORTS
    PREFERENCES  HELP
    11:07:55

NASDAQ
NYSE

| STOCK SUMMARY | CUSTOM VIEWS | PEEL OFF DISPLAY | EXPAND |
| WIT NEWS | ACCOUNTS | ALERTS | SHRINK |

OPEN ORDER LIST — 740

| SYMBOL | ACCOUNT | ACTION | ORDER TYPE | LIMIT $ | QUANTITY | CURRENT |
|--------|---------|--------|------------|---------|----------|---------|
| IBM | CASH | SELL/N | LIMIT | 121.00 | 200 | 121.1875 |
| IBM | CASH | SELL/N | LIMIT | 121.00 | 400 | 121.1875 |

BUYING POWER $0.00    BUY TOTAL $0.00    SELL TOTAL $4,144,440.32

| CANCEL | CANCEL ALL | | SORT | DETAILS > | CHANGE |

CURRENT POSITIONS — 450

| SYMBOL | ACCOUNT | PRICE | QUANTITY | COST | CHANGE | PROFIT/LOSS |
|--------|---------|-------|----------|------|--------|-------------|
| AOL | CASH | 119.375 | 100 | 96.25 | .23 | 8062.83 |
| AOL | CASH | 78.50 | 100 | 55.00 | .24 | 7006.37 |
| CCI | CASH | 89.25 | 100 | 83.5 | .06 | 9355.74 |
| CSCO | CASH | 60.00 | 100 | 59 | .01 | 9833.33 |
| DELL | CASH | 75.375 | 100 | 65.25 | .10 | 8656.72 |

BUYING POWER $    TOTAL POSITIONS    $

| SELL | | SORT | DETAILS > | REPORTS |

| FINANCIAL SUMMARY | BALANCE | PROFIT/LOSS | CHANGE/DAY | CHANGE/YTD |
|---|---|---|---|---|
| EQUITIES | 32,868.00 | $65,031.25 | -2% | -1% |
| MUTUAL FUNDS | $56,987.98 | $9,031.25 | -1% | -2% |
| GRAND SUM | $1,525,332.00 | $9,031.25 | | -2% |
| CASH ACCT. | $55,987.87 | | | |
| MARGIN | $34,657.98 | | | |
| OPEN ORDERS | $15,789.76 | | | |
| NEGOTIATIONS | $25,987.87 | | | |
| BUYING POWER | $40,987.87 | | | |

PREF. | HELP | X — 940
910, 920, 930
DETAILS > | REPORTS
560, 945, 950, 955, 960, 965, 970, 975, 980

FIG.10

BACK | FORWARD | HOME | BOOKMARKS | FIND | STOP | OTHER FUNCTIONS | HELP
SEARCH | NEWS | PRE-OPENING | OPENING BELL | HOT SHOTS | NEWS OUT | CLOSING BELL

HOT SHOTS    NEWS ON THE CURRENT 24 MOST ACTIVE STOCKS
• IBM REPORTS EARNINGS UP 22% OVER SAME PERIOD LAST YEAR.
• DELL IN AFTER HOURS NEWS, REPORTS EARNINGS UP 42% OVER LAST YEAR SAME QUARTER.
• CMPT IN AFTER HOURS NEWS, REPORTS LAUNCH OF NEW DIRECT SALES PLAN FOR INTERNET.

SHOW HELP | SHOW E-MAIL | SHOW NEWS | SHOW CHART | SORT NEWS | SHOW MY STKS.

| VISUAL QUOTE AND ORDER BOOK DISPLAY | | | AFTER HOURS MKT. IS OPEN | | | $ | HELP |
|---|---|---|---|---|---|---|---|
| IBM INTERNATIONAL BUSINESS MACHINES | | | | | | | PREF. |
| BUY SIDE | | | PRICE IN 1/16 | SELL SIDE | | 148 | DAY \| NITE |
| YOUR ORDERS | AON QTY. | LIMIT QTY. | DECIMALS | LIMIT QTY. | AON QTY. | YOUR ORDERS | |
| | | | 145 | 100 | 500 | | |
| | | | 144.9375 | 500 | 1000 | 300 | 147 |
| | | | 144.876 | 400 | 500 | | |
| | | | 144.8125 | 400 | 500 | 200 | |
| | | | 144.75 | 150 | 1000 | | 146 |
| | | | 144.6875 | 1000 | 1000 | 100 | |
| | | | 144.625 | 4500 | 2500 | | |
| | | | 144.562 | 5000 | 3000 | | 145 |
| | | | 144.5 | 2000 | 10000 | | |
| | | | 144.4375 | | | | |
| | | | 144.375 | | | | 144 |
| | | | 144.3125 | | | | |
| | | 9500 | 144.25 | | | | |
| | 3000 | 3000 | 144.1875 | | | | 143 |
| | 2500 | 1000 | 144.125 | | | | |
| | 1000 | 100 | 144.0625 | | | | |
| | 1000 | 200 | 144 | | | | YOUR POS $142.50 |
| VOL | HI | LOW | LAST NITE | CHNG.NITE | LAST DAY | CHNG.DAY | P&L $4,508 |
| 980.000 | $144.50 | $143.00 | 144.5 | 2.25% | $143.00 | 1.50% | OVERALL P&L 19% |
| ORDER BK. | CHART | MOST ACTIVE | SHOW NEWS | NEWS OUT | DAY MKT | NITE MKT | PRICE MAP SCALE |
| TO SHOW NEW STOCK ENTER SYMBOL>> | | | SYMBOL | MOVEMENT UP | COMPRESS SPREAD | | |

TRADE TICKET                                                  PREF.  ☒

| ACTION | QUANTITY | SYMBOL | PRICE TYPE |
|---|---|---|---|
| BUY ▽ | ▽ | ▽ | LIMIT ▽ |
| LIMIT PRICE | STOP PRICE | ACCT. 93901031 | ☐ NEGOTIATIONS ALLOWED |
| 52 ▽ | ▽ | | ☐ ANONYMOUS |
| DURATION | CONDITION | ACCOUNT | ROUTE TO |
| DAY ▽ | NONE ▽ | CASH ▽ | NITE ▽ |

REAL-TIME QUOTE SHOWN BELOW

| OPEN | HI | LAST | CHANGE |
|---|---|---|---|
| CLOSE | LOW | VOL | |
| BID: 0.0 | BID SIZE: 0.0 | ASK: 0.0 | ASK SIZE: 0.0 |

YOUR CURRENT BUYING POWER IS:  $
IF YOU EXECUTE THIS TRADE YOUR BALANCE WILL BE  $
THE TOTAL COST INCLUDING COMMISSION WILL BE  $

| VERIFICATION | SHOW DSM | CANCEL | |
|---|---|---|---|
| | CLEAR | HIDE DETAILS | |

| WIT CAPITAL | | | |
|---|---|---|---|
| ON LINE | WELCOME TO THE NEW WIT CAPITAL DIGITAL STOCK MARKET | | |
| | AOL+.375 | BA+.50 | CCI+1.25 |
| WIT | GTWY+.25 | | AAIR+2.96675 |
| WATCH STKS. | ADLI+3.625 | AGMXX+.16015 | AGPH+54.00 |
| YOUR STKS. | ALIF+1.626 | AMAT+43.0375 | AMGN+101.00 |
| TRADE STOCKS | POS./P&L | ACCOUNT HISTORY | FUNDS AVAILABLE |
| QUICK QUOTE | OPEN ORDERS | NEGOTIATIONS | MESSAGES |

| BACK | FORWARD | HOME | BOOKMARKS | FIND | STOP | OTHER FUNCTIONS | | HELP |

SEARCH [                                        ]

| DSM NEWS | PRE-OPENEING | OPENING BELL | HOT SHOTS | NEWS OUT | CLOSING BELL |

HOT SHOTS   NEWS ON THE CURRENT 24 MOST ACTIVE STOCKS
- IBM REPORTS EARNINGS UP 22% OVER SAME PERIOD LAST YEAR.
- DELL IN AFTER HOURS NEWS, REPORTS EARNINGS UP 42% OVER LAST YEAR SAME QUARTER
- CMPT IN AFTER HOURS NEWS, REPORTS LAUNCH OF NEW DIRECT SALES PLAN FOR INTERNET

| SHOW HELP | SHOW EMAIL | SHOW NEWS | SHOW CHART | SORT NEWS | SHOW MY STKS. |

OPEN ORDER LIST                                                    PREF. HELP X

| SYMBOL | ACCOUNT | ACTION | ORDER TYPE | LIMIT $ | QUANTITY | CURRENT |
|--------|---------|--------|------------|---------|----------|---------|
| IBM    | CASH    | SELL   | LIMIT      | 121.00  | 200      | 121.1875 |
| IBM    | CASH    | SELL   | LIMIT      | 121.00  | 400      | 121.1875 |

BUYING POWER $0.00        BUY TOTAL $0.00    SELL TOTAL $4,144,440.32

| CANCEL | CANCEL ALL | | SORT | DETAILS> | CHANGE |

CURRENT POSITIONS                                                 PREF. HELP X

| SYMBOL | ACCOUNT | PRICE | QUANTITY | COST | CHANGE | PROFIT/LOSS |
|--------|---------|-------|----------|------|--------|-------------|
| AOL    | CASH    | 119.375 | 100    |      |        | 8,002 △ |
| AOL    | CASH    | 78.50 | 100      |      |        | 16,484 |
| CCI    | CASH    | 89.25 | 100      |      |        | 1,350 |
| CSCO   | CASH    | 60.00 | 100      |      |        | 855.00 |
| DELL   | CASH    | 75.375 | 100     |      |        | ▽ |

BUYING POWER $                TOTAL POSITIONS              $

| SELL | | SORT | DETAILS> | REPORTS |

FINANCIAL SUMMARY                                                 PREF. HELP X

|              | BALANCE       | PROFIT/LOSS  | CHANGE/DAY | CHANGE/YTD |
|--------------|---------------|--------------|------------|------------|
| EQUITIES     | 32,868.00     | $65,031.25   | -2%        | -1%        |
| MUTUAL FUNDS | $56,987.98    | $9,031.25    | -1%        | -2%        |
| GRAND SUM    | $1,525,332.00 | $9,031.25    | -1%        | -2%        |
| CASH ACCT.   | $55,987.87    |              |            |            |
| MARGIN       | $34,657.98    |              |            |            |
| OPEN ORDERS  | $15,789.76    |              |            |            |
| NEGOTIATIONS | $25,987.87    |              |            |            |
| BUYING POWER | $40,987.87    |              |            |            |

|        |       |       | DETAILS> | REPORTS |
|        |       | PREFERENCES | HELP |
|        |       |       |       | 00:00:00 |
| CACS+1.00 |    |       |       |       |
| ABGXX+.21093 | ABGXX+.16406 | ACRXX+.30858 | NASDAQ |
| AHWY+13.175 | AKLM+11.50 | AKZOY+43.375 | NYSE |
| AMKR+9.625 | AMNXX+.30076 | AMZN+324.6125 | |
| STOCK SUMMARY | CUSTOM VIEWS | PEEL OFF DISPLAY | EXPAND |
| WIT NEWS | ACCOUNTS | ALERTS | SHRINK |

| NEGOTIATION DEFAULT SETUP SCREEN |
|---|
| ENTER THE DEFAULT VALUES FOR LIMITING NEGOTIATIONS FROM OTHER TRADERS |
| PLEASE NOTE THAT THE VALUES YOU ENTER IN THE DEFAULT SETTINGS WILL HAVE A SIGNIFICANT EFFECT ON THE INCOMING ORDERS YOU RECEIVE FROM OTHER TRADERS. THE VALUES YOU ENTER ARE DEFAULTS WHICH CAN BE OVERRIDDEN AT ANY TIME BY SIMPLY TYPING OVER THE DEFAULTS IN THE NEGOTIATIONS SCREEN. |

1 WHAT PRICE ABOVE AND BELOW YOUR LIMIT PRICE ARE YOU WILLING TO NEGOTIATE?
ENTER PRICE INCREMENT HERE IN 1/16   `0.25`   — 4105

2 WHAT # OF SHARES BELOW AND ABOVE YOUR ORDER SIZE ARE YOU WILLING TO NEGOTIATE?
ENTER NUMBER OF SHARES HERE   `100`   — 4110

3 WHAT WILL BE YOUR DEFAULT PREFERRED NEGOTIATION TIME?
ENTER DESIRED INCREMENT HERE   `10 MIN.`   — 4115

4 WHAT WILL BE THE LOWER TIME LIMIT YOU WILL ACCEPT?
ENTER MINUTE INCREMENT HERE   `2 MIN.`   — 4120

| SETTING THE DEFAULTS FOR EACH TIME YOU CLICK THE ADJUSTMENT BUTTONS |
|---|

5 WHAT WILL THE INCREMENT BE FOR EACH CLICK OF SIZE CHANGE BUTTONS?
ENTER SIZE INCREMENTS HERE   `100 SHARES`   — 4125

6 WHAT WILL THE INCREMENT BE FOR EACH CLICK OF TIME CHANGE BUTTONS?
ENTER SIZE INCREMENT HERE   `1 MIN.`   — 4130

7 WHAT WILL THE INCREMENT BE FOR EACH CLICK OF PRICE CHANGE BUTTONS?
ENTER SIZE INCREMENT HERE   `0.0625`   — 4135

8 ON LIMIT ORDERS THAT YOU ENTER, DO YOU WANT TO HAVE THE SYSTEM ALLOW NEGOTIATIONS AS YOUR DEFAULT SETTINGS/  oYES OR oNO

SEE ON-LINE HELP (FOR DETAILS CLICK HERE)

TRADERS AT A PRICE LEVEL — 4200

| IBM: SELLERS | BEST OFFER 52.438 | | SORT 52.313 | PREF. 52.25 | HELP |
|---|---|---|---|---|---|
| NAME | PRICE | QTY | TIME | ACTIVITY | TOTAL $ | SET DEFAULTS |
| FRED D | 52.5 (.187) | 200 (20%) | 6 MIN. (1) | 0 | $10,500.00 | P/L-BBO ☐ |
| DAVE K | 52.5 (.25) | 300 (10%) | 4 MIN.(2) | 2 | $15,750.00 | |
| LARRY 22 | 52.5 (.5) | 1000 (50%) | 3 MIN. (1) | 4 | $52,500.00 | |
| BETTY Y | 52.5 (.25) | 300 (5%) | 8 MIN.(4) | 2 | $15,750.00 | |
| BILL B | 52.5 (.062) | 200 (30%) | 10 min.(3) | 1 | $5,250.00 | |
| TERRY H | 52.5 (.25) | 100 (5%) | 20 MIN.(4) | 0 | | |
| BILLY T | 52.5 (.187) | 200 (40%) | 6 MIN.(3) | 4 | $10,500.00 | |

OUT-GOING NEGOTIATIONS

| LARRY 22 | SELL ORDER | 52.1/2 (.5) | 1000 (50%) | 3 MIN. (1) | 4-IBM | $52,500.00 |
|---|---|---|---|---|---|---|
| RON-3 | COUNTER 1 | | | | | |

IN-COMING NEGOTIATIONS

| | BROADCAST | PRICE UP | QTY UP | TIME UP | ACCEPT | REJECT | SEND |
|---|---|---|---|---|---|---|---|
| CANCEL | | PRICE DOWN | QTY DOWN | TIME DOWN | TRADER | TRADER LIST ▽ | ADD | DELETE |

FIND  ACTION ▽  STOCK

VISUAL QUOTE AND ORDER BOOK DISPLAY — NITE MKT IS OPEN

IBM INTERNATIONAL BUSINESS MACHINES

| BUY SIDE | | | PRICE IN 1/16 | SELL SIDE | | | PREF. S 55 | HELP MORE INFO. | |
|---|---|---|---|---|---|---|---|---|---|
| YOUR ORDERS | AON QTY. | LIMIT QTY. | DECIMALS | LIMIT QTY. | AON QTY. | YOUR ORDERS | | DAY | NITE |
| | | | 53 | 100 | 500 | | 55 | | |
| | | | 52.9375 | 500 | 1000 | 300 | 54 | | |
| | | | 52.876 | 400 | 500 | | 54 | | |
| | | | 52.8125 | 400 | 500 | 200 | | | |
| | | | 52.75 | 150 | 150 | | 53 | | |
| | | | 52.6875 | 1000 | 1000 | 100 | 53 | | |
| | | | 52.625 | 4500 | 1000 | | | | |
| | | | 52.582 | 5000 | 2500 | | 52 | | |
| | | | 52.5 | 2300 | 3000 | | 52 | | |
| | | | 52.4375 | 3000 | 10000 | | | | |
| | | | 52.375 | 2571 | 8000 | | 51 | | |
| | | | 52.3125 | 8000 | 25000 | | 51 | | |
| | | | 52.25 | 1284 | | | | | |
| | | | 52.1875 | 6000 | | | 50 | | |
| | | | 52.125 | | | | 50 | | |
| | | | 52.0625 | | | | | | |
| | 1000 | 200 | 52 | | | | YOUR POS. $39.00 | | |

| VOL | HI | LOW | LAST NITE | CHNG.NITE | LAST DAY | CHNG.DAY | P&L $4,508 |
|---|---|---|---|---|---|---|---|
| 980.000 | $52.75 | $50.0625 | 52.1875 | 2.25% | $51.0625 | 1.50% | OVERALL P&L 19% |
| ORDER BK. | CHART | MOST ACTIVE | SHOW NEWS | NEWS OUT | DAY MKT | NITE MKT | PRICE MAP SCALE |
| TO SHOW NEW STOCK ENTER SYMBOL>> | | | SYMBOL | MOVEMENT UP | COMPRESS SPREAD | | |

---

TRADE TICKET [PREF.] [X]

| ACTION | QUANTITY | SYMBOL | PRICE TYPE |
|---|---|---|---|
| BUY ▽ | 500 ▽ | IBM ▽ | LIMIT ▽ |

| LIMIT PRICE | STOP PRICE | ACCT. 93901031 | ☐ NEGOTIATIONS ALLOWED |
|---|---|---|---|
| 52 ▽ | ▽ | | ☐ ANONYMOUS |

| DURATION | CONDITION | ACCOUNT | ROUTE TO |
|---|---|---|---|
| DAY ▽ | NONE ▽ | CASH ▽ | NITE ▽ |

REAL-TIME QUOTE SHOWN BELOW

| OPEN | HI | LAST | CHANGE |
|---|---|---|---|
| CLOSE | LOW | VOL | |
| BID: 0.0 | BID SIZE: 0.0 | ASK: 0.0 | ASK SIZE: 0.0 |

| YOUR CURRENT BUYING POWER IS: | $64,000 |
|---|---|
| IF YOU EXECUTE THIS TRADE YOUR BALANCE WILL BE | $23,150 |
| THE TOTAL COST INCLUDING COMMISSION WILL BE | $41,950.00 |

| VERIFICATION | SHOW DSM | CANCEL |
|---|---|---|
| | CLEAR | HIDE DETAILS |

---

WIT CAPITAL

| ON LINE | WELCOME TO THE NEW WIT CAPITAL DIGITAL STOCK MARKET | | |
|---|---|---|---|
| | IBM +2.25%, 52.187 | | |
| WIT WATCH STKS. | | | |
| YOUR STKS. | | | |

| TRADE STOCKS | POS./P&L | ACCOUNT HISTORY | FUNDS AVAILABLE |
|---|---|---|---|
| QUICK QUOTE | OPEN ORDERS | NEGOTIATIONS | MESSAGES |

FIG. 43A

| TRADERS AT A PRICE LEVEL | | | | SORT | PREF. | HELP |
|---|---|---|---|---|---|---|
| IBM: SELLERS | BEST OFFER | 52.438 | 52.375 | 52.313 | 52.25 | SET DEFAULTS |
| NAME | PRICE | QTY | TIME | ACTIVITY | TOTAL $ | P/L-BBO |
| FRED D | 52.5 (.187) | 200 (20%) | 6 MIN. (1) | 0 | $10,500.00 | |
| DAVE K | 52.5 (.25) | 300 (10%) | 4 MIN.(2) | 2 | $15,750.00 | |
| LARRY 22 | 52.5 (.5) | 1000 (50%) | 3 MIN. (1) | 4 | $52,500.00 | |
| BETTY Y | 52.5 (.25) | 300 (5%) | 8 MIN.(4) | 2 | $15,750.00 | |
| BILL B | 52.5 (.062) | 200 (30%) | 10 min.(3) | 1 | $10,500.00 | |
| TERRY H | 52.5 (.25) | 100 (5%) | 20 MIN.(4) | 0 | $5,250.00 | |
| BILLY T | 52.5 (.187) | 200 (40%) | 6 MIN.(3) | 4 | $10,500.00 | |
| OUT-GOING NEGOTIATIONS | | | | | | |
| LARRY 22   SELL ORDER | 52 1/2 (.5) | 1000 (50%) | 3 MIN. (1) | 4-IBM | $52,500.00 | |
| RON-3     COUNTER 1 | 52 | 500 | 2 MIN. | 2 | $26,000.00 | 93.50 |
| LARRY 22   COUNTER 2 | 52.25 | 800 | 1 MIN. | 4 | $41,800.00 | |
| FRANK 5   SELL ORDER | 89 1/4 (.25) | 500 (25%) | 5 MIN. (2) | O-DELL | $44,625.00 | |
| RON-3     COUNTER 1 | 89 | 400 | 3 MIN. | 2 | $35,600.00 | $483.98 |
|           COUNTER 2 | | | | | | |
| IN-COMING NEGOTIATIONS | | | | | | |
| RON-3     BUY ORDER | 152 1/2 (.5) | 2000 (50%) | 10 MIN. (2) | 2-T | $305,000.00 | (1,567.00) |
| FRED 4U   COUNTER 1 | 152 | 1000 | 2 MIN. | 3 | $152,000.00 | |
|           COUNTER 2 | | | | | | |
| RON-3     BUY ORDER | 189.1/4 (.25) | 500 (25%) | 5 MIN. (2) | 1-YHOO | $94,625.00 | (125.00) |
| DAVID44   COUNTER 1 | 189 | 500 | 1 MIN. | 1 | $94,500.00 | |
|           COUNTER 2 | | | | | | |
| CANCEL | BROADCAST | PRICE UP | QTY UP | TIME UP | ACCEPT | REJECT | SEND |
| | | PRICE DOWN | QTY DOWN | TIME DOWN | | | |

| FIND | ACTION ▽ | STOCK | TRADER | TRADER LIST ▽ | ADD | DELETE |

4200

PREFERENCES   HELP
11:07:55

NASDAQ
NYSE

STOCK SUMMARY   CUSTOM VIEWS   PEEL OFF DISPLAY   EXPAND
WIT NEWS        ACCOUNTS       ALERTS              SHRINK

FIG.43B

TRADERS AT A PRICE LEVEL

| IBM: SELLERS | | | SORT 52.313 | PREF. 52.25 | HELP SET DEFAULTS |
|---|---|---|---|---|---|
| | BEST OFFER | 52.438 | 52.375 | | P/L-BBO |
| NAME | PRICE | QTY | TIME | ACTIVITY | TOTAL $ |
| FRED D | 52.5 (.187) | 200 (20%) | 6 MIN. (1) | 0 | $10,500.00 |
| DAVE K | 52.5 (.25) | 300 (10%) | 4 MIN.(2) | 2 | $15,750.00 |
| LARRY 22 | 52.5 (.5) | 1000 (50%) | 3 MIN. (1) | 4 | $52,500.00 |
| BETTY Y | 52.5 (.25) | 300 (5%) | 8 MIN.(4) | 2 | $15,750.00 |
| BILL B | 52.5 (.062) | 200 (30%) | 10 min.(3) | 1 | $10,500.00 |
| TERRY H | 52.5 (.25) | 100 (5%) | 20 MIN.(4) | 0 | $5,250.00 |
| BILLY T | 52.5 (.187) | 200 (40%) | 6 MIN. (3) | 4 | $10,500.00 |

OUT-GOING NEGOTIATIONS

| LARRY 22 | SELL ORDER | 1000 (50%) | 3 MIN. (1) | 4-IBM | $52,500.00 |
|---|---|---|---|---|---|
| RON-3 | COUNTER 1 | 1000 (50%) | 3 MIN. (1) | | $52,500.00 |

IN-COMING NEGOTIATIONS

| | | | | TRADER LIST ▽ | | |
|---|---|---|---|---|---|---|
| | | | | TRADER | | |
| | | PRICE UP | QTY UP | TIME UP | ACCEPT | REJECT | SEND |
| CANCEL | BROADCAST | PRICE DOWN | QTY DOWN | TIME DOWN | | ADD | DELETE |

FIND  ACTION ▽  STOCK

FIG. 44

| TRADERS AT A PRICE LEVEL | | | | | | |
|---|---|---|---|---|---|---|
| IBM: SELLERS | | 52.438 | 52.375 | 52.313 | 52.25 | SET DEFAULTS |
| | BEST OFFER | | | SORT | PREF. | HELP |
| NAME | PRICE | QTY | TIME | ACTIVITY | TOTAL $ | P/L-BBO |
| FRED D | 52.5 (.187) | 200 (20%) | 6 MIN. (1) | 0 | $10,500.00 | ☐ |
| DAVE K | 52.5 (.25) | 300 (10%) | 4 MIN. (2) | 2 | $15,750.00 | |
| LARRY 22 | 52.5 (.5) | 1000 (50%) | 3 MIN. (1) | 4 | $52,500.00 | |
| BETTY Y | 52.5 (.25) | 300 (5%) | 8 MIN. (4) | 2 | $15,750.00 | |
| BILL B | 52.5 (.062) | 200 (30%) | 10 MIN. (3) | 1 | $10,500.00 | |
| TERRY H | 52.5 (.25) | 100 (5%) | 20 MIN. (4) | 0 | $5,250.00 | |
| BILLY T | 52.5 (.187) | 200 (40%) | 6 MIN. (3) | 4 | $10,500.00 | |

| OUT-GOING NEGOTIATIONS | | | | | | |
|---|---|---|---|---|---|---|
| LARRY 22 | SELL ORDER | 52.1/2 (.5) | 1000 (50%) | 3 MIN. (1) | 4-IBM | $52,500.00 |
| RON-3 | COUNTER 1 | 52 | 500 | 2 MIN. | | $26,000.00  93.50 |

4530

4520

| IN-COMING NEGOTIATIONS |
|---|
| |

| CANCEL | BROADCAST | PRICE UP | QTY UP | TIME UP | ACCEPT | REJECT | SEND |
|---|---|---|---|---|---|---|---|
| | | PRICE DOWN | QTY DOWN | TIME DOWN | | | |
| FIND  ACTION ▽  STOCK | | TRADER | | TRADER LIST ▽ | ADD | DELETE | |

FIG. 45

| TRADERS AT A PRICE LEVEL | | | | | | |
|---|---|---|---|---|---|---|
| IBM: SELLERS | | | 52.438 | 52.375 | SORT 52.313 | PREF. 52.25 | HELP SET DEFAULTS |
| NAME | BEST OFFER | | | | | P/L-BBO |
| | PRICE | QTY | | TIME | ACTIVITY | TOTAL $ |
| FRED D | 52.5 (.187) | 200 (20%) | | 6 MIN. (1) | 0 | $10,500.00 |
| DAVE K | 52.5 (.25) | 300 (10%) | | 4 MIN.(2) | 2 | $15,750.00 |
| LARRY 22 | 52.5 (.5) | 1000 (50%) | | 3 MIN. (1) | 4 | $52,500.00 |
| BETTY Y | 52.5 (.25) | 300 (5%) | | 8 MIN.(4) | 2 | $15,750.00 |
| BILL B | 52.5 (.062) | 200 (30%) | | 10 min.(3) | 1 | $10,500.00 |
| TERRY H | 52.5 (.25) | 100 (5%) | | 20 MIN.(4) | 0 | $5,250.00 |
| BILLY T | 52.5 (.187) | 200 (40%) | | 6 MIN.(3) | 4 | $10,500.00 |

| OUT-GOING NEGOTIATIONS | | | | | |
|---|---|---|---|---|---|
| LARRY 22 | SELL ORDER 52.1/2 (.5) | 1000 (50%) | 3 MIN. (1) | | $52,500.00 |
| RON-3 | COUNTER 1  52 | 500 | 2 MIN. | 4-IBM  2 | $26,000.00  93.50 |
| LARRY 22 | COUNTER 2  52.25 | 800 | 1 MIN. | 4 | $41,800.00 |

4615  4620  4625  4640  4630

4610

IN-COMING NEGOTIATIONS

| CANCEL | BROADCAST | PRICE UP  PRICE DOWN | QTY UP  QTY DOWN | TIME UP  TIME DOWN | ACCEPT | REJECT | SEND |
|---|---|---|---|---|---|---|---|
| | STOCK | TRADER | | TRADER LIST ▽ | ADD | DELETE |

FIND  ACTION ▽

FIG. 46

TRADERS AT A PRICE LEVEL

| IBM: SELLERS | BEST OFFER | 52.438 | 52.375 | SORT 52.313 | PREF. 52.25 | HELP SET DEFAULTS |
|---|---|---|---|---|---|---|
| NAME | PRICE | QTY | TIME | ACTIVITY | TOTAL $ | P/L-BBO ☐ |
| FRED D | 52.5 (.187) | 200 (20%) | 6 MIN. (1) | 0 | $10,500.00 | |
| DAVE K | 52.5 (.25) | 300 (10%) | 4 MIN.(2) | 2 | $15,750.00 | |
| LARRY 22 | 52.5 (.5) | 1000 (50%) | 3 MIN. (1) | 4 | $52,500.00 | |
| BETTY Y | 52.5 (.25) | 300 (5%) | 8 MIN.(4) | 2 | $15,750.00 | |
| BILL B | 52.5 (.062) | 200 (30%) | 10 MIN.(3) | 1 | $10,500.00 | |
| TERRY H | 52.5 (.25) | 100 (5%) | 20 MIN.(4) | 0 | $5,250.00 | |
| BILLY T | 52.5 (.187) | 200 (40%) | 6 MIN.(3) | 4 | $10,500.00 | |

| | SELL ORDER | | | | | |
|---|---|---|---|---|---|---|
| LARRY 22 | 52.1/2 (.5) | 1000 (50%) | 3 MIN. (1) | 4-IBM | $52,500.00 | |
| RON-3 | COUNTER 1 | 52 | 500 | 2 MIN. | 2 | $26,000.00 |
| LARRY 22 | COUNTER 2 | 52.25 | 800 | 1 MIN. | 4 | $41,800.00 93.50 |

IN-COMING NEGOTIATIONS

| | BUY ORDER | PRICE UP | QTY UP | TIME UP | | |
|---|---|---|---|---|---|---|
| | | PRICE DOWN | QTY DOWN | TIME DOWN | | |
| RON-3 | 152.1/2 (.5) | 2000 (50%) | 10 MIN. (2) | 2-T | $305,000.00 (1,567) | |
| FRED 4U | 152 | 1000 | 2 MIN. | 3 | $152,000.00 | |

| CANCEL | BROADCAST | TRADER | TRADER LIST ▽ | ACCEPT | REJECT | SEND |
|---|---|---|---|---|---|---|
| FIND | ACTION ▽ | STOCK | | ADD | DELETE | |

FIG. 47

| TRADERS AT A PRICE LEVEL | | | | SORT | PREF. | HELP |
|---|---|---|---|---|---|---|
| IBM: SELLERS | BEST OFFER | 52.438 | 52.375 | 52.313 | 52.25 | SET DEFAULTS |
| NAME | PRICE | QTY | TIME | ACTIVITY | TOTAL $ | P/L–BBO |
| FRED D | 52.5 (.187) | 200 (20%) | 6 MIN. (1) | 0 | $10,500.00 | |
| DAVE K | 52.5 (.25) | 300 (10%) | 4 MIN.(2) | 2 | $15,750.00 | |
| LARRY 22 | 52.5 (.5) | 1000 (50%) | 3 MIN. (1) | 4 | $52,500.00 | |
| BETTY Y | 52.5 (.25) | 300 (5%) | 8 MIN.(4) | 2 | $15,750.00 | |
| BILL B | 52.5 (.062) | 200 (30%) | 10 MIN.(3) | 1 | $10,500.00 | |
| TERRY H | 52.5 (.25) | 100 (5%) | 20 MIN.(4) | 0 | $5,250.00 | |
| BILLY T | 52.5 (.187) | 200 (40%) | 6 MIN.(3) | 4 | $10,876.00 | |

| OUT–GOING NEGOTIATIONS | | | | | | |
|---|---|---|---|---|---|---|
| LARRY 22 | SELL ORDER | 52.1/2 (.5) | 1000 (50%) | 3 MIN. (1) | 4–IBM | $52,500.00 |
| RON–3 | COUNTER 1 | 52 | 500 | 2 MIN. | 2 | $26,000.00 93.50 |
| LARRY 22 | COUNTER 2 | 52.25 | 800 | 1 MIN. | 4 | $41,800.00 |

| IN–COMING NEGOTIATIONS | | | | | | |
|---|---|---|---|---|---|---|
| RON–3 | BUY ORDER | 152.1/2 (.5) | 2000 (50%) | 10 MIN. (2) | 2–T | $305,000.00 (1,567) |
| FRED 4U | COUNTER 1 | 152 | 1000 | 2 MIN. | 3 | $152,000.00 |
| | COUNTER 2 | | | | | |
| RON–3 | BUY ORDER | 189.1/4 (.25) | 500 (25%) | 5 MIN. (2) | 1–YHOO | $94,625.00 (125.00) |
| DAVID44 | COUNTER 1 | 152 | 500 | 1 MIN. | 1 | $94,500.00 |
| | COUNTER 2 | | | | | |

| | BROADCAST | PRICE UP | QTY UP | TIME UP | | |
|---|---|---|---|---|---|---|
| | | PRICE DOWN | QTY DOWN | TIME DOWN | | |

| CANCEL | | | TRADER | | ACCEPT | REJECT | SEND |
|---|---|---|---|---|---|---|---|

FIND  ACTION ▽  STOCK           TRADER LIST ▽    ADD    DELETE 4810, 4820, 4830, 4840

FIG. 48

| | BUY | PRICE 1/16 | SELL | | 148 |
|---|---|---|---|---|---|
| AON QTY. | LIMIT QTY. | DECIMALS | LIMIT QTY. | AON QTY. | |
| | | 147.188 | 10 | | 147 |
| | | 147.125 | | | |
| | | 147.063 | 543 | | |
| | | 147 | | | |
| | | 146.938 | 578 | | 146 |
| | | 146.875 | 4474 | | |
| | | 146.8125 | 4376 | | |
| 9000 | | 3.875 | | 7500 | 145 |
| | 342 | 143.813 | | | |
| | 10 | 143.75 | | | 144 |
| | | 143.688 | | | |
| | 55 | 143.625 | | | |
| | | 143.562 | | | 143 |
| | 25 | 143.5 | | | |
| | 10 | 143.438 | | | |
| | 5 | 143.375 | | | |
| | 5 | 143.313 | | | |

FIG. 54

| FINAL VERIFICATION | | | 5610 |
|---|---|---|---|
| BUY ORDER: DELL COMPUTER | | | |
| NATIONAL MARKET | | | |
| THIS IS FINAL VERIFICATION THAT YOU WISH TO EXECUTE THIS TRADE. PLEASE NOTE THE FINAL REAL-TIME QUOTE SHOWN BELOW. | | | |
| ACTION | QUANTITY | SYMBOL | PRICE TYPE |
| BUY | 1000 | DELL | STOP/LIMIT |
| LIMIT PRICE | STOP PRICE | | REF. 4539 |
| 145.438 | 145.5 | 5670 | |
| DURATION | CONDITION | ACCOUNT | ROUTE |
| DAY | AON | CASH | NATIONAL |
| REAL-TIME QUOTE SHOWN BELOW | | | |
| OPEN | 145.00 | LAST: 145.25 | CHANGE +.50 |
| CLOSE  5640 | 145.50 | VOL.2,450,987 | |
| BID 145.188 | ASK: 146.438 | BID SIZE: 1000 | ASK SIZE: 5000 |
| YOUR CURRENT BUYING POWER IS: | | 5650 | $156,876.99 |
| IF YOU EXECUTE THIS TRADE YOUR BALANCE WILL BE: | | 5620 | $136,876.54 |
| IF YOU EXECUTE THIS TRADE YOUR COMMISSION WILL BE: | | | $76.54 |
| THE TOTAL COST INCLUDING COMMISSION WILL BE: | | | $20,076.99 |
| | SHOW DSM | CANCEL | SEND |
| | CLEAR | HIDE DETAILS | |

| MOST ACTIVE STOCKS | | | AFTER HOURS MKT. IS OPEN | | |
|---|---|---|---|---|---|
| DAY MARKET | | | NITE MARKET 5782 | | |
| IBM +2.55/105.75 | | | IBM +.95/105.75-NEWS | | 148 NM / AHM |
| DELL +2.25/78.5 | | | DELL +.87/78.5 | | |
| T +1.75/99.25 | | | CSCO +.75/45.87-NEWS | | 147 |
| CSCO +1.75/45.87 | | | INTC +.70/111.75 | | 146 |
| INTC +1.70/111.75 | | | CMPT -.65/78.00 | | |
| CMPT +1.25/78.00 | | | GTWY +.62/75.75 | | 145 |
| GTWY +1.22/75.75 | | | XRX +.52/75.75 | | |
| HP +1.05/58.25 | | | ADD -.45/58.25-NEWS | | 144 |
| ICGX +1.00/90.375 | | | ICGX -.38/90.375-NEWS | | |
| KLAC +.98/43.75 | | | KLAC +.38/43.75 | | 143 |
| FMC +.95/56.00 | | | MPC -.25/56.00 | | |
| DOW +1.98/8976.87 | | | | | |
| NASDAQ +1.25/10979 | | | MORE STOCKS BELOW | | |
| VOL. | HI | LOW | LAST AHM | CHNG. AHM | LAST NM | CHNG. NM | YOUR POS. $143.50 |
| 980,000 | $144.88 | $143.00 | 145.25 | 2.25% | $144.88 | 1.50% | P&L +$4,568 |
| ORDER BK. | CHART | MOST ACTIVE | SHOW NEWS | NEWS OUT | DAY MKT. | NITE MKT. | OVERALL P&L +19% |
| TO SHOW NEW STOCK ENTER SYMBOL>> | | | SYMBOL | MOVEMENT UP | COMPRESS SPREAD | | PRICE MAP SCALE BUY / SELL |

| CHART OF STOCK ACTIVITY | | OPEN | | HELP | |
|---|---|---|---|---|---|
| DAY AT CLOSE | NITE MOST ACTIVE | | $ | DAY | NITE |
| AOL 169.75 | AOL 169.75 | △ | 55 | | |
| DELL 52.875 | DELL 52.875 | | | | |
| MSFT 123.5625 | MSFT 123.5625 | | 54 | | |
| IBM 105.75 | IBM 144.5 NEWS | | | | |
| T 99.25 | INTC 111.75 NEWS | | 53 | | |
| INTC 111.75 | CMPT 78.00 | | | | |
| CMPT 78.00 | GTWY 75.75 | | 52 | | |
| GTWY 75.75 | XRX 75.75 | | | | |
| HP 58.25 | ADD 58.25 NEWS | | 51 | | |
| ICGX 90.375 | ICGX 90.375 NEWS | | | | |
| KLAC 43.75 | KLAC 43.75 | | DELL | | |
| FMC 56.00 | MPC 56.00 NEWS | | | | |
| | | ▽ | $1 | | |
| | MORE BELOW ▽ | | $5 | | |
| BOOK | CHART | MOST ACTIVE | NEWS | ⦿ DAY | $10 |
| ENTER SYMBOL> | DELL | | ENTER | ○ NITE | SHOW ALL ORDERS |

FIG.59

| AFTER HOURS ORDER BOOK | | | | OPEN | | HELP | |
|---|---|---|---|---|---|---|---|
| DELL | | | | | | $ DAY NITE | |
| BUY AON | BUY LIMIT | PRICE 1/16 | SELL LIMIT | SELL AON | | 55 | |
| | | 53 | 100 | 500 | △ | | |
| | | 52.9375 | 500 | 1000 | | 54 | |
| | | 52.875 | 400 | 500 | | | |
| | | 52.8125 | 400 | | | | |
| | 100 | 52.75 | | | | | |
| | | 52.6875 | | | | 53 | |
| | 100 | 52.625 | | | | | |
| | 100 | 52.562 | | | | | |
| | | 52.5 | | | | | |
| | | 52.4375 | | | | 52 | |
| | 800 | 52.375 | | | | | |
| | | 52.3125 | | | | | |
| | 100 | 52.25 | | | | 51 | |
| | | 52.1875 | | | | | |
| | 400 | 52.125 | | | | | |
| | | 52.0625 | | | | | |
| | 200 | 52 | | | ▽ | PRICE MAP SCALE | |
| VOL. | HI | LAST | LOW | CHNG. | | $1 | |
| 1,000 | 53 | 51.625 | 51.625 | -.0625 | | $5 | |
| BOOK | CHART | MOST ACTIVE | NEWS | ⊙ DAY | | $10 | |
| ENTER SYMBOL> | | DELL | ENTER | ○ NITE | | SHOW ALL ORDERS | |

FIG.61

| BACK | FORWARD | HOME | | FIND | STOP | OTHER FUNCTIONS | | HELP | | | HELP | |
|---|---|---|---|---|---|---|---|---|---|---|---|---|
| SEARCH | | | | | | | | | $ | DAY | | NITE |

| DSM NEWS | PRE-OPENING | OPENING BELL | HOT SHOTS | NEWS OUT | CLOSING BELL | 55 | | |
|---|---|---|---|---|---|---|---|---|

HOT SHOTS news on the 24 most active stocks

7:37pm EST: reported by Amy Cortese DMS news service

•IBM Reports earnings up 22% over same period last year.
•DELL In after hours news, reports earnings up 42% over last year same quarter.
•CMPT In after hours news, reports launch of new direct sales plan for internet.
•XRX Rumors Xerox has received patent for super high resolution display.
•HP In after hours announcement, HP reports 34% decline in sales for 2nd quarter.
•T Rumors of joint venture with IBM on wireless internet service.
•CCI In after hours news, reports earnings up 56% over last year same quarter.
•BA No news.
•CSCO Rumors Xerox has received patent for super high resolution display.
•RJR In after hours announcement, reports 31% decline in sales for 2nd qtr.
•MCI Rumors of joint venture with @ Home on Cable modem trading system.
•FRP No news.
•GM Reports 8% loss for quarter.

| SHOW HELP | SHOW EMAIL | SHOW NEWS | | SHOW CHART | SORT NEWS | SHOW MY STKS. | PRICE MAP SCALE | |
|---|---|---|---|---|---|---|---|---|
| | | | | | | | $1 | |
| 1,000 | 53 | 51.625 | 51.625 | | -.0625 | | $5 | |
| BOOK | CHART | MOST ACTIVE | NEWS | ⦿ DAY | | | $10 | |
| ENTER SYMBOL> | | DELL | ENTER | ○ NITE | | | SHOW ALL ORDERS | |

FIG.62

SYSTEM AND METHOD FOR CONDUCTING SECURITIES TRANSACTIONS OVER A COMPUTER NETWORK

This application claims benefit to U.S. Provisional No. 60/122,208 filed Mar. 1, 1999.

FIELD OF THE INVENTION

This invention relates to computer-aided trading of financial instruments, and preferably to trading of securities over the Internet.

BACKGROUND OF THE INVENTION

In the United States, the trading of securities is closely regulated under the Securities Exchange Act of 1934, 15 U.S.C. §§78a–78mm. The term "security" is defined in 15 U.S.C. §78c(a)(10) as "any note, stock, treasury stock, bond, debenture, certificate of interest or participation in any profit-sharing agreement or in any oil, gas, or other mineral royalty or lease, any collateral-trust certificate, preorganization certificate or subscription, transferable share, investment contract, voting-trust certificate, certificate of deposit, for a security, any put, call, straddle, option, or privilege on any security, certificate of deposit, or group or index of securities (including any interest therein or based on the value thereof), or any put, call, straddle, option, or privilege entered into on a national securities exchange relating to foreign currency, or in general, any instrument commonly known as a 'security'; or any certificate of interest or participation in, temporary or interim certificate for, or warrant or right to subscribe to or purchase, any of the foregoing . . . but shall not include currency or any note draft, bill of exchange, or banker's acceptance which has a maturity at the time of issuance of not exceeding nine months, exclusive of days of grace, or any renewal thereof the maturity of which is likewise limited." Stocks are specific instances of securities. Although the preferred embodiment is primarily concerned with computerized stock trading, it is fully applicable to trading of any securities.

Securities are conventionally traded on exchanges. As set forth in 15 U.S.C. §78c(a)(1), "the term 'exchange' means any organization, association, or group of persons, whether incorporated or unincorporated, which constitutes, maintains, or provides a market place or facilities for bringing together purchasers and sellers of securities or for otherwise performing with respect to securities the functions commonly performed by a stock exchange as that term is generally understood, and includes the market place and the market facilities maintained by such exchange". Well known exchanges include, for example, the New York Stock Exchange, the American Stock Exchange and NASDAQ. Such known exchanges are referred to herein as national exchanges.

Usually securities are traded through brokers and dealers, which frequently use an on-line system to receive orders and facilitate trades. As set forth in 17 C.F.R. §240.17a-23(b)(2) a broker/dealer trading system is "any facility that provides a mechanism, automated in full or in part, for:

(i) Collecting, receiving, disseminating, or displaying system orders [i.e., orders to purchase or sell a security]; and (ii) Matching, crossing, or executing system orders, or otherwise facilitating agreement to the basic terms of a purchase or sale of a security between system participants [i.e., the users of the trading system], or between a system participant and the system sponsor, through use of the system or through the system sponsor [i.e., the entity controlling the broker/dealer system]."

In this patent application, the terms "security", "exchange" and "broker/dealer trading system", are used as defined above.

Systems are known for trading securities over the Internet on the national exchanges at the prices quoted on those exchanges. These systems support trading during normal business hours of the national exchanges, which may not be convenient for many users, such as many individuals who would prefer to trade from home after the close of the exchanges. The existing systems, however, do not support active trading after the closing hours of the exchanges. Thus, there is a need for a system that permits the users to execute trades after normal market hours (after-hours trades) without using an established exchange. And, there is a need for a system that permits users to trade with each other ("user-to-user trading") without involving an exchange.

The presently available systems are directed toward the presentation of numerically formatted information. Moreover, these systems do not provide a visualization of the status of securities as they are traded so as to enable users to gain an essentially immediate and accurate impression of a stock's status, direction of movement, and rate of change, without having to resort to complex mental calculations and holding such calculations in short-term memory. But humans are unsuited to processing numeric information quickly and accurately, and performing mental calculations under stressful conditions places very high cognitive workloads on humans. In addition to being poor processors of numeric information, humans also tend to have very weak short-term memories. Requiring users to perform mental calculations and then hold the results of those calculations in short-term memory while performing even more calculations is unnecessarily difficult and demanding, especially when users are placed under the additional stress of having to decide whether to buy, sell or hold a stock. Traditional on-line trading systems further compound the problem by requiring users to navigate from page to page within the site to gather news and information on their positions, their profit and loss, their open orders, their current positions, and their financial account information. Each time a user moves to a new screen he is forced to store values, which are critical to informed trade-decision-making, in short-term memory.

Another deficiency in current Internet trading systems is that users cannot obtain a real-time quotation on a particular stock (or a portfolio of stocks) without manually requesting a specific quotation from the trading system server, often by typing it every time they need a quote, or hitting "refresh." That is, users of current Internet trading systems cannot simply access the trading system and receive a continuously updated display of real-time quotes for a particular stock or a portfolio of stocks. The need to type in a stock symbol every time a quote is desired further contributes to the inefficiency of the existing systems.

Accordingly, there is a need for an efficient Internet-based trading system which provides improved human interaction and after-hours trading.

SUMMARY OF THE INVENTION

The system and method of the preferred embodiment supports trading of securities over the Internet both on national exchanges and outside the national exchanges. The preferred embodiment also supports an improved human interface and a continuous display of real-time stock quotes on the user's computer screen.

In the preferred embodiment, the users are subscribers to a securities trading service offered over the Internet. Each subscriber to this service is simultaneously connected from his own computer to a first system which provides user-to-user trading capabilities and to a second system which is a broker/dealer system of his/her choices. By user-to-user trading we mean a trade that is made between two users of the system. The system providing the user-to-user trading services includes a hierarchical network of replicated servers supporting replicated databases. The broker/dealer system is a server-based system such as any one of the systems currently used by broker/dealers to maintain their clients' accounts. The use of these broker/dealer systems in the present invention is conventional except for their interaction with the user-to-user trading system. In particular, each broker/dealer server communicates with the user's computer as well as with the root server of the user-to-user system when the user's account is affected, and the user-to-user system provides real-time continuously updated stock information and facilitates user-to-user trades that have been approved by the broker/dealer systems with which it interacts.

Users of the preferred system can trade securities with other users of the system after national market trading hours. As part of this user-to-user trading, a user can accept a buy or sell offer at the terms offered or he can initiate a counteroffer and negotiate a trade. This ability to have users trade and negotiate trades among themselves creates a market within the subject system, referred to herein as "after-hours market" or "Nite Market," but which is capable being operated 24 hours per day, 7 days per week.

The preferred embodiment provides an ergonomic graphical user interface (GUI) that includes at least some of the following functional benefits in comparison with existing on-line consumer trading systems: (1) faster access to critical information; (2) faster execution of primary trading functions; (3) better decision making during the trading process; (4) fewer undetected critical errors; (5) easier correction of detected errors; (6) faster and more reliable problem resolution; (7) improved use of each user/trader's desktop workspace; (8) easier customization and configuration based on user experience; (9) easier and faster initial setup of each user's securities on the system; and (10) faster and more stable acquisition of trading skills. The GUI of the preferred embodiment graphically displays a "visual quote" that shows at a glance the condition of the market in a security and the user's relative position based on the status of the security in the marketplace. This visual quote provides a graphic representation of the important variables that the user needs to make accurate trading decisions without interpreting traditional numeric quotes. Further, the GUI of the preferred embodiment, unlike other on-line trading interfaces, does not require users to page to a separate screen to view their current and open positions in a security, thereby reducing errors and short-term memory demands on the user and improving the quality of on-line trading. The preferred embodiment also provides speed-trading functions as well as visual feedback that tracks the progress of the security trading process.

Although the preferred embodiment described below relates to computerized stock trading, it is readily applicable to trading of any securities and, in addition, a person skilled in the art will readily appreciate how the disclosed technology can be used for other forms of computerized trading (e.g., trading airline tickets, automobiles, or theater tickets).

BRIEF DESCRIPTION OF THE DRAWINGS

These and other objects, features and advantages of the invention will be more readily apparent from the following detailed description of a preferred embodiment of the invention in which:

FIG. 5 illustrates a graphical user interface (GUI) of the preferred embodiment.

FIG. 7 depicts an open orders display.

FIG. 8 depicts a current positions display.

FIG. 9 depicts a financial summary display.

FIG. 10 is a news and information display.

FIG. 11 is a trade ticket display.

FIG. 13 is a multiple pricing maps display.

FIG. 41 is a "Set defaults" display for the user-to-user negotiation mechanism of the preferred embodiment.

FIG. 42 is a negotiations screen.

FIG. 43 illustrates how the negotiation screen fits into the master trade screen.

FIG. 44 illustrates how a user adjusts the values in his counteroffer.

FIG. 45 illustrates how the application displays the potential effect of a user's counteroffer.

FIG. 46 illustrates how an offering trader responds to a user's counteroffer.

FIG. 47 illustrates how a user makes an offer to sell and then receives buy counteroffers.

FIG. 48 illustrates how the preferred embodiment enables a user to conduct more than one in-coming negotiation and more than one out-going negotiation simultaneously.

FIG. 54 shows a compressed spread display.

FIG. 56 shows a "Final Verification" screen.

FIG. 57A is a "Most Active Stocks" display.

FIG. 59 shows an applet version of the most active stocks display shown in FIG. 57A.

FIG. 61 shows an applet version of the order book display shown in FIG. 6.

FIG. 62 shows an applet version of the news display shown in FIG. 10.

DETAILED DESCRIPTION OF PREFERRED EMBODIMENTS

As noted, the preferred embodiment supports both traditional on-line securities trading on national exchanges and on-line user-to-user trading outside the national exchanges. The preferred embodiment employs both a system specifically developed for such trading (sometimes simply referred to as the preferred system) and one or more broker/dealer computers of the type customarily employed for computerized on-line trading.

In the preferred embodiment, each of a multiplicity of users' workstations is simultaneously connected via the Internet to one of a plurality of broker/dealer computers and to a user-to-user trading system. Each broker's computer stores the account data and similar information customarily stored at a broker's server computer for the broker's clients. The preferred system communicates with each broker's server computer and in addition provides real-time updates for stock quotes both as a part of the service supporting day trading on national exchanges and as part of the service supporting user-to-user trading. For the user-to-user trading service the system maintains real-time data reflecting buy and sell orders for the supported securities, and is capable of displaying the same information for national exchanges if that data is provided by the exchange(s). This data reflecting users' orders to buy and sell for each security is referred to as the "order book" for a security. The users interested in a given security receive at their workstations real-time displays of the order book for that security. In one embodiment of the invention, such order book information is selectively provided to users on a subscription basis. It is also capable of being displayed (free, or for a fee) by Internet portals such as Yahoo!, Altavista, etc.

Users' workstations, which are typically ordinary personal computers or other computer devices with sufficient processing and storage capabilities, store application software (also referred to hereinafter simply as "application") that supports a connection both to the user-to-user trading system and to the broker/dealer computer so as to display to the user the information available from both sources. As noted, the user's account and similar data is provided by the broker/dealer's server and the user-to-user trading data as well as real-time quotes are provided by the trading system. The application on the user's workstation preferably employs a user interface combining data provided from both sources.

Figure 1:
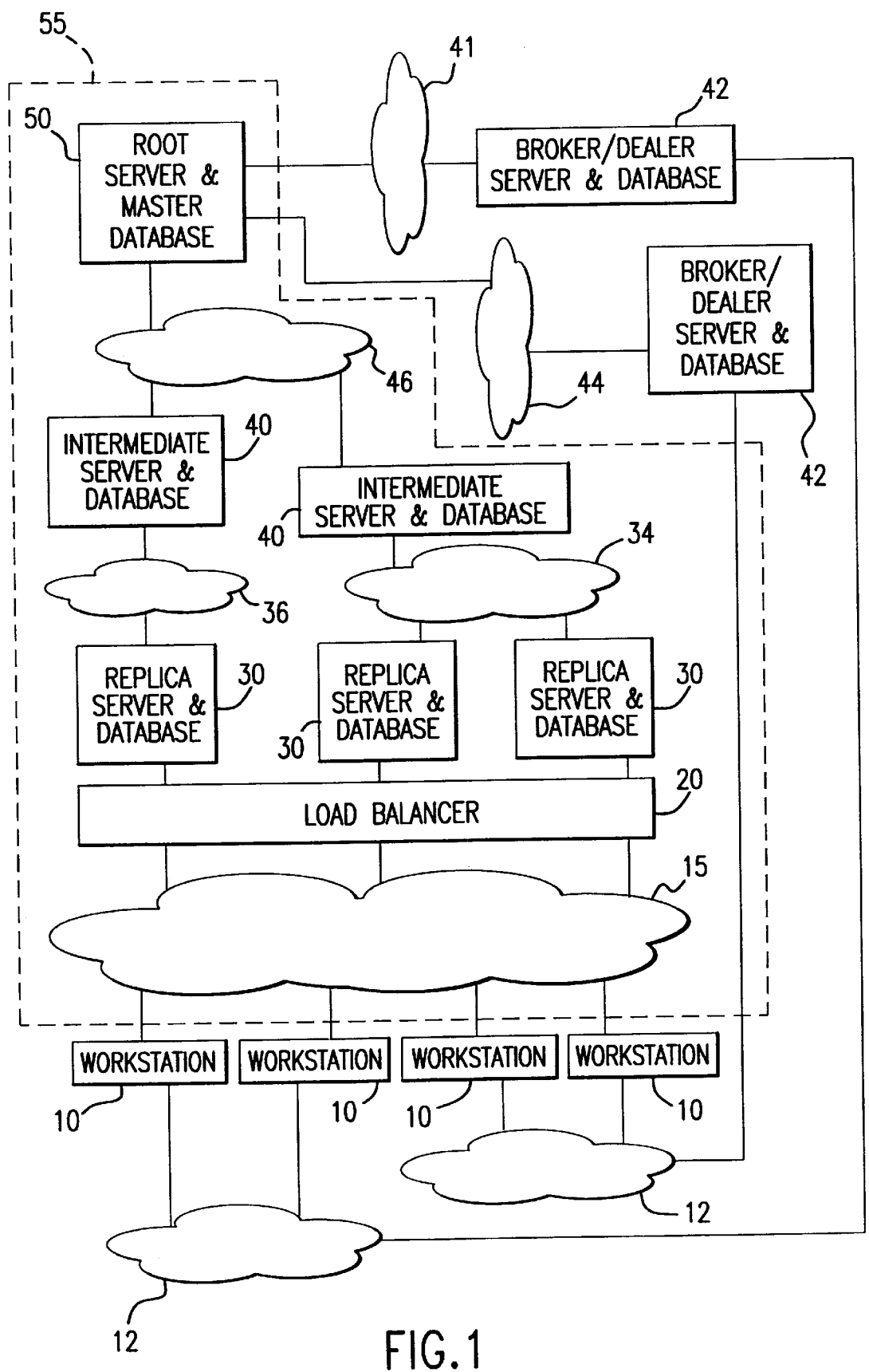
FIG. 1 illustrates a communications system of the preferred embodiment.

FIG. 1 illustrates a communications system of the preferred embodiment. The system comprises a plurality of work-stations 10, each of which is connected via a communications network 12 to one of a plurality of broker/dealer servers and databases 42 and each of which is connected via a communications network 15 to a hierarchical server and database structure 55. The hierarchical structure comprises a root server and master database 50, intermediate servers and databases 40, replica servers and databases 30, and a load balancer 20 interconnected by communications networks 34, 36 and 46. In addition, the broker/dealer servers and databases 42 are connected to the root server and master database 50 via communication networks 41, 44. The intermediate servers and databases 40 may not be used in some embodiments. In general, the number of levels of servers in the hierarchy of servers is based on the system load and specific capabilities of computers selected as servers, as understood by a person skilled in the art.

The computers employed as servers can range from personal computers to larger computers, e.g., workstations and multiprocessors, selected as understood by persons skilled in the art. Illustrative such computers are Pentium™-based computers and computers manufactured by Sun Microsystems™. The computers employed by the users are referred to as user's workstations and can be personal computers or other devices (e.g., Internet appliances) with sufficient processing capabilities as understood by a person skilled in the art. Illustrative such user workstations are personal computers using Pentium™ microprocessors and operating under a Windows 95™ or 'Windows 98™ operating system. One skilled in the art of computer systems will understand that the present invention is not limited to a particular class or model of computer employed for both servers and users' workstations and will be able to select an appropriate system based on the specific requirements.

It should be noted that a typical computer system that may be employed here as a server or a workstation includes a central processing unit, a primary memory, e.g., RAM, one or more secondary memory storage devices, e.g., floppy or hard disk drives, CD-ROMs, DVDs, or tapes, and communication interfaces, e.g., a modem, a network interface, or other connection to external electronic devices, such as a serial or parallel port. It also includes (primarily for the workstations) input devices, e.g., a keyboard, mouse, microphone, or other similar device and output devices, e.g., a computer monitor or any other known computer output device. A system bus provides communications between these elements.

Program execution of such a typical computer is usually controlled by an operating system, such as WINDOWS, DOS, or UNIX. Programs executed by the servers are resident at the server computers and run under the control of the server operating system. In the preferred embodiment, the user workstations execute application programs (applications), resident at the workstations, under the control of the operating systems of the workstations. In other embodiments and as understood by a person skilled in the art, the functions of the workstation applications may be performed by the server and workstations may only include a browser, as known in the art, that enables a user to exchange information with the server.

Figure 3:
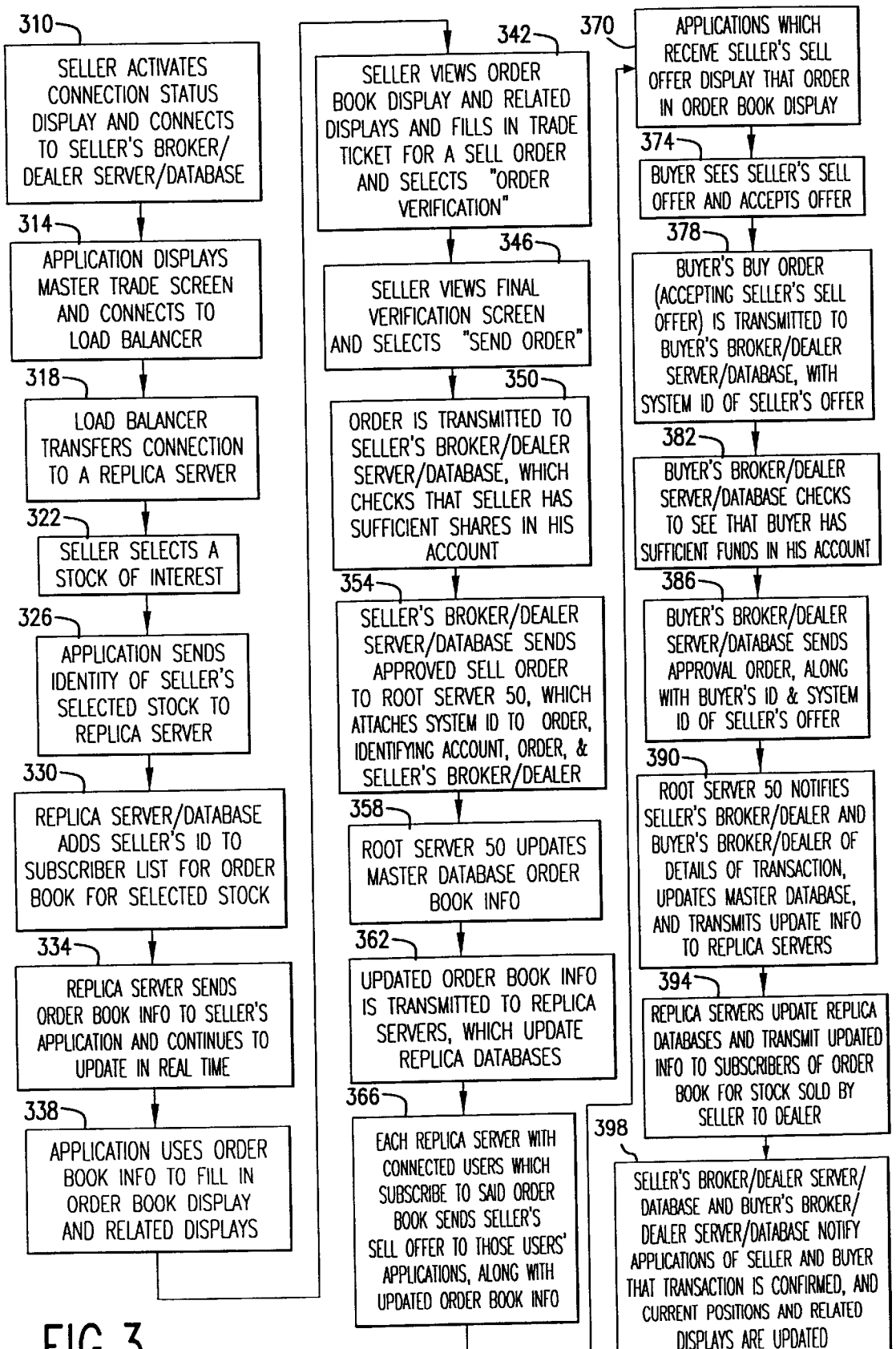
FIG. 3 is a flow diagram illustrating the operation of the preferred system for the user-to-user trades.

The root server and master database 50 contains real-time security information, including order book information for each security that can be traded on the system, and a list of subscribers for each order book (see FIG. 3). In other words, it holds offers to buy and sell for each such security that are provided by the users of the user-to-user trading system (or by the national exchanges, if they provide access to their order books). As noted, the "book" refers to such user-to-user trading orders entered for each security. To support day-time trading, the master database includes real-time securities quote data supplied from conventional sources of such data. Advantageously, at least the stocks that are traded on the national exchanges can be traded on the system of the preferred embodiment.

Intermediate servers and databases 40 and replica servers and databases 30 include copies of the master database. Updates to the master database 50 are sent on a real-time basis to the databases 30, 40 via communications networks 34, 36, 46. In the preferred embodiment, servers and databases 30, 40 and 50 are all located at the same site and the networks 34, 36, 46 are the same network, which is a local area network (LAN); but in alternative embodiments the servers and databases 30, 40 and 50 may be dispersed and the networks could also be the Internet, public or private telephone networks, or other methods of linking computers as known in the art. Network 15 preferably is the Internet, but may be public or private telephone networks or other communication networks known in the art.

In the preferred embodiment, when a replica server 30 receives updated information from a user workstation 10, the replica server 30 does not update its database, but transmits the updated information to the root server 50, which then updates the master database. Thereafter, the updated information is transmitted to the intermediate and replica servers 40, 30 which then update their databases. In an alternative embodiment, the replica and intermediate servers 30, 40 update their databases as they are transmitting the information up to the root server 50. In another preferred embodiment, the intermediate servers 40 do not include databases which replicate the master database, and essentially transmit information between the replica servers 30 and the root server 50. This system enables real-time responses on Internet architecture.

As indicated, each workstation 10 is also connected to a broker/dealer server and database 42 via a network 12. The broker/dealer server and database 42 contains a workstation user's account information (e.g., number of shares of each stock held by the user, amount of money in user's account, and other data relating to user's securities' holdings). In the preferred embodiment, the network 12 likewise is preferably the Internet. Alternative embodiments of network 12 include LANs, telephone networks, and other known methods of linking computers. Each broker/dealer server 42 is also connected via a network 41, 44 to the master server 50. In the preferred embodiment, this network connection is a secure point-to-point communication link. In an alternative embodiment, the network can be the Internet, telephone network, or another method of linking computers.

Figure 2:
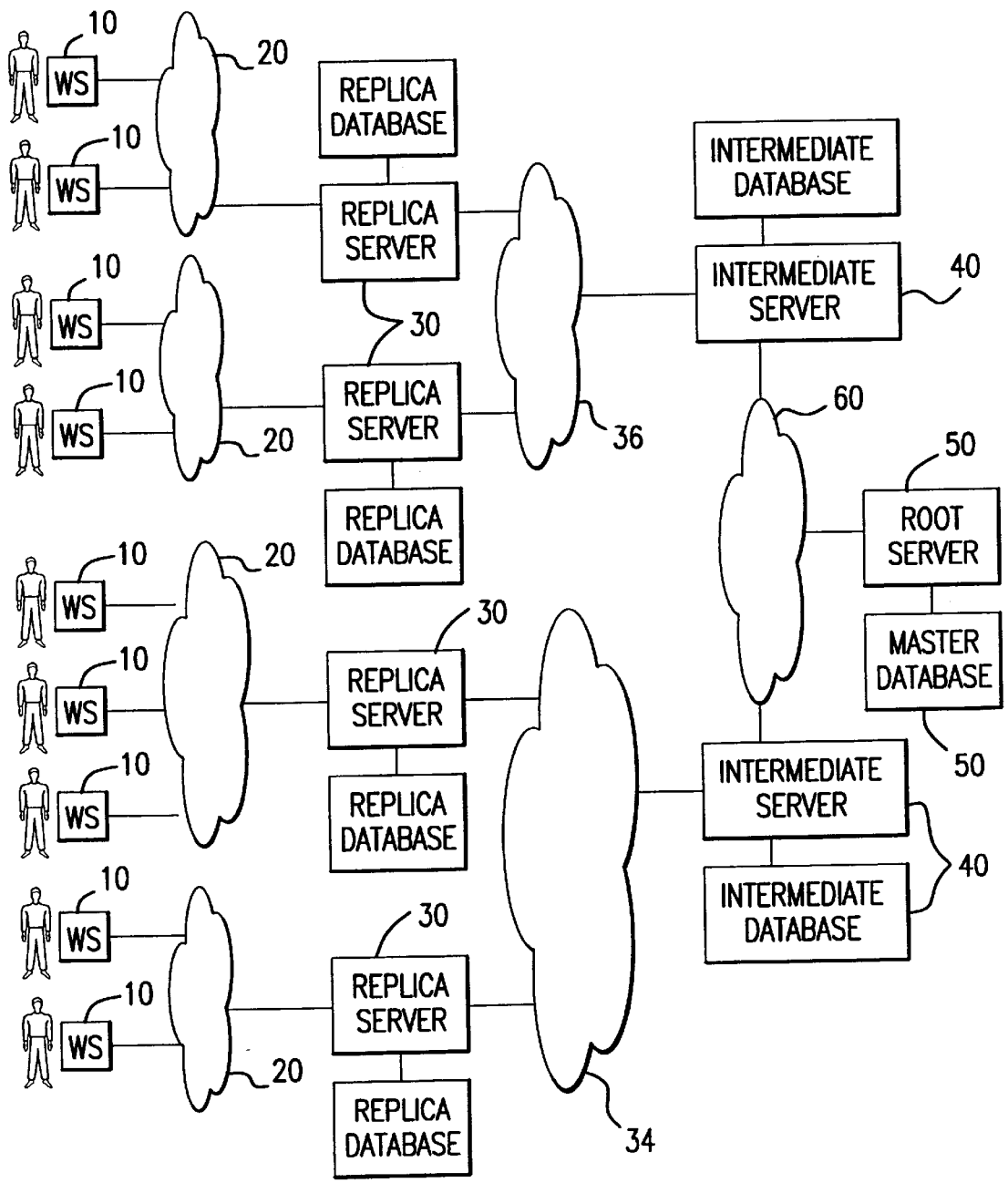
FIG. 2 illustrates an alternative embodiment.

FIG. 2 illustrates an alternative embodiment. In such an alternative embodiment, all of the user's account information is stored in the master database 50. Thus, there is no need for a user to access a separate broker/dealer server and database to obtain approval for transactions conducted on the system. This embodiment can be supported by the computer architecture discussed in connection with FIG. 1 except that the broker/dealer computer is not used. That is, as illustrated in FIG. 2, the root server 50 communicates with optional intermediate servers 40 which in turn communicate with replica servers 30. The replica servers interact with users' workstations 10. In this embodiment the servers store information relating to users' accounts and portfolios as well as to the data discussed above. This information is dynamically updated as a result of user transactions.

FIG. 3 is a flow diagram illustrating the operation of the preferred system for the user-to-user trades. This flow diagram provides an example of the steps by which a user connects to the system of the preferred embodiment, requests and receives a displayed order book for a selected stock, and purchases shares of that stock. Based on these examples, a person skilled in the art will understand how other sequences of operations for user-to-user trading can be performed. Also, based on this example, a person skilled in the art will understand how traditional trading during the day on national exchanges is performed in the preferred system. Preferably, traditional trading is accomplished on the broker/dealer system, except that real-time quotes for selected securities are continuously provided by the system.

To connect to the trading system of the preferred embodiment, a user at step 310 first activates the application which generates on the display screen of the user's workstation a connection status display (see FIG. 53) that establishes a connection to the server/database of the user's broker/dealer. As noted, in the preferred embodiment, the application is a computer program resident and executable at a user's workstation. When the user's ID and password are verified by the broker/dealer's server, the application establishes at step 314 a second, contemporaneous connection to the load balancer 20 for the replica servers 30. At any one time it is expected that a large number of individuals will be connected to the hierarchical server and database structure 55 as well as to a selected broker/dealer server and database 42 of their choice. The load balancer determines to which replica server 30 each user should be connected to so as to substantially evenly distribute the load among the replica servers. This determination may be based on criteria such as which-replica server has the least number of users connected, which replica server is next in order, or on other considerations known in the art. The load balancer then transfers, at step 318, the user's connection to the selected replica server 30. The selected replica server and the broker/dealer server then provide to the user's workstation the information needed by the application to generate various displays. To avoid undue repetition, the subsequent description often describes a user's application as connecting to a replica server, instead of describing the application as first connecting to a load balancer and then to a replica server. It will be readily apparent to those skilled in the art that in such cases a load balancer, although not mentioned, is understood to be the initial connection point.

At step 322 the user selects a stock of interest by typing the stock symbol into an appropriate display (see FIG. 6, slot 642); and at step 326 the application at the user's workstation sends the identity of the selected stock to the replica server 30. The replica server and database then adds this user to the subscriber list for the order book of the selected stock. See step 330. That is, the user is listed as a user who is to receive order book information for the selected stock. Thereafter, at step 334, the replica server sends order book information to the user's application and continues to send updated information to the user's application in real-time. As indicated at step 338, the application uses the order book information to fill in the order book display (see FIG. 6) and related displays. The user then views the order book display and related displays. Assuming that the user decides to sell some of his/her holdings in the displayed securities, at step 342 he/she fills in a trade ticket (see FIG. 11) for a sell order and selects the "Verification" button on the trade ticket display. (Alternatively, at this point, the user may choose to purchase securities. The purchase transaction is discussed below in connection with steps 374–398). As indicated, at step 346, the user then views the final verification screen (see FIG. 56) provided by the application and selects the "Send" button. In response, the order is transmitted to the server and database of the user's broker/dealer, which checks, at step 350, whether the user has sufficient shares in his account for the requested transaction. The preferred embodiment does not provide for a short-sell option in the user-to-user trading, although this capability may be provided in the alternative embodiment, as understood by a person skilled in the art. Short-selling is customarily provided for trading during the day on a broker/dealer system.

If the transaction is approved, at step 354, the server of the broker/dealer sends the user's approved sell order to the root server 50, which attaches a system ID to the order, identifying the user's account, his order (stock symbol, size, price, and whether buy or sell), and his broker/dealer. At step 358 the root server 50 updates the master database with user's order, and revises the order book for the selected stock. The new sell order information is transmitted, at step 362, to the replica servers 30 which update their respective replica databases to reflect this sell order. Each replica server, which is connected to users that are listed as subscribers to the order book of the selected stock, sends at step 366, the updated order book information to the subscribers' applications, including the user's offer. The applications receive this sell offer and, at step 370, display the offer in the order book displays of the subscribed users. Although the order book information is provided from the appropriate replica server, the account information is preferably provided from the broker/server system.

Subsequently, another user who is likewise connected to the hierarchical server and database structure 55 as well as to a broker/dealer server 42 of his choice sees the first user's sell offer and, at step 374, accepts the offer (executing a buy order). The buy order, along with an ID assigned to the corresponding offer to sell, is transmitted at step 378, to the server and database of the buyer's broker/dealer using another, preferably Internet, connection that the buyer has to his broker/dealer system. The buyer's server checks, at step 382, whether the buyer has sufficient funds or credit in his account to purchase the stock offered by the seller. The buyer may purchase stock on margin if he has a margin account and sufficient credit with the broker/dealer. Also, a broker/dealer may not authorize a transaction if buyer's profile and preference do not correspond to the characteristics of the security that he wants to purchase.

If the transaction is approved, at step 386, the buyer's broker/dealer sends the approval of the order along with sufficient information to identify the buyer and the order to the root server 50. At step 390 the root server 50 notifies the broker/dealer systems of both parties of the details of the transaction so as to identify which funds and shares must be transferred to which accounts, updates the master database to reflect the completed transaction, and transmits the updated order book information to the replica servers. The replica servers then update their respective databases and, at step 394, transmit the updated order book information to the subscribing users. In the updated order book, the accepted offer to sell has been removed. The broker/dealer servers of both parties to the transaction notify the applications of the parties that the transaction is confirmed (by updating the open positions and related displays, and preferably also by email), and at step 398, the applications update the current positions and related displays of the parties to the completed transaction. The exchange of securities and money takes place subsequently in a conventional way between the broker/dealers of the buyer and the seller.

Figure 4:
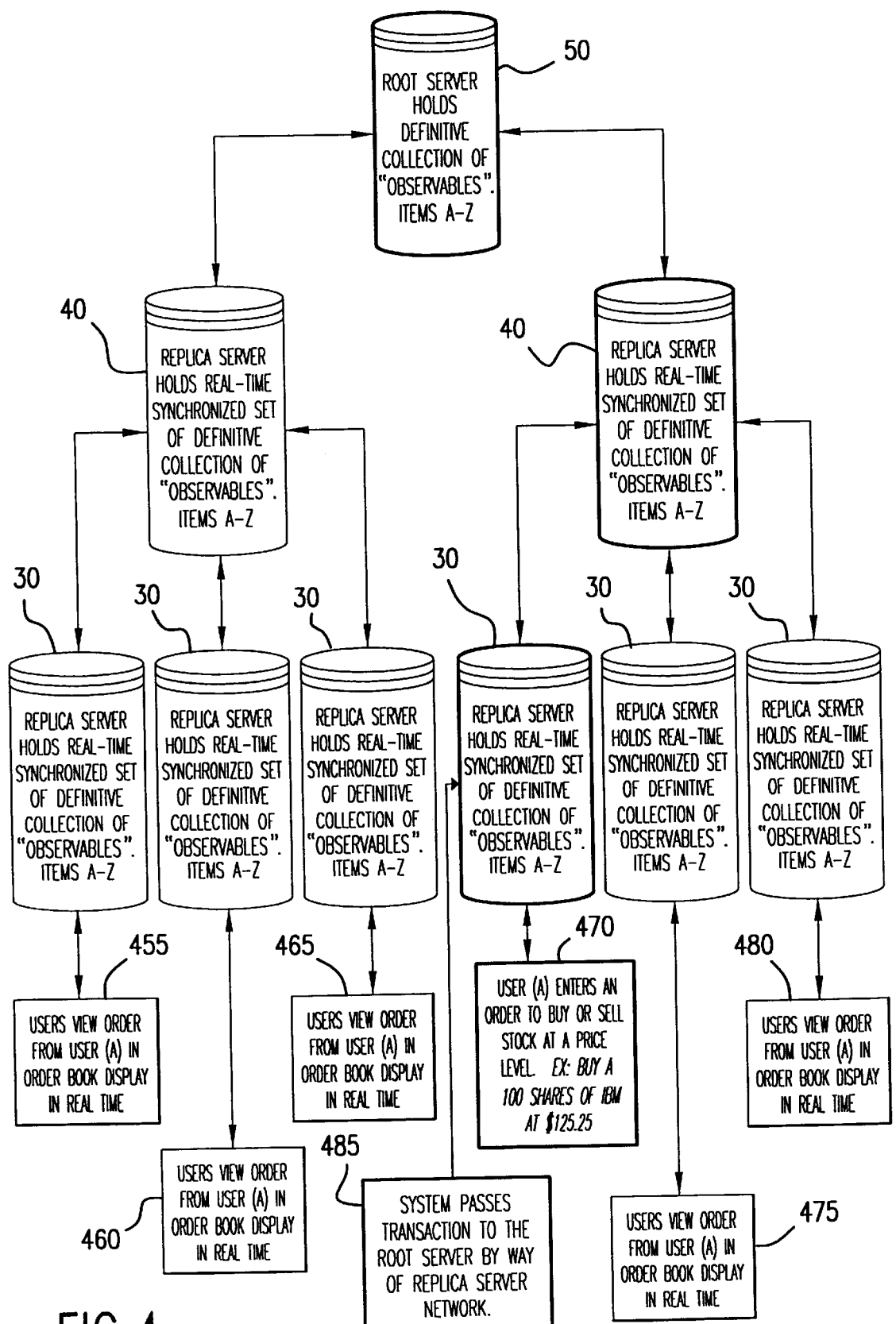
FIG. 4 illustrates how the alternative embodiment illustrated in FIG. 2 enables the real-time updating and transmission of information.

FIG. 4 illustrates how the alternative embodiment illustrated in FIG. 2 enables the real-time updating and transmission of information. In general, when a user provides new data to the replica server that his work station is connected to, this data propagates to the root server 50. From the root server 50 it then propagates to all the other replica servers. For example, user (A) enters at 470 an order to buy or sell a security at a certain price level (e.g., buy 100 shares of IBM at $180.00). The system then passes the user's order via step 485 to the root server 50 through an intermediate server 40. The root server 50 then records the order and re-transmits the information through all the intermediate servers 40 and to all of the replica servers 30, so that all databases remain synchronized. The front-line replica servers then transmit the user's order to the other users 455, 460, 465, 475, and 480 who are on the subscriber-list for the security on order. If any of those users accepts the order of user 470, this information goes up and down the chain the same as the order from user 470.

FIG. 5 illustrates a graphical user interface (GUI) of the preferred embodiment. The depicted screen, known as the master trade screen, comprises several parts. The upper left part is a visual quote and order book display 500 (see detailed view in FIG. 6). Below that is a trade ticket 510 (detailed view in FIG. 11). The upper-right part is a news and information display 540 (detailed view in FIG. 10). Just below that is an open orders display 545 (detailed view in FIG. 7). Immediately below that is a current positions display 550 (detailed view in FIG. 8). Just below that is a financial summary display 560 (detailed view in FIG. 9). Below that is a stock summary display 520 (detailed view in FIG. 12). At the bottom of the master trade screen are function buttons 530 (detailed view in FIG. 15).

The function buttons 530 are of sufficient size to allow for the display of full-length labels sufficient to ensure maximum comprehension by the user. They are also of sufficient size and height to allow for the insertion of descriptive labels in languages requiring long character strings (German, e.g.). This feature enables the easy customization of the GUI for global markets.

The order in which the screen components 540, 545, 550, and 560 are displayed in the right-hand display area can be altered based on user selections provided by permutation of the order in which the function buttons in bar 530 are selected. The buttons 530 are also used to remove the screen components 540, 545, 550, and 560 by a single click selection of the corresponding button on the function button bar 530. When screen components 540, 545, 550, or 560 are shown in the master trade screen, the corresponding function buttons are highlighted in reverse video.

A user can alter the vertical size of screen components 540, 545, 550, and 560 by selecting and dragging the borders of the components. This feature allows a user to determine the amount of information displayed in each of the screen components 540, 545, 550, and 560. The user can also change the size of the entire master trade screen by dragging the screen borders.

The combination of elements of the master trade screen display enables a user to view critical information necessary to make an effective decision concerning the status of the market in a stock or stocks of interest: current account balances, open orders, positions, news and research, e-mail communication, overall portfolio status, and the condition of all major markets. This information is displayed without the user having to switch to alternate screen views and without using overlapping windows. The order book display 500 (and the related displays—most viewed stocks display, chart display, and most active stocks display—see FIG. 57B) and the stock summary display 520 are provided by the application software based on data received from the replica server 30. The open order display 545, current positions display 550, and the financial summary display 560 are provided by the application software based on data received from the server of the user's broker/dealer. Each of the displays 500, 510, 520, 540, 545, 550, and 560 has a "Help" button in the upper right hand corner that provides a multi-level help system as set forth in greater detail in conjunction with FIG. 26.

Figure 6:
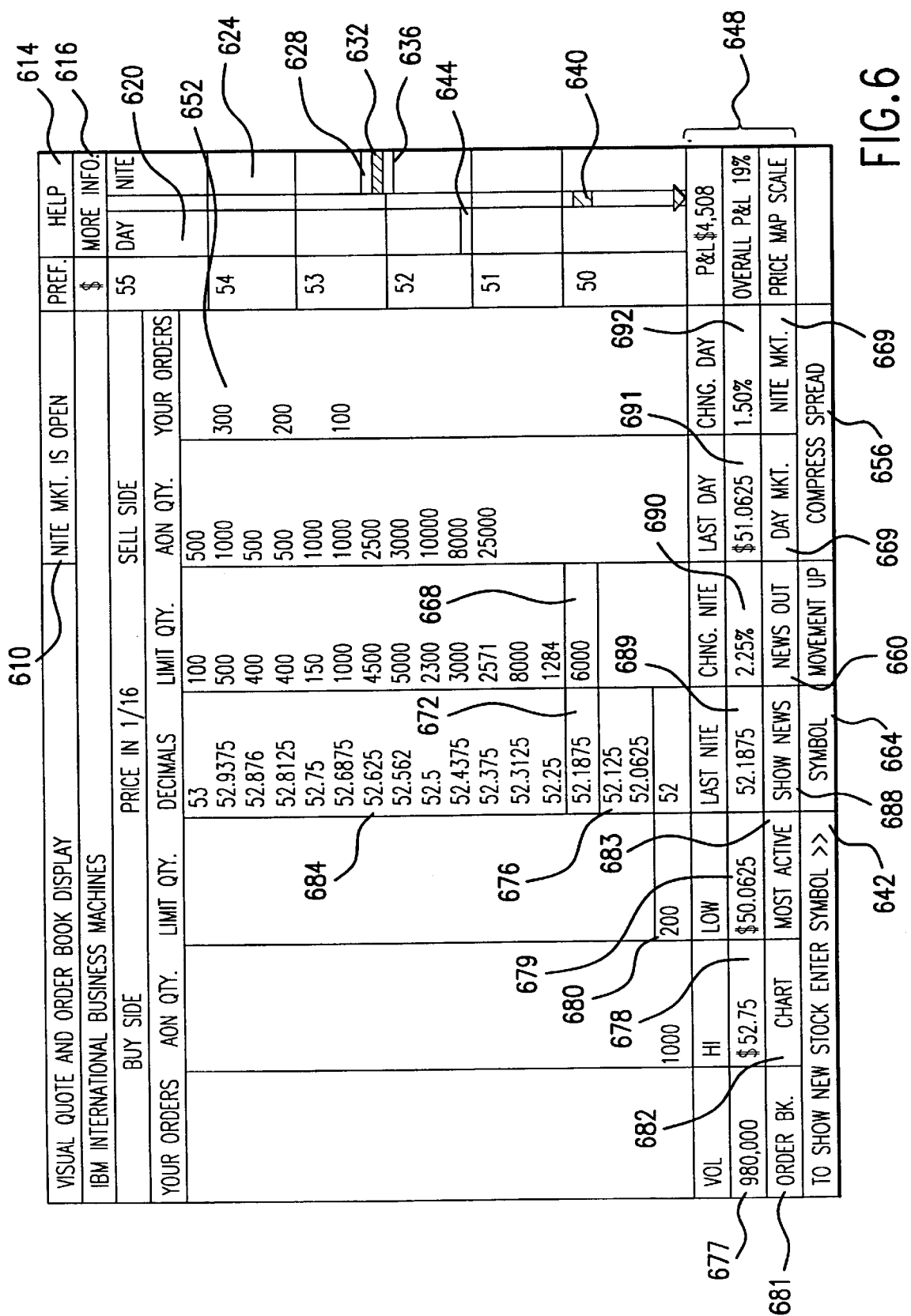
FIG. 6 depicts a visual quote and order book display.

FIG. 6 depicts a visual quote and order book display 510 for use in user-to-user after hours trading, and to display national market information. The status of the market (open or closed) is shown at 610. The three columns 614 at the right comprise a compressed view pricing map, which shows a simplified view of the bid, ask, and spread for the stock in active trading and also shows the last trade of the day on the national exchange. The user's position is also displayed and is based on the average price of the shares held in the user's account. It is shown by the graphic indication 640 on the vertical price scale section. This graphic indication is an analog representation of the user's average price for the shares held in the stock shown in the price map display 614. If the user's position is off the scale, an indicator is used to show the direction of the user's position. For illustration, such an indicator is shown in FIG. 6 at the bottom of the column containing the user's position indicator 640. The information displayed at 648 immediately below the price map display 614 is an alphanumeric summary of the user's average price of the stock, current profit or loss based on the current price of the stock, and the user's overall P&L percent gain or loss. This display is designed to provide a high-level view of the stock and its relative movement compared to the previous market and the user's position. If the user clicks on "More info" 616, he is linked to an after-hours information site. The column 620 under "Day" is the national market indications column. The column 624 under "Nite" is the after-hours market indications column. The horizontal stripe 628 displays the amount of the last trade/ask, and is green. The horizontal stripe 632 immediately below that is a "zoom" view of the detailed spread, and is black. The horizontal stripe 636 just below that is the bid. The horizontal stripe 644 is the last sale price in the national market, for the stock shown. The three displays 648 ("Your pos.," "P&L," and "Overall P&L") display the user's position data on the selected stock, calculated in real-time based on the real-time quote.

The seven columns to the left of the pricing map are the order book display. The order book display enables the user to see at a glance how a particular stock is trading on the user-to-user system. The order book is designed to give a lay user the same type of information that is available to brokers at the national exchanges.

The center column under "Decimals" is the price column, and lists stock prices in 1/16 increments. The three columns to the left of the price column set forth buy side orders and the three columns to the right set forth sell side orders. The "Limit Qty." and "AON Qty." columns list the size of orders at each price level posted into the system by other users. The Your orders show columns the user's order in the stock. The area 668 (in this example, containing the number 6000) contains the amount of the current ask size. The area 672 (in this example, containing the number 52.1875) contains the amount of the current ask price, and is highlighted in yellow.

The area 676 contains the price spread, and has a black background. The area 680 contains the current bid size (here, 200), and the current bid price (here, 52). It is highlighted in yellow. The "Order Bk." button 681 is selected to call into view the order book display as shown. The button 656, "Compress spread," compresses the spread and orders included in the spread down to one line. The compressed view shows the last bid, best offer, and a single line spread shown on a red background with white characters (see FIG. 54). The quantity shown in the red bar is the total price of the spread in one line. If there are "all or none" (AON) orders contained within the spread they are shown as total amounts. When the display shows the compressed spread, the button 656 shows the label "Expand spread." Clicking the button 656 then returns the display showing the full, evenly incremented spread. The button 664 ("Symbol") is selected when the user wants to display a different stock. When the button 664 is clicked, a data field is displayed wherein the user may enter the symbol of the new stock to be displayed.

Figure 14:
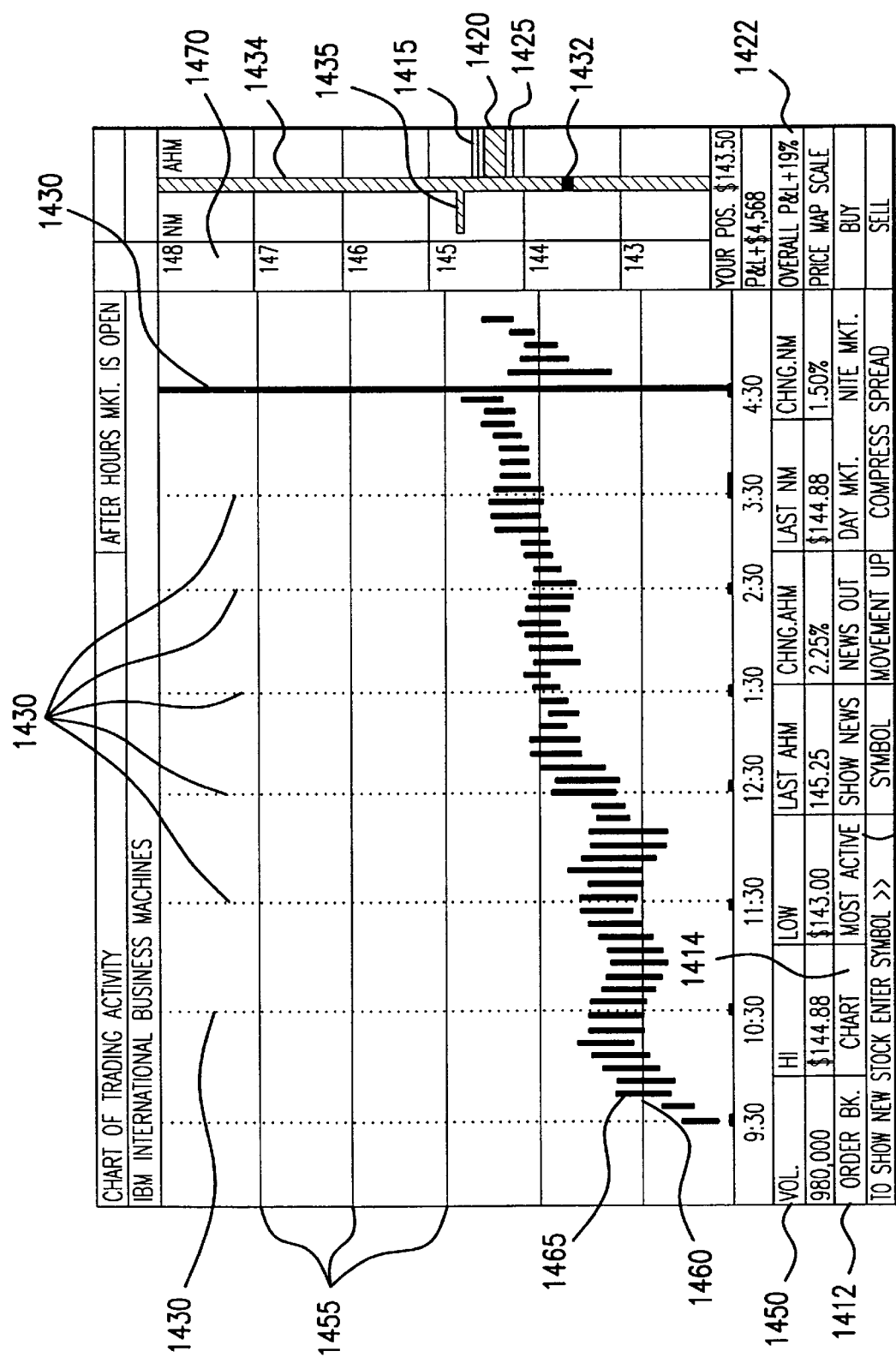
FIG. 14 depicts a real-time chart of stock activity.

When the "Chart" button 682 is selected, the order book display is replaced with the chart of stock activity displayed as in FIG. 14. When the "Most active" button 683 is selected, the stock summary display shown in FIG. 57A is displayed, with the most active stocks shown in real-time and updated in real-time. The "News out" button 660 flashes or is highlighted when news is out on the stock in view. The "Show news" button 688 causes screen component 540 to show the current news summary and details for the selected stock. An alternative means of displaying the stock order book, chart, and news is by double-clicking the desired stock shown in the stock summary display. The "Vol." number 677 indicates the volume of shares traded in the currently active market (national market or after-hours market). The "Hi" price 678 is the high sale price for the selected stock during the current trading session. The "Low" price 679 is the low sale price for the selected stock during the current trading session. The "Last Nite" number 689 shows the last sale price in the after-hours market. The "Chng. Nite" number 690 shows the percent change in the after-hours market. The "Last Day" number 691 shows the last call in the national market. The "Chng. Day" number 692 shows the percent change in the national market. The "Day Mkt" and "Nite Mkt" buttons 669 toggle the displayed "Vol.," "Hi," and "Low" numbers 677, 678, and 679 between the after-hours market and the national market.

FIG. 7 depicts an open orders display 545. This display shows the user's orders that have not yet been completed. A "Change" button 710 at the lower right is used to change an order that is still open (see FIG. 23 for a description of how an open order is changed). A "Cancel" button 730 at the lower left is used to cancel an order that is still open (see FIG. 24 for a description of how an open order is canceled). A "Sort" button 720 is used to display the open orders according to different parameters.

FIG. 8 depicts a current positions display 550. For each security in the user's account as identified by a standard symbol, the display indicates the number of units held, the cost per unit, the current price, the change in value and the dollar amount of the profit or loss. The "Sell" button 810 is used to pre-populate a trade ticket with a selected stock's information as listed in the user's current positions display. A conventional Windows-type scroll bar and up and down keys on the right hand side of the display are used to move a selection bar through the display of stocks. The "Sort" button 820 is used to sort the displayed positions by different parameters (price, quantity, etc.). The "Reports" button 830 is used to request news on the selected stock.

FIG. 9 depicts a financial summary display 560. The balance for each category is shown in the "Balance" column 910. The profit or loss for each account category is shown in the "Profit/loss" column 920. The change in each account category for the day is shown in the "Change/Day" column 930. The change in each account category for the year-to-date is shown in the "Change/YTD" column 940. The "Equities" row 945 lists the user's equities account information. The "Mutual Funds" row 950 lists the user's mutual funds account information. The "Grand sum" row 955 lists the user's summarized account information. The "Cash acct." row 960 shows the funds in the user's cash account. The "Margin" row 965 shows the funds in the user's margin account. The "Open orders" row 970 shows the value of the user's open orders. The "Negotiations" row 975 shows the value of the stocks the user has in negotiations. The "Buying Power" row 980 shows the user's buying power.

FIG. 10 is a news and information display. The news and information display is actually a customized Internet web browser, and its functionality is derived from that fact. For example, when the "Show Email" button 1010 is selected, a standard email server interface is displayed (see FIG. 55). The "Search" slot 1030 is used in the same manner as the "Address" slot in Internet Explorer and the "Location" slot in Netscape Navigator. The "Back," "Forward," "Home," and "Bookmarks" buttons, e.g., function the same way as their counterparts in other browsers. If the email display is being shown, the user clicks the "Show news" button 1020 to return to the news display.

Figure 11:
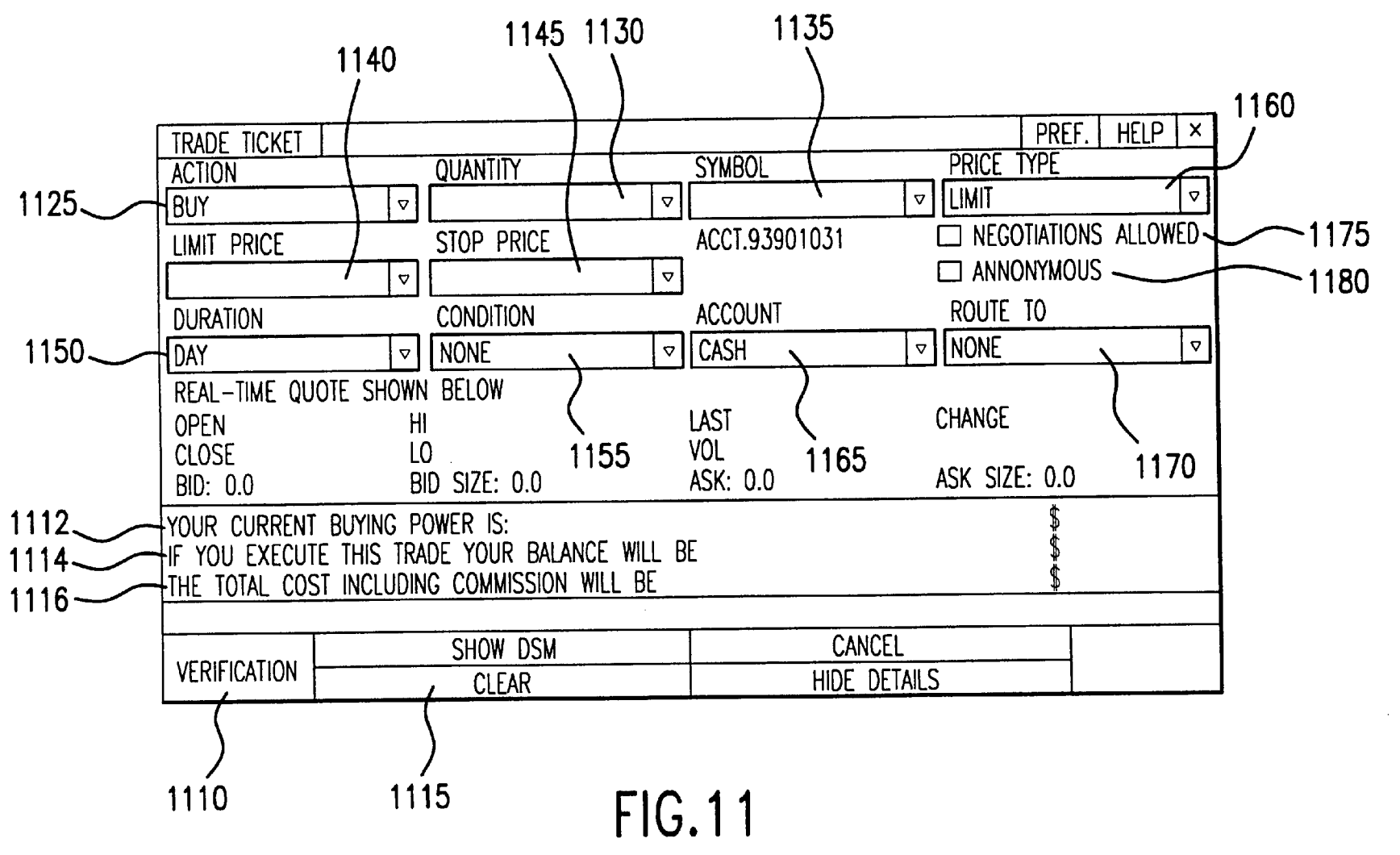

FIG. 11 depicts a trade ticket display 510. The "Action" slot 1125 is used to indicate whether the order is a buy order or a sell order. The "Quantity" slot 1130 is filled in with the number of shares in the user's order. The "Symbol" slot 1135 is filled in with the symbol of the stock the order is for. The "Limit" slot 1160 is used to indicate the nature (e.g., limit, stop) of the order. The "Limit Price" slot 1140 is filled in if the order is a limit order. The "Stop Price" slot 1145 is filled in if the order is a stop order. The "Duration" slot 1150 is used to indicate the duration of the order (e.g., day, good till canceled). The "Condition" slot 1155 is used to indicate whether there is a condition on the order (e.g., all or none). The "Account" slot 1165 is used to indicate the type of account used. The "Route to" slot 1170 is used to indicate special routing instructions (route order to a specific market). The user's buying power is displayed in the line 1112. The user's balance if the proposed trade is executed is displayed in line 1114. The total cost of the proposed trade is displayed in line 1116. The "Clear" button 1115 clears the trade ticket entries. The "Negotiations allowed" box 1175 is checked if the user is willing to negotiate on the order, and the "Anonymous" box 1180 is checked if the user wishes to remain anonymous. The "Verification" button 1110 is clicked to display the "Final Verification" screen.

Figure 12:
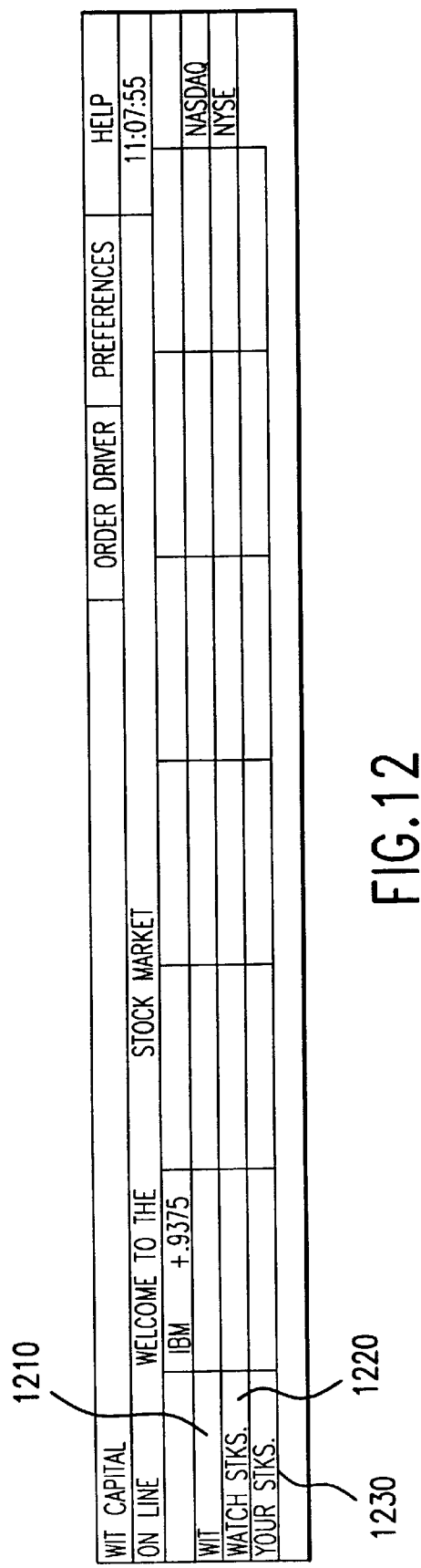
FIG. 12 is a stock summary display.

FIG. 12 depicts a stock summary display. The button "WIT" 1210 at the left of the summary screen display is clicked to display the most active stocks in the trading system. When the button 1210 is clicked by the user, the application notifies the replica server, which then sends the required information back to the user's computer, where the application displays the most active stocks on the system. The button "Watch stks." 1220 is clicked to display stocks the user has added to his "watch list" (same as "wish list"; see FIG. 51). The button 1230 is used to display stocks the user holds in the system.

Figure 13:
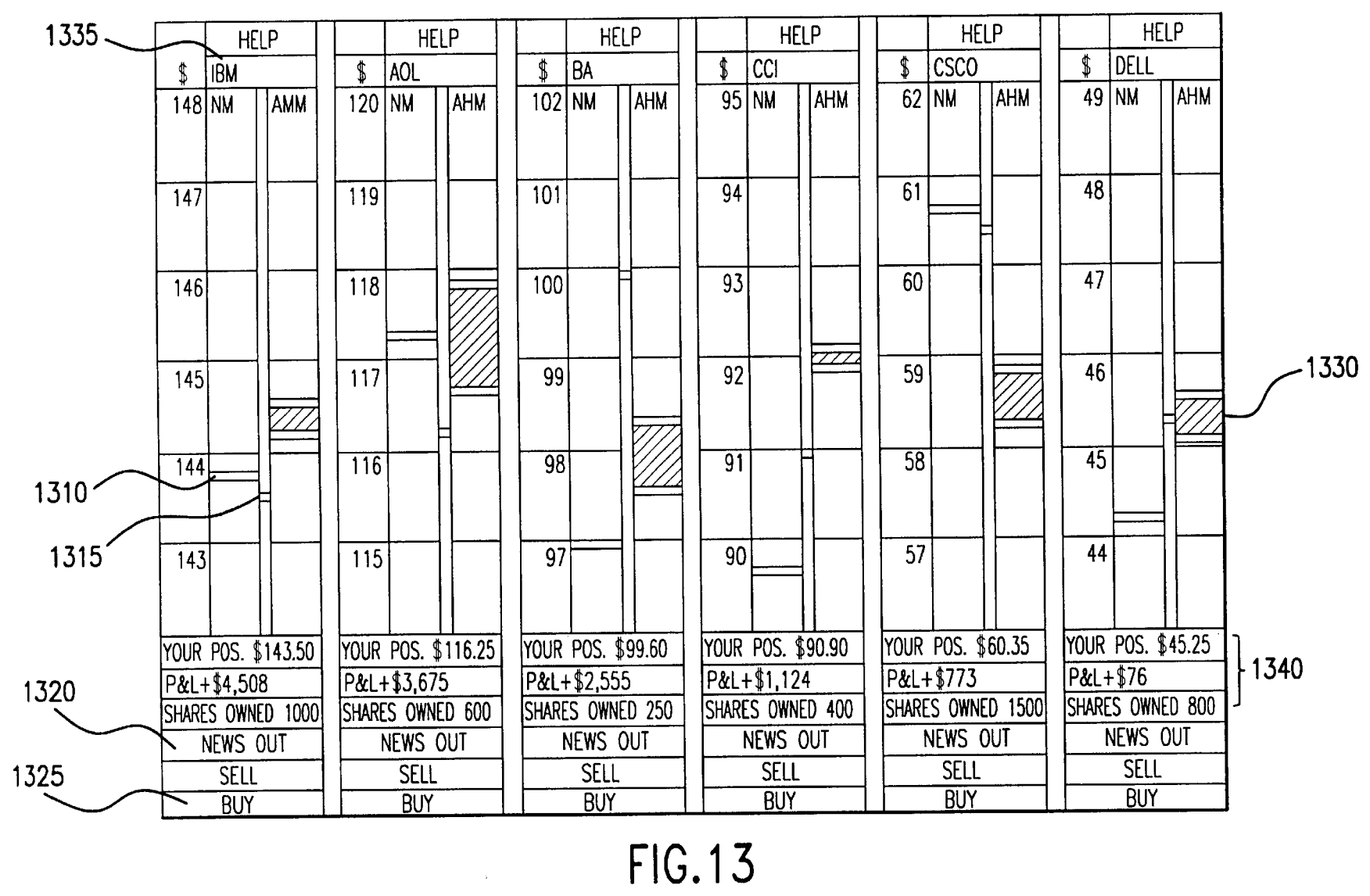

FIG. 13 depicts a multiple pricing maps display. Illustratively, FIG. 13 shows pricing maps for six different stocks in the after-hours market. Each pricing map provides the same information in the same format as that in the pricing map depicted in columns 614 of FIG. 6. The identity of each stock is shown at the top of the pricing map 1335. If the user double-clicks on the closing price of the stock 1310 in the national market (NM), a chart view of the stock is displayed (see FIG. 14). If the user double-clicks on the spread 1330, an order book display (see FIGS. 5 & 6) for the selected stock is provided. The "News out" status indicator 1420 flashes when news is out on the stock that may have an effect on the stock's movement. To pull up news in a display on the right hand panel of the interface, the user double-clicks on the "News out" indicator. If the user double-clicks on a Buy button 1325 (or a Sell button), the application automatically pulls up a trade ticket (see FIGS. 5 & 11) that is filled with data from the user's positions file. The selection of "Sell" populates the trade ticket with the user's entire position in the selected stock. The selection of "Buy" populates the trade ticket with information including a default quantity value set in the preferences menu by the user. The user can double-click on the best bid or offer and hit or take the quantity at that price level. This action automatically populates the trade ticket with the selected price. The user can adjust any values in any pre-filled fields. The red box 1315 in the center section of each pricing map shows the average price of the user's shares in the stock. This is a graphic analogue of the user's average price in the selected stock as shown in the user's positions file. A double-click of the red box 1315 brings the selected stock to the -top of the user's positions file. If the user has multiple purchases in his file, the largest quantity is shown first. The values 1340 are updated in real-time as the market moves.

FIG. 14 depicts a real-time chart of stock activity. The thick black vertical line 1410 shows the close of the national market and the opening of the after-hours market. Line 1410 is blue. A similar line, not shown in FIG. 14, shows the closing-of the after-hours market and the opening of the national market. The vertical lines 1430 show hour-long increments. A pricing map is shown on the right hand side of FIG. 14 and displays essentially the same information in the same format as that depicted in columns 614 of FIG. 6. The horizontal bar 1415 shows the last trade/ask price in the after-hours market (in FIG. 14, the after-hours market is the market that is open). The bar 1415 is green. The horizontal bar 1425 is yellow, and shows the current bid price. The area 1420 between the bid and ask is the spread, and is in black. Since the national market is closed, the last price on the national market is indicated by the horizontal bar 1435, and that bar is green. The vertical bar 1434 has an indicator 1432 (preferably red) showing the user's average share price in the stock shown. If a user's position in the stock shown is not viewable within the scale of the price chart a visual indication is shown at the top or bottom of the user's position column 1434 indicating the direction in which the user's position sits with respect to the current market. The horizontal bar 1450 optionally contains a scroll bar (not shown) which permits the user to scroll horizontally over the past 24-hour period. The horizontal lines 1455 are price level lines which permit the user to quickly visualize pricing trends; the dollar values are provided in column 1470. The price increments can be changed by clicking on the "Price map scale" button 1422, and then choosing $1, $5, or $10 from the pop-up menu (not shown here, but see, e.g., FIG. 60, which has the same menu displayed under the "Price map scale" button). There are stocks whose daily fluctuations vary widely. The price map scale permits the user to visualize wider price ranges by selecting price scale increments of $1, $5, and $10. Such a selection re-scales the vertical axis of the price map to allow visualization of the entire day's trade range. As the price map's vertical scale changes, the dollar increments change but the vertical scale divisions do not change. The chart view of the stock will either expand or contract based on the scale values selected.

The short vertical bars 1460 show the market spread at the time indicated. In the national market, these bars are black; in the after-hours market, they are blue. The short marks 1465 on the bars 1460 indicate the last trade price for the stock. In both the national market and the after-hours market, the marks 1465 are green. The "Order Bk." button 1412 allows the user to change the display from the chart display to the order book display (see FIG. 6). The "Most active" button 1416 allows the user to change the display from the chart display to the most active display (see FIG. 57A).

Figure 15:
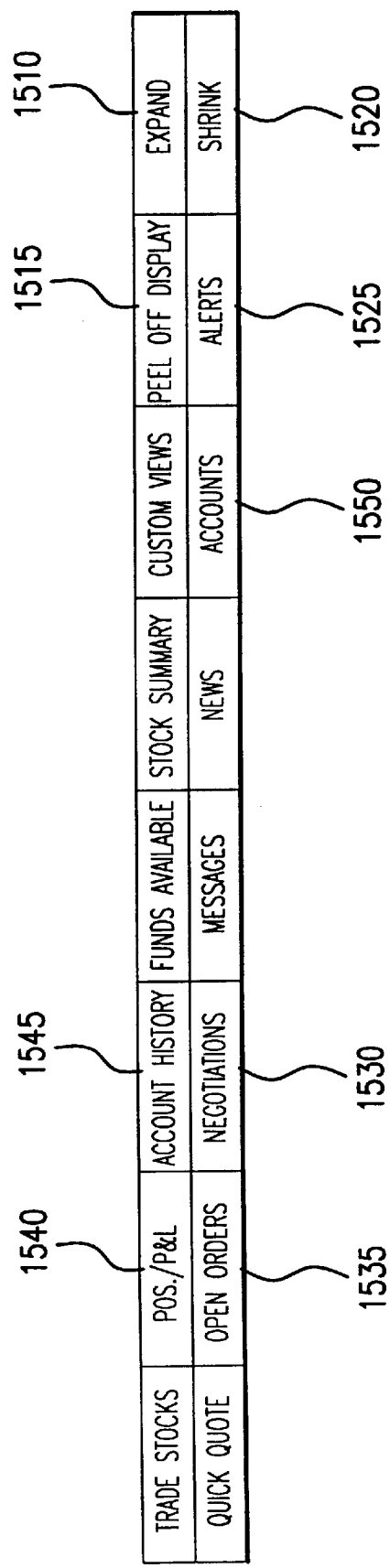
FIG. 15 is a function button display.

FIG. 15 depicts a function button display 530. The Shrink button 1520 is used to shrink the display.

Figure 16C:
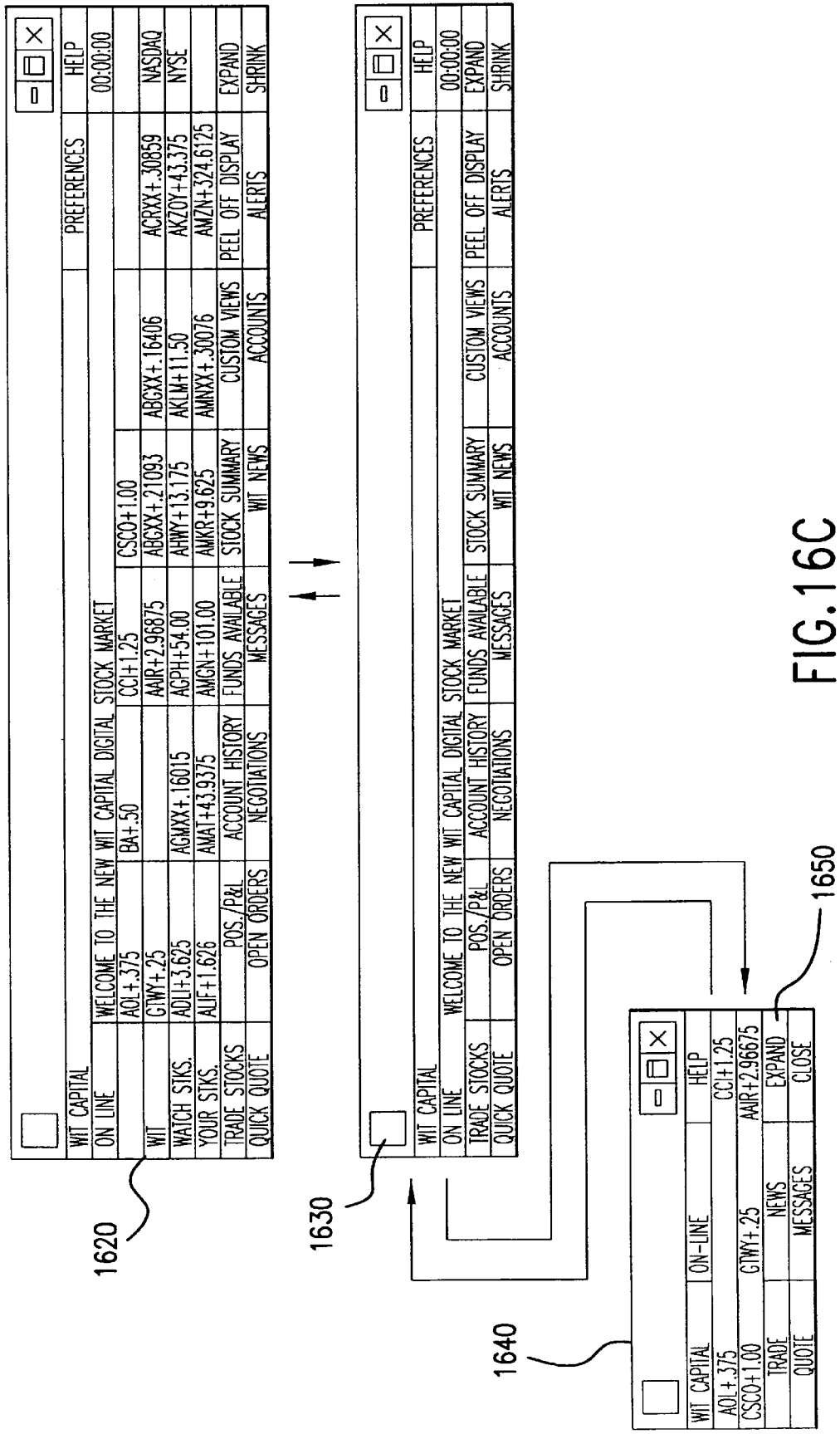
FIG. 16 is an illustration of four different views available through expanding and shrinking the master trade screen.
Figure 28:
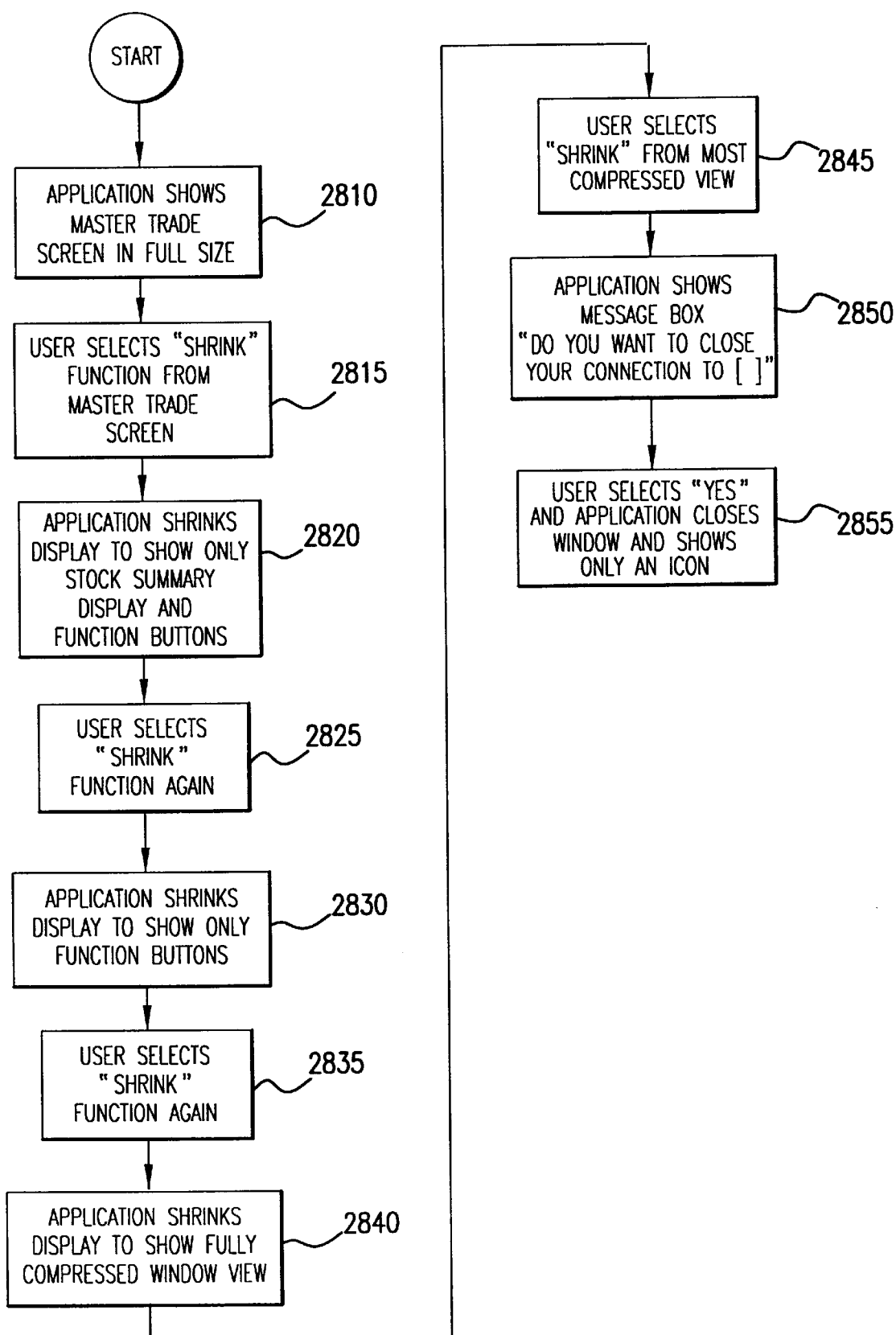
FIG. 28 is a flow diagram illustrating the computer steps required for compressing the view of the master trade screen of the GUI of the preferred embodiment.

FIG. 16 illustrates four different views available through expanding and shrinking the master trade screen. If the initial view is the full master trade screen 1610, the user clicks the "Shrink" button 1520 to change the view to just the summary stock display and the function buttons shown in 1620. If the "Shrink" button 1520 is clicked again, the view shrinks to just the function buttons 1630. If "Shrink" is clicked again, the view is changed to the fully compressed view 1640. Finally, if "Shrink" is clicked one last time, the application displays the message box: "Do you want to close your connection to [the system of the preferred embodiment]?" If the user selects "Yes," the application closes the display and only the icon of the subject system is displayed. FIG. 28 provides a flow diagram depicting the operation of the Shrink button 1520.

Returning to FIG. 15, the "Expand" button 1510 is used to expand the display. See FIG. 29 for a detailed description of how the expand button operates. The "Peel off display" function button 1515 is used for displaying several order books at once (see FIG. 27). The "Alerts" function button 1525 is used to set alerts on stocks of interest (see FIGS. 30 & 52). The "Open orders" function button 1535 is used to display the user's list of open orders (see FIG. 34). The Positions and P&L ("Pos./P&L") function button 1540 is used to display the user's positions and profit and loss information (see FIG. 35). The "Account history" function button 1545 is used to call up a display of the user's account history (see FIG. 36).

The application software used in the practice of the invention is described in greater detail in conjunction with FIGS. 17–40 below.

Figure 17:
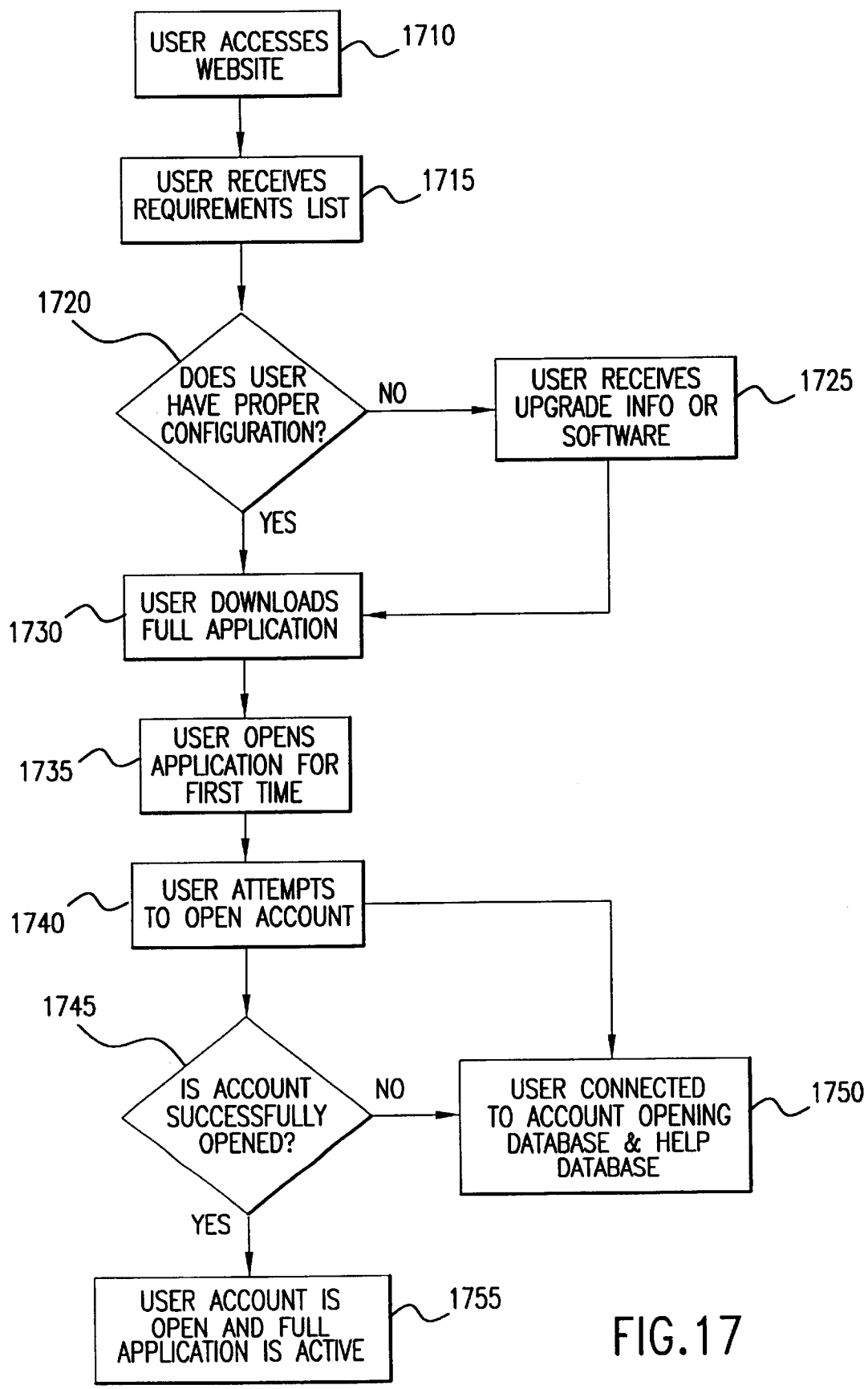
FIG. 17 is a flow diagram illustrating software that enables a user to obtain and install the graphical user interface (GUI) software of the preferred embodiment and open a new account.

FIG. 17 is a flow diagram illustrating software which enables a user to obtain and install the graphical user interface (GUI) component of the preferred embodiment and open a new account. Initially, at step 1710, a user desiring to use the system of the preferred embodiment accesses the Internet website of the system administrator. The user views and/or downloads, at step 1715, the software and hardware requirement list from the administrator's website. At step 1720 the user determines if he has the proper software and hardware are present on his computer. If not, at step 1725, the user obtains upgrade information and URLs (Internet addresses) where the proper software can be obtained. Alternatively, the user is provided with the necessary software by the system administrator, such software being obtained from an application server database maintained by the system administrator.

Once the proper software and hardware are present, at step 1730, the user downloads the full application software from the application server. The user then opens the application on his personal computer. See step 1735. Once the application is opened, the application establishes a connection over the Internet, and at step 1740, the user attempts to open an account. At step 1750 the user receives data from an account opening database and help database of the system, and enters the sequence required for opening an account on the system. If the account is successfully opened, the full application is active for trading based on the balances in the account and other limitations to be determined by the system administrator. See step 1755. If the account is not successfully opened, the user is connected to the system's account opening database and help database for assistance.

Figure 18:
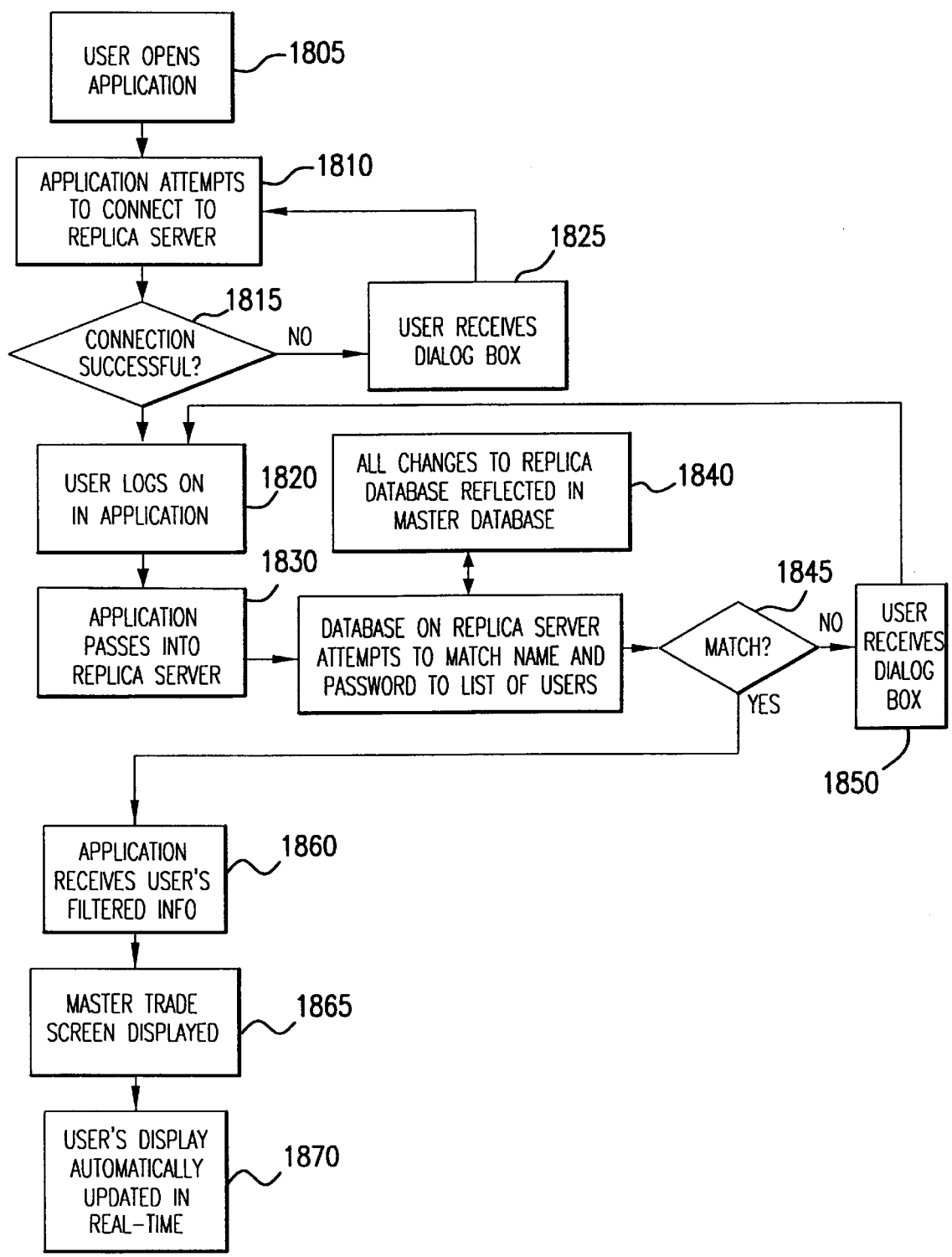
FIG. 18 is a flow diagram illustrating logging onto the system and visualizing the stock market in the alternate embodiment described in FIG. 3.

FIG. 18 is a flow diagram illustrating software for logging on to the system and visualizing the stock market in the alternate embodiment described in connection FIG. 3. Initially, at step 1805, the user opens the application (Java application, in the preferred embodiment). The Java application then, at step 1810, attempts to initiate a connection to a replica server. At step 1815, if the connection to the replica server is confirmed, the user inputs, at step 1820, the user's name and password at the log-on screen (see FIG. 53) of the application. If the connection to the replica server is not confirmed, at step 1825, a dialog box is displayed by the application to the user describing a possible cause of the problem and a possible way to resolve it.

At step 1820 after the connection has been successfully established and the user's name and password have been entered, the application transmits, at step 1830, the user's name and password to the replica database. The database on the replica server then checks, at step 1835, the accuracy of the name and password. If there is no match, the user, at step 1850, again receives a dialog box with an indication of the problem and a possible solution. If there is a match, the replica server notifies the root server that the user has successfully logged on. At step 1840 the changes to the replica database are provided to the master database.

Once the user's logon is complete, the application receives, at step 1860, the user's filtered information based on user's preferences saved on the replica server. In an alternate embodiment, the application receives unfiltered or partially filtered information from the replica database, and the application does further filtering once the information has been received. The application then, at step 1865, displays (depending on the user's display preferences) a master trade screen showing all critical trade data, based on the user's preferences. As the user's position in his stocks changes, the replica database and server, at step 1870, automatically updates the user's display in real-time. Each time a change occurs in the information held on the replica server, the master database is updated accordingly at step 1840.

Figure 19:
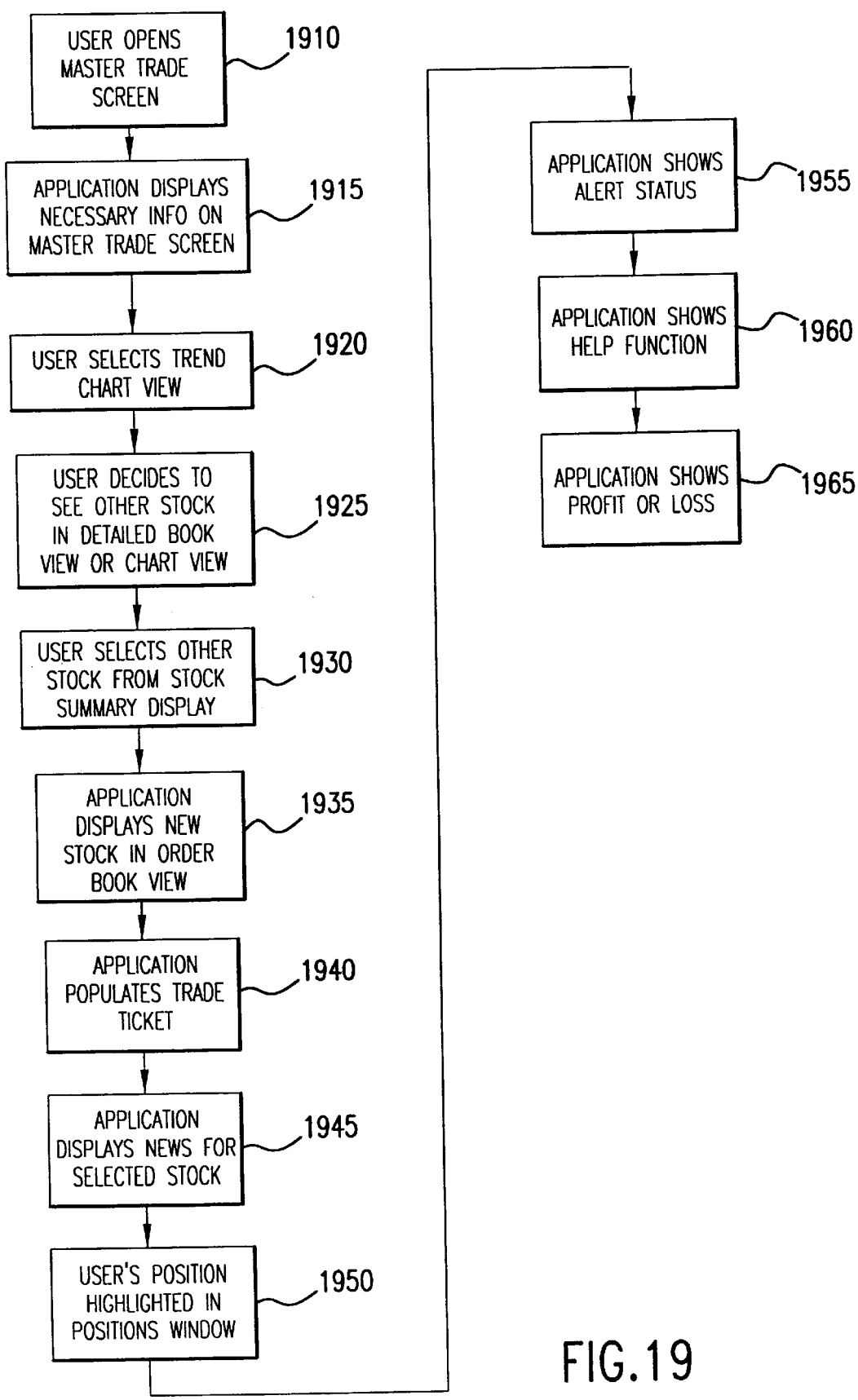
FIG. 19 is a flow diagram illustrating software of the preferred embodiment which enables a user to view trading and account information on one screen and facilitates fast and accurate trading of stocks.

FIG. 19 is a flow diagram illustrating software of the preferred embodiment which enables a user to view critical trading and account information on one screen so as to facilitates fast and accurate trading of stocks. Initially, at step 1910, the user opens a master trade screen. Preferably, the master trade screen is that shown in FIG. 5. The master trade screen, at step 1915, displays all information necessary for the user to make a decision about the status of his account, the status of the stocks of interest, and the status of the markets in general. Illustratively, data displayed on the master trade screen includes a trade ticket, real-time quotes, the user's positions, open orders, an order book display, financial summary, account balances, news and information related to stocks of interest, and other items illustrated in connection with FIG. 5 and discussed herein. After viewing the master trade screen, the user selects at step 1920 a trend chart view to review the trend of the stock of interest in either the national market or the after-hours market.

At step 1925, the user may decide to look at another stock and, at step 1930, he selects the stock of interest from the stock summary display. The application transmits the user's request to the replica server and database, which transmits information on the selected stock back to the application executing on the user's workstation. The application, at step 1935, displays the new stock in the order book view and, at step 1940, populates the trade ticket (see FIGS. 5 & 11) with information regarding the selected stock. At step 1945, the application displays news for the selected stock in the news display (see FIGS. 5 & 10). In addition, the application highlights, at step 1950, the user's position in the selected stock in the positions display. At step 1955, the application indicates the alert status for the selected stock, and, at step 1960, it shows selected help functions in the background. At step 1965, the application shows profit or loss if the user sells his position in the selected stock at the current level shown in the order book display (see FIGS. 5 & 6).

Figure 20:
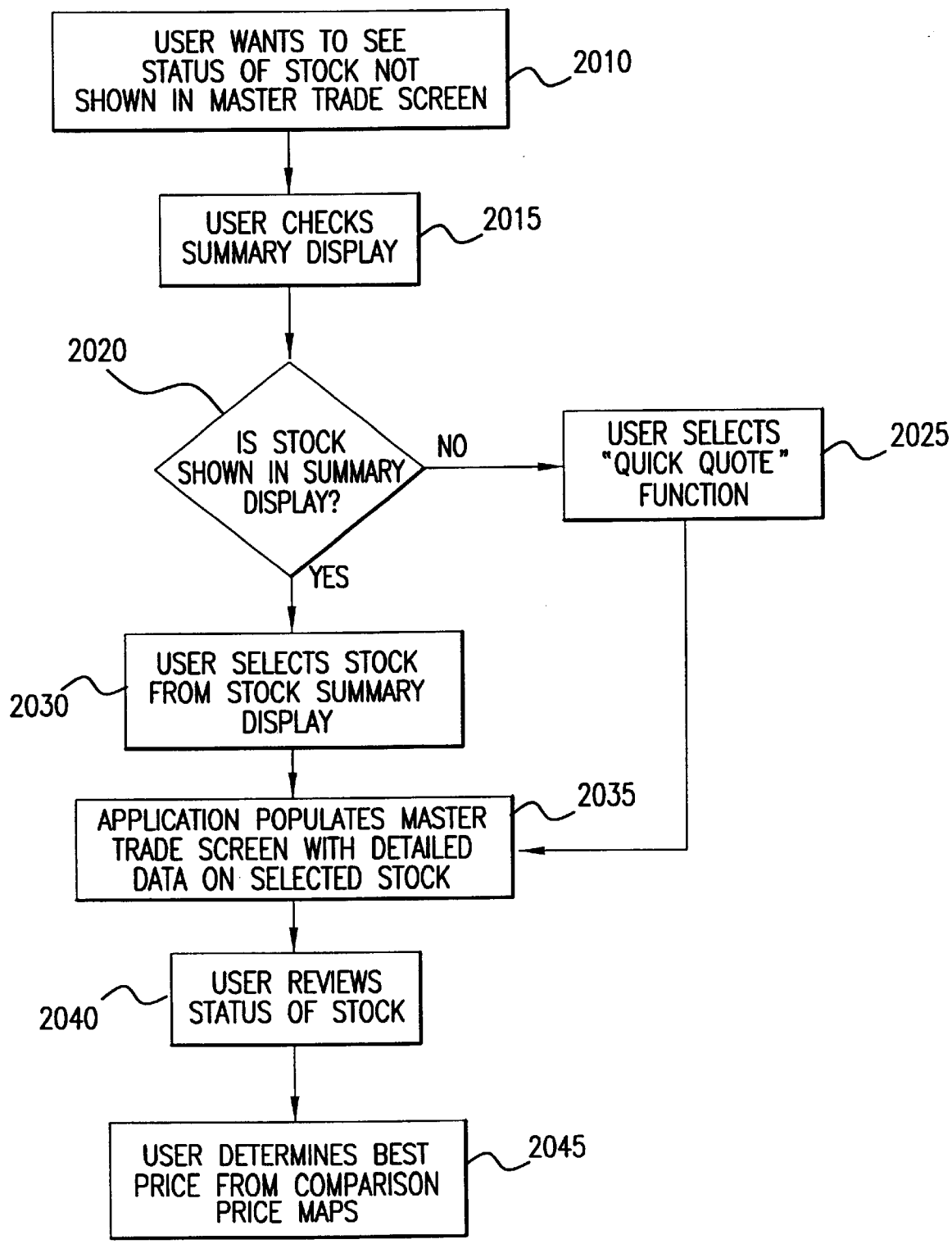
FIG. 20 is a flow diagram illustrating software of the preferred embodiment which enables a user to visualize the detailed market in other stocks with one action.

FIG. 20 is a flow diagram illustrating software of the preferred embodiment which enables a user to visualize the detailed market in stocks. For the purposes of illustration, we assume that, at step 2010, the user desires to see the status of stock not shown in the current master default view. The user then, at step 2015, views basic information on stocks by selecting alternate summary screen views using the stock summary display of FIG. 12. The alternate views are (1) in the stocks the user holds in the system ("Your stks."); (2) stocks that are among the most active in the current market ("WIT"); and (3) stocks that the user wishes to monitor ("Watch stks."). The user switches from one view to another by clicking the appropriate button (1210, 1220, or 1230) at the left of the summary screen display (see FIG. 12). At step 2020, if the stock in which the user is interested is displayed in the summary display, the user selects, at step 2030, the stock from the summary display (by clicking on its symbol) to obtain more detailed information regarding the stock. If the stock is not shown in the summary display, the user selects, at step 2025, the "Quick quote" function to select the stock of interest (see FIG. 51). The user can also enter stock into the stock summary display by typing into or over stock in the wish list. Once the stock has been selected, the application transmits to the replica server the fact that the user is requesting information on a different stock. In response, the replica server provides data on the new stock to the user's application and keeps this information updated in real-time. Next, at step 2035, the application populates the master trade screen with detailed data on the selected stock. At step 2040, the user reviews the status and price of the stock on the master trade screen and, at step 2045, determines the best available price based on the data provided on the master trade screen.

Figure 21:
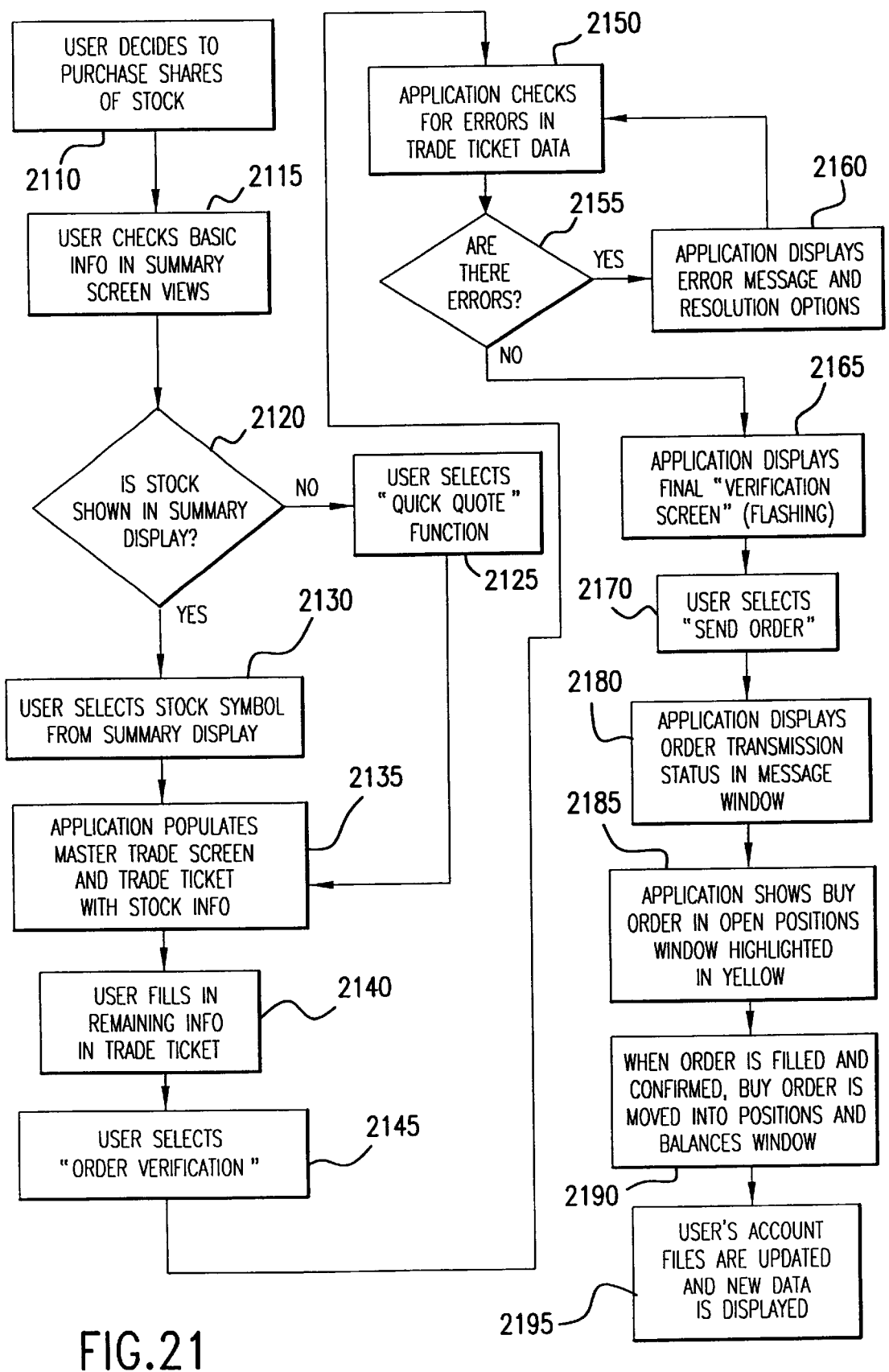
FIG. 21 is a flow diagram illustrating software of the preferred embodiment which enables a user to execute a buy order in a stock.

FIG. 21 is a flow diagram illustrating software of the preferred embodiment which enables a user to execute a buy order for a stock. We assume that the user makes a decision to purchase shares of stock, and at step 2115, the application retrieves and displays summary information including (1) the stocks held by the user; (2) stocks that are among the most active in the current market; and (3) stocks that the user wishes to monitor. If the stock in which the user is interested is displayed as part of this summary (see 2120), at step 2130, the user indicates to the application that he/she desires to view further details regarding the stock listed on the summary display. If the stock is not listed in the summary, at step 2125, the user may select the "Quick quote" function to display data regarding the stock of interest, or by typing into or over stock in the wish list. The user can change the order in which stocks are listed in the stock summary display by using the preference screen to position the stocks by industry, position, size, or P&L.

After the user has selected the stock, the application transmits this data to the replica server. In response, the replica server sends data on the new stock back to the application running on the user's workstation and then updates this data in real-time. At step 2135, the application populates the master trade screen with the relevant information on the selected stock. At step 2140, the user inputs additional information into the trade ticket (see FIGS. 5 & 11). Then, if the user is still satisfied with the transaction, at step 2145, he/she selects the "Order Verification" function, and in response, at step 2150, the application checks for errors in the data entered into the trade ticket. If there are errors (step 2155), then at step 2160, the application retrieves and displays appropriate error messages and, in some instances, suggestions on how to correct the error. Once the application determines that the ticket is error-free, at step 2165, the application displays the "Final Verification" screen (see FIG. 56). At this point, the display flashes, to emphasize the significance of this operation. Thereafter, the user makes the final decision whether to send the buy order, and at step 2170, selects the "Send order" option to facilitate the purchase. The request is then transmitted to the broker/dealer system used by the user.

At step 2180, the application displays the order transmission status in the message line display. The application, at step 2185, illustrates the buy order highlighted in yellow in the open positions display on the master trade screen. If the order has been filled on a national market, the broker/dealer's computer communicates this to the user's workstation. If the order is accepted in the user-to-user market, the buyer's acceptance is transmitted to the root server via replica servers. The root server updates the root database and transmits that information back to the replica servers and databases. Thus the order is always visible as it moves through the execution process; the status of the order is always known. The application moves, at step 2190, the buy order into the user's "Positions and Balances" display. At step 2195, the application displays the account information reflecting this transaction in the master trade screen.

Figure 22:
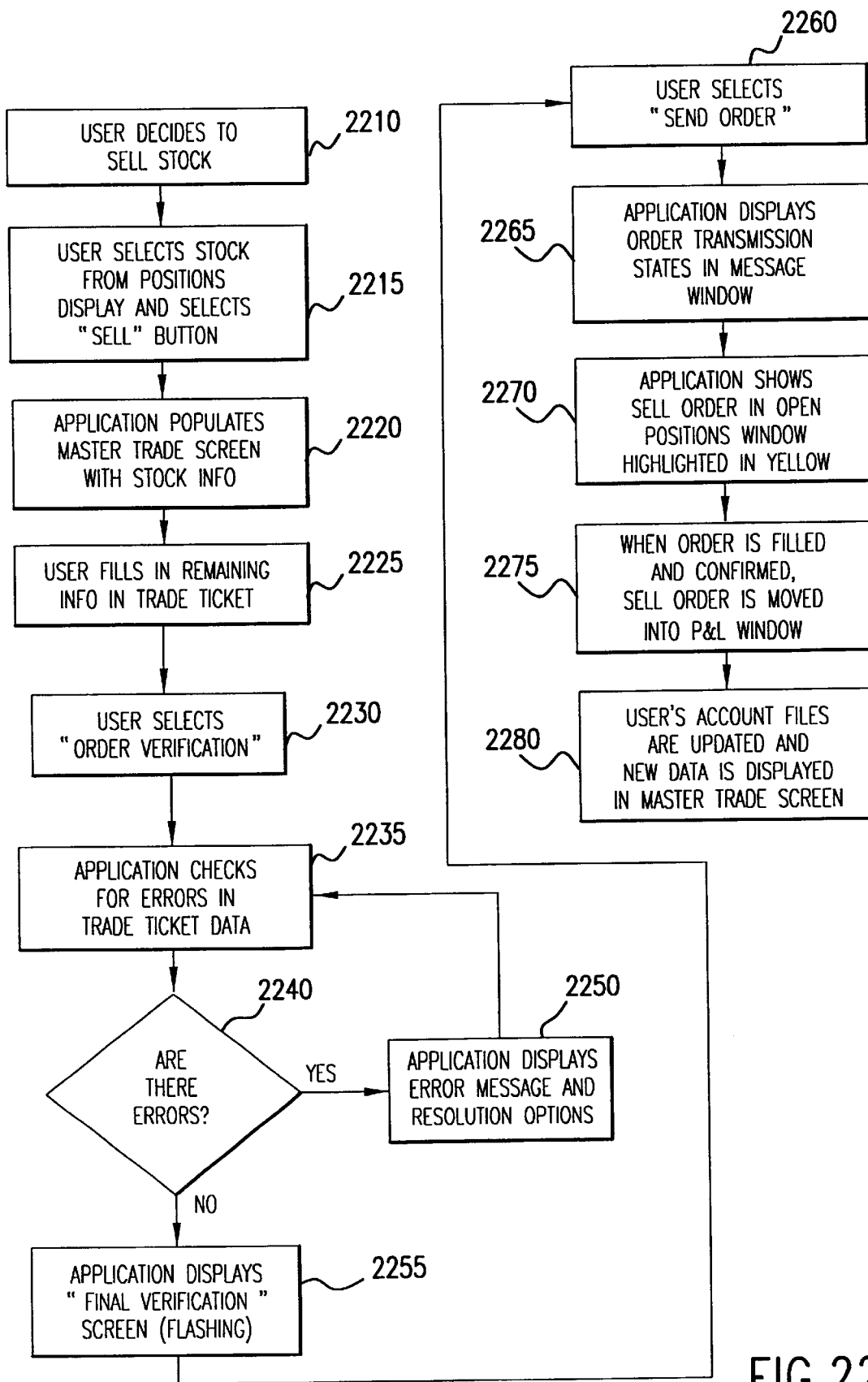
FIG. 22 is a flow diagram illustrating software which enables a user to execute a sell order in a stock.

FIG. 22 is a flow diagram illustrating software which enables a user to execute a sell order of a stock using the preferred embodiment. We assume that, initially, the user makes the decision to sell shares of a stock that he owns (see 2210). Next, at step 2215, the user selects the stock from the positions display 550 and selects the "Sell" button 810. Once the stock has been selected, the application transmits to the broker/dealer's computer the fact that the user is requesting information on that stock and, in response, receives data on the stock. The application then, at step 2220, populates the master trade screen and the trade ticket (see FIGS. 5 & 11) with available information on the stock. At step 2225, the user fills in additional information into the trade ticket and checks the final total cost of the trade.

At step 2230, the user selects "Order Verification" function and in response, the application checks, at step 2235, for errors in the data that have been entered into the trade ticket. If at step 2240, an error has been found, the application displays at step 3250, an error message along with possible ways for correcting an error. Once the ticket is error-free, the application displays at step 2255, a flashing final verification screen. The user then makes the final decision whether to send the sell order, and at step 2260, selects the Send order function. The application then transmits the user's order to the broker/dealer system used by the user. At step 2265, the application assigns a reference number to the order and displays the order transmission status in three steps in the message line display. Then, at step 2270, the application shows the order highlighted in yellow in the Open orders display of the master trade screen. After the order has been filled and confirmed, the application moves, at step 3275, the sell order into the user's Positions and Balances display and displays updates to the user's account files and new balances in the master trade screen (see step 2280).

Figure 23:
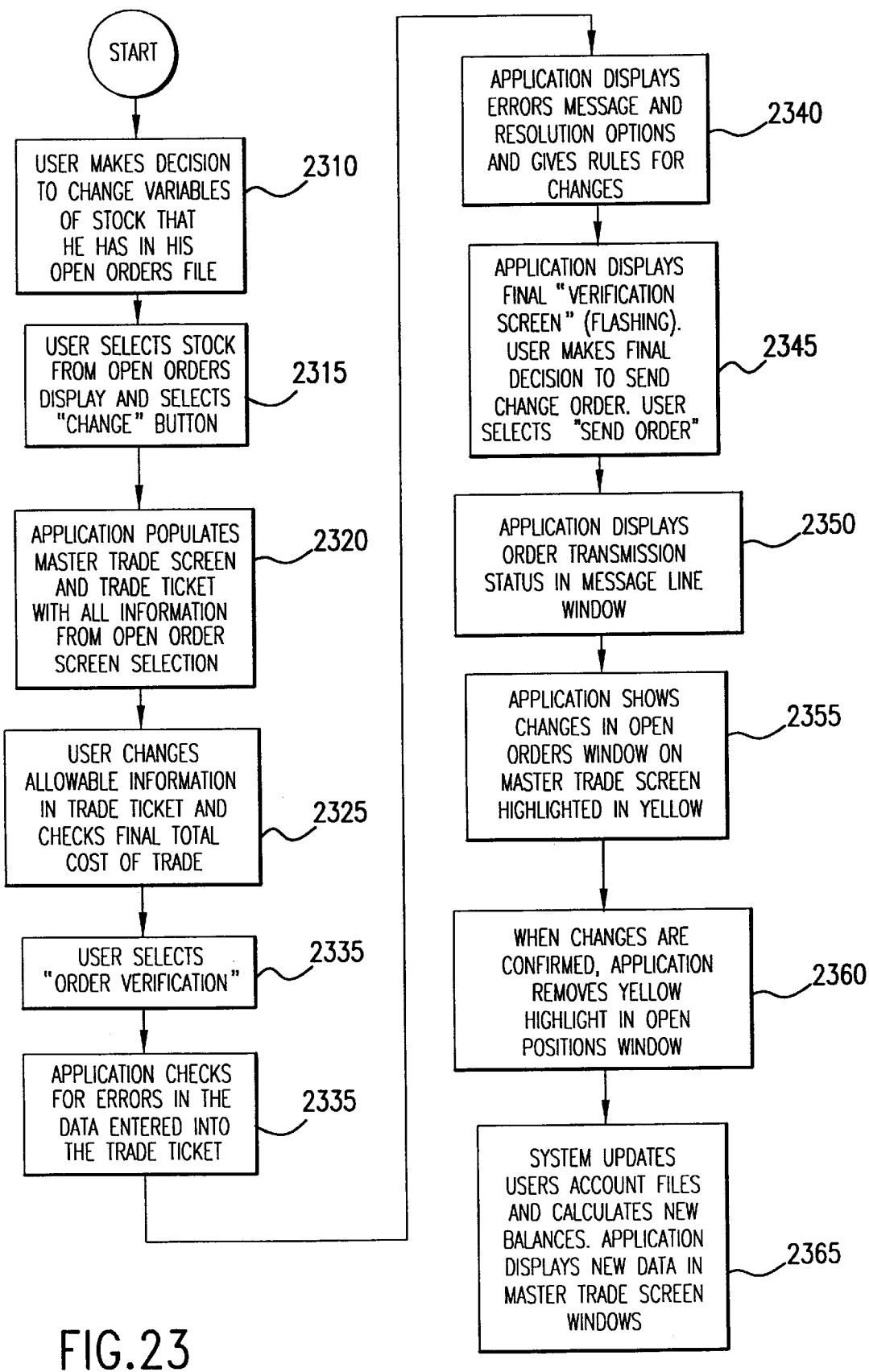
FIG. 23 is a flow diagram illustrating software which enables a user to execute a change order in a stock purchase already entered into the system.

FIG. 23 is a flow diagram illustrating software which enables a user to execute a change order in a stock purchase order already entered into the system. We assume that, initially, at step 2310, the user makes a decision to change one or more variables of an open stock order (list 545). At step 2315, the user selects the stocks from the open orders display (see FIGS. 5 & 7) and selects the Change button 710. In response, the application, at step 2320, populates the master trade screen and trade ticket (see FIGS. 5 & 11) with information from the "Open Order" screen selection. The user, at step 2325, changes information in the trade ticket, checks the final total cost of the trade, and 2330 selects "Order Verification."

In response, at step 2335, the application checks for errors in the data that has been entered into the trade ticket, and displays the effect the changed order will have on the user's account. If an error has been found, the application, at step 2340, displays an error message, and possibly options for correcting the error. If the ticket is error-free, the application displays, at step 2345, a flashing final Verification screen, and in response the user may make the change order, via the "Send order" command. The application then transmits the change order to the broker/dealer's computer.

If the original order has already been executed, the user is alerted to that fact by a message indicated that the change order has been rejected. At step 2350, the application displays the order transmission status in the message line display. At step 2355, the application shows the changes in the open orders display (see FIGS. 5 & 7) of the master trade screen highlighted in yellow. When the changes are confirmed, at step 2360, the application removes the yellow highlight in the open positions display. The system then, at step 2365, updates the display of the account data and balances accordingly on the master trade screen.

Figure 24:
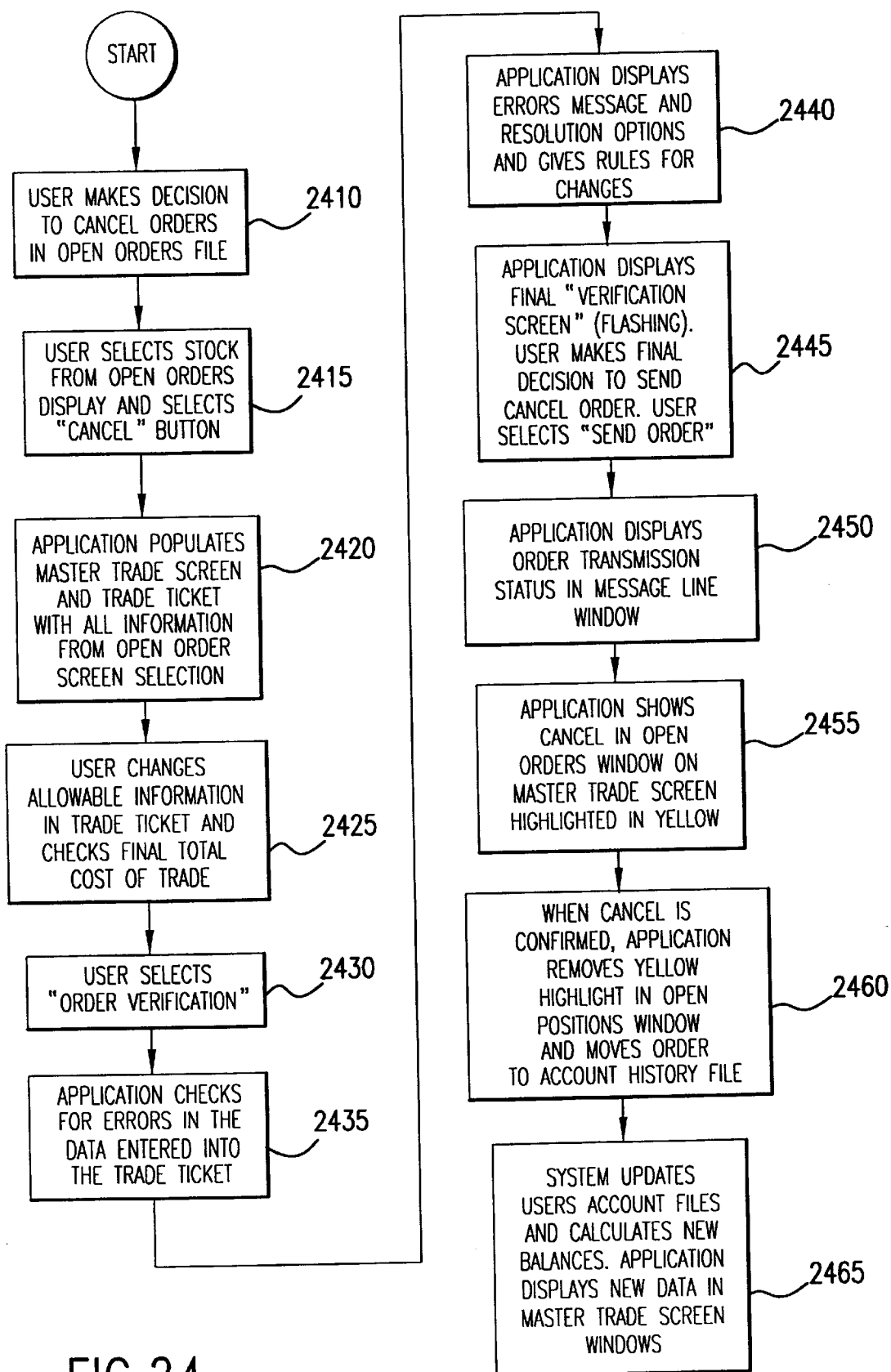
FIG. 24 is a flow diagram illustrating software which enables a user to execute a cancel order for a stock purchase already entered into the system.

FIG. 24 is a flow diagram illustrating software which enables a user to execute a cancel order for a stock purchase that has already been entered. First, the user makes the decision, at step 2410, to cancel an order in the open orders file. The user then, at step 2415, selects the stock from the open orders display (see FIGS. 5 & 7) and selects the "Cancel" button 730. The application, at step 2420, populates the master trade scree and trade ticket (see FIGS. 5 & 11) with information from the open order screen. At step 2425, the user changes information in the trade ticket, checks the final total cost of the trade, and, at step 2430, selects "Order Verification."

After the "Order Verification" function has been selected by the user, the application checks, at step 2435, for errors in the data that has been entered into the trade ticket. If an error has been found, the application displays an errors message, at step 2440, and possibly a suggestion how to correct it. Once the ticket is error-free, the application displays, at step 2445, a flashing final Verification screen. The user then makes the final decision to send the Cancel order, and selects the "Send order" function. The application transmits the user's cancel order information to the computer of the broker/dealer.

If the original order has already been executed, the user is alerted to the fact that the cancel order is rejected. At step 2450, the application displays the order transmission status in the message line display. At step 2455, the application then shows Cancel, highlighted in yellow, in the open orders list (see FIGS. 5 & 7) of the master trade screen. When the cancellation is confirmed, at step 2460, the application removes the yellow highlight in the open positions display. At step 2465, the system displays updates to the user's account files balances on the master trade screen.

Figure 25:
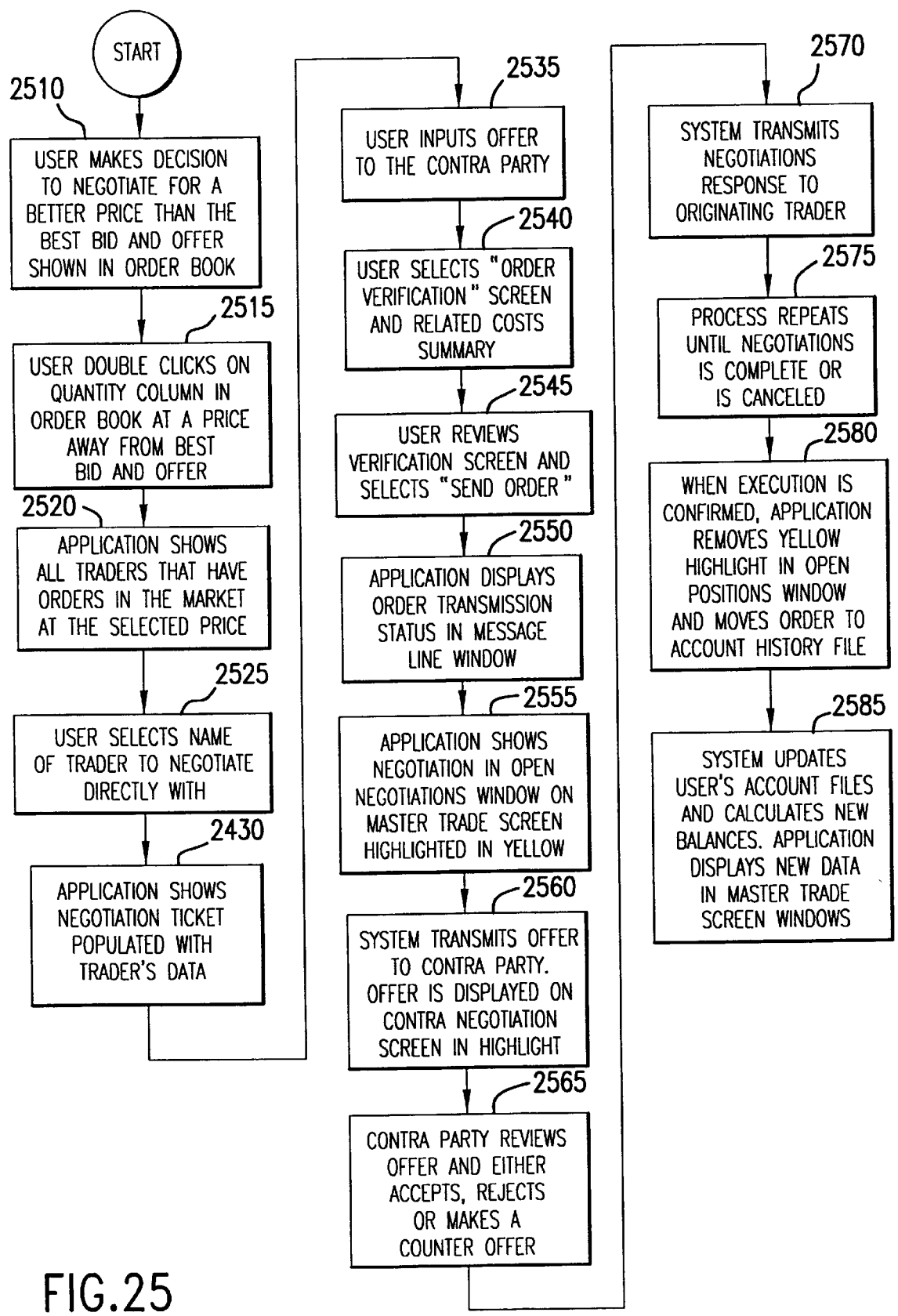
FIG. 25 is a flow diagram illustrating the computer steps by which a user negotiates for a better price in a stock shown in the after-hours stock market of the preferred embodiment.

FIG. 25 is a flow diagram illustrating software which enables a user to negotiate for a better price in a stock during the user-to-user trading of the preferred embodiment. At step 2510, the user makes the decision to negotiate for a better price than the best bid and offer shown in the order book (see FIGS. 5 & 6). At step 2515, the user double clicks on the quantity column in the order book at a price different from the best bid and offer. The application requests the appropriate information from the replica server, and, at step 2520, displays in the negotiations screen (see FIG. 42) a list of traders who have orders in the market at the selected price. Then, at step 2525, the user selects the name of a trader to negotiate with directly. The application, at step 2530, shows the negotiation ticket populated with the selected trader's data. At step 2535, the user then inputs an offer to the selected trader and, at step 2540, selects the "Order Verification" screen and related costs summary. The user then, at step 2545, reviews the verification screen and selects Send Order. At step 2550, the application displays the order transmission status in the message line display and, at step 2555, shows "Negotiation", highlighted in yellow, in the open negotiations display on the master trade screen.

At step 2560, the user's offer to the selected trader is transmitted by the application to the replica server, which transmits the offer to the root server. The offer is then transmitted through the appropriate chain of replica servers until it is received by the other party's workstation where it is displayed on the negotiation screen in highlight. The other party, at step 2565, reviews the offer. The other party is provided with an option to accept, reject, or make a counteroffer. At step 2570, the response of the other party is transmitted to the user who made the offer. This process repeats until negotiations are completed or canceled (see step 2575). When the order execution is confirmed, the application, at step 2580, removes the yellow highlight in the open positions display and moves the order to the account history file. The application then, at step 2585, displays the update to the user's account and balances in the user's master trade screen.

Figure 26:
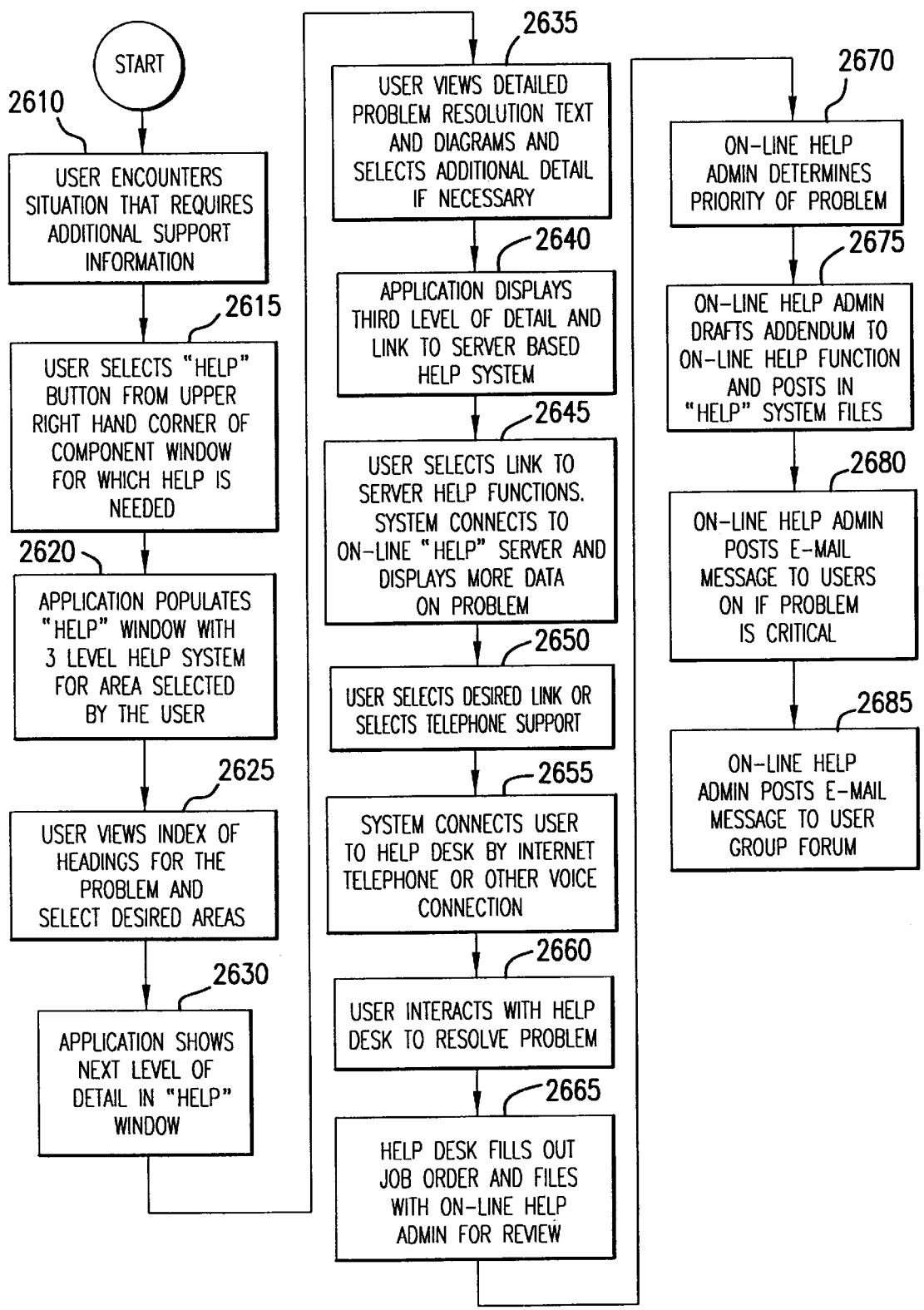
FIG. 26 is a flow diagram illustrating software supporting the context-sensitive "Help" function of the preferred embodiment.

FIG. 26 is a flow diagram illustrating software and the computer operation of the context-sensitive "Help" function of the preferred embodiment. If, the user encounters a situation that requires additional information (see 2610), at step 2615, the user selects the "Help" button from the upper-right-hand corner of the display for which help is needed. The application, at step 2620, populates the "help" display with a three-level help for the area selected by the user. The user, at step 3625, views an index of headings relating to the problem and selects the desired topic. If necessary, the application, at step 2630, shows the next level of detail in the "Help" display. The user then, at step 2635, views detailed problem resolution text and diagrams, and requests additional detail if necessary. If more details are needed, at step 2640, the application displays the third level of detail, along with an Internet link to a help system. The user, at step 2645, selects the link to the server help functions and the system connects to the on-line help server and displays more data relating to the problem. Then, at step 2650, the user selects whether to use a link regarding the help topic or telephone support. If telephone support is selected, the system, at step 2655, connects the user to the help desk by Internet telephone or other voice connection and the user interacts with the help desk to resolve the problem (step 2660). If necessary, the system help desk, at step 2665, fills out a job order and files it with the on-line help administrator for review. At step 2670, the on-line administrator determines the priority of the reported problem and then, at step 2675, generates an addendum to the on-line help function and posts it in the "Help" system files. If the problem is critical, at step 2680, the on-line help administrator posts an e-mail message to users on the system. In any case, the on-line help administrator posts, at step 2685, an e-mail message to the user group forum.

Figure 27:
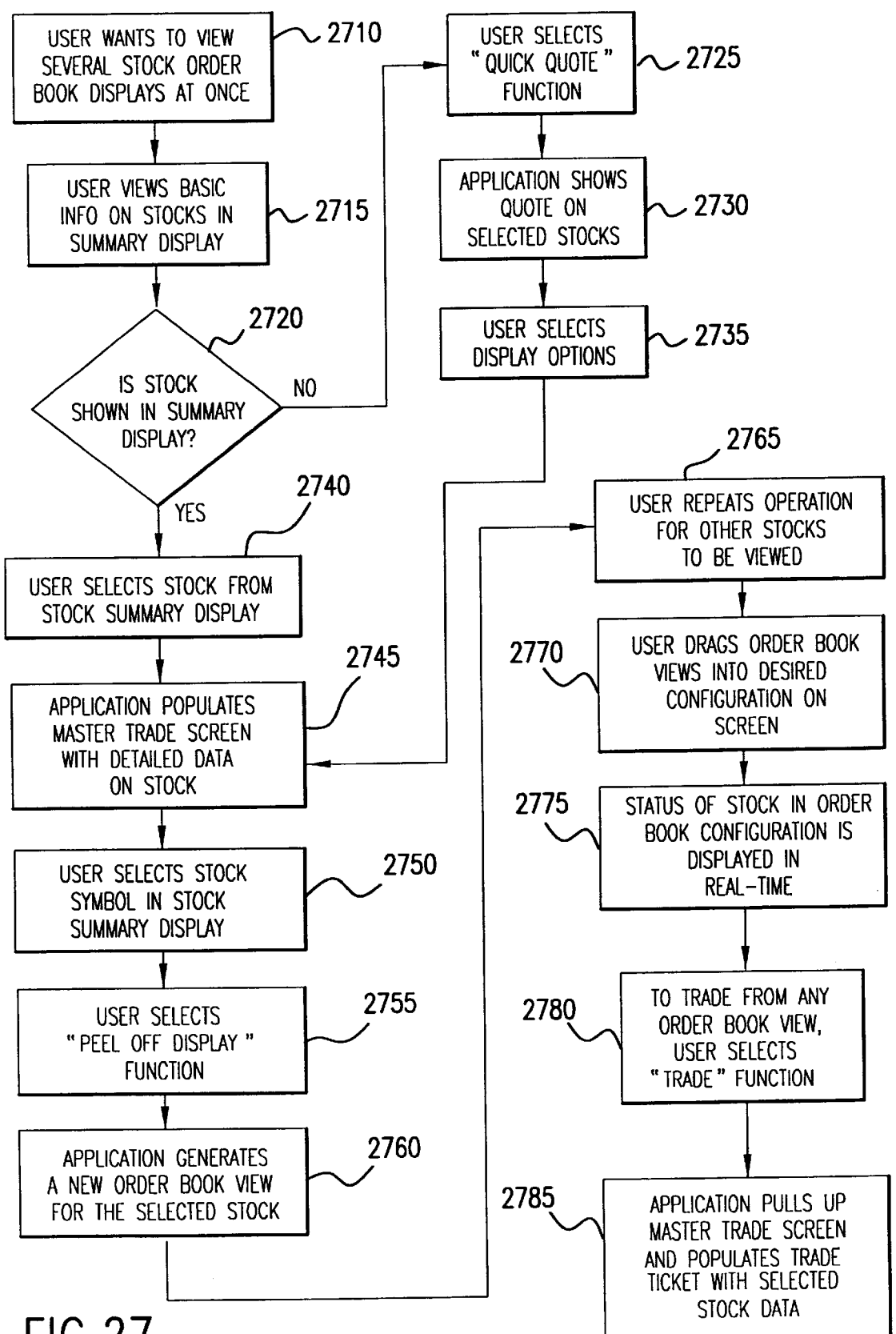
FIG. 27 is a flow diagram illustrating software which enables a user to view several instances of the order books of the after-hours market on one screen.

FIG. 27 is a flow diagram illustrating software which enables a user to view several instances of order books on one screen. Initially, at step 2710, the user decides to view several stock order books on the display at once. The user, at step 2715, views basic information on the stocks by selecting alternate summary screen views. The views include: (1) the stocks held by the user; (2) stocks that are among the most active in the current market; and (3) stocks that the user would like to monitor. If a security of interest is shown in the summary display (see step 2720), the user selects, at step 2740, the security from the stock summary display (see FIGS. 5 & 13) to view the stock information in detail. If the security is not shown in the summary display, the user selects, at step 2725, the "Quick quote" function and related options. The user's request is transmitted by the application to the replica server, which transmits the relevant stock information back to the user's application. This new information is kept updated in real-time by the replica server. The application then, at step 2730, shows the quote on the selected stock, and the user, at step 2735, selects desired display options. When the stock has been selected, the application populates 2745 the master trade screen with detailed data on the stock. If desired, the user, at step 2750, selects the stock symbol in the stock summary display, and, at step 3755, selects the Peel off display function from the function button display (see FIG. 15).

At step 2760, the application generates a new order book view for the selected stock. That view is shown outside the master trade screen. The user, at step 2765, repeats the operations 2720 through 2760 for stocks the user wishes to see at one time. The user then, at step 2770, drags order book views into the desired organization on the screen (see FIG. 57C). In response, the application, at step 2775, displays the status of stock in the order book configuration in real-time. To trade from any order book view, the user, at step 2780, selects the "trade" function. In response, the application, at step 2785, pulls up the master trade screen and populates the trade ticket with selected stock data (see FIGS. 5 & 11).

FIG. 28 is a flow diagram illustrating software for compressing the view of the master trade screen of the GUI of the preferred embodiment. FIG. 15 illustrates the effect of these steps on the master trade screen. Initially, the application shows the master trade screen at full size, see 2810. At step 2815, the user selects the "Shrink" function from the master trade screen and in response, at step 2820, the application shrinks the display to show only the stock summary display and function buttons. If the user selects the Shrink function again (step 2825), the application, at step 2830, shrinks the display to show only function buttons. If, at step 2835, the user selects the Shrink function again, the application, at step 2840, shrinks the display to show the fully compressed view. If the user selects Shrink from the most compressed view (see 2845), the application, at step 3850, displays the message box: "Do you want to close your connection [to the system of the preferred embodiment]?" If the user, at step 2855, selects "Yes", the application closes the display and only the icon of the preferred system is displayed.

Figure 29:
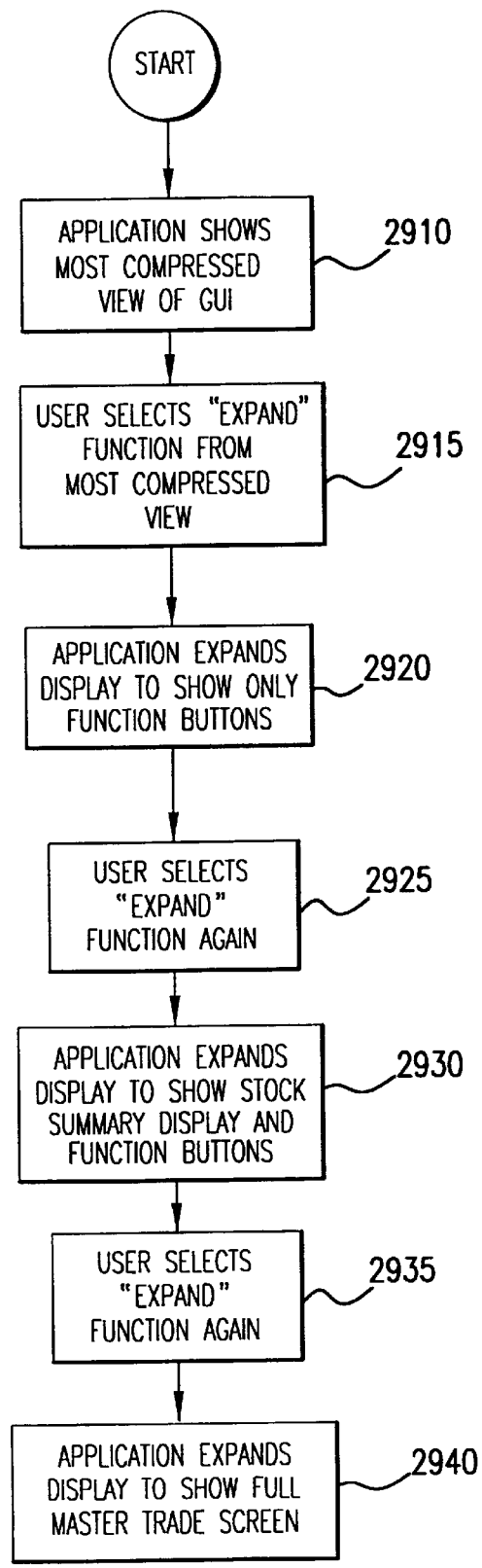
FIG. 29 is a flow diagram illustrating the computer steps required to expand the display of the GUI of the preferred embodiment to obtain a full view of the master trade screen.

FIG. 29 is a flow diagram illustrating software for expanding the display of the GUI of the preferred embodiment to obtain the full view of the master trade screen. Illustratively, the application initially shows the most compressed view of the GUI of the preferred embodiment (see 2910). The user, at step 2915, selects the "Expand" function 1650 and the application, at step 2920, expands the display to show only the function buttons and then at step 2925, the user selects the "Expand" function again and the application, at step 2930, expands the display to show the stock summary display and function buttons 1620. If the user, at step 2935, selects the "Expand" function once again, the application, at step 2940, expands the display to show the full master trade screen 1610.

Figure 30:
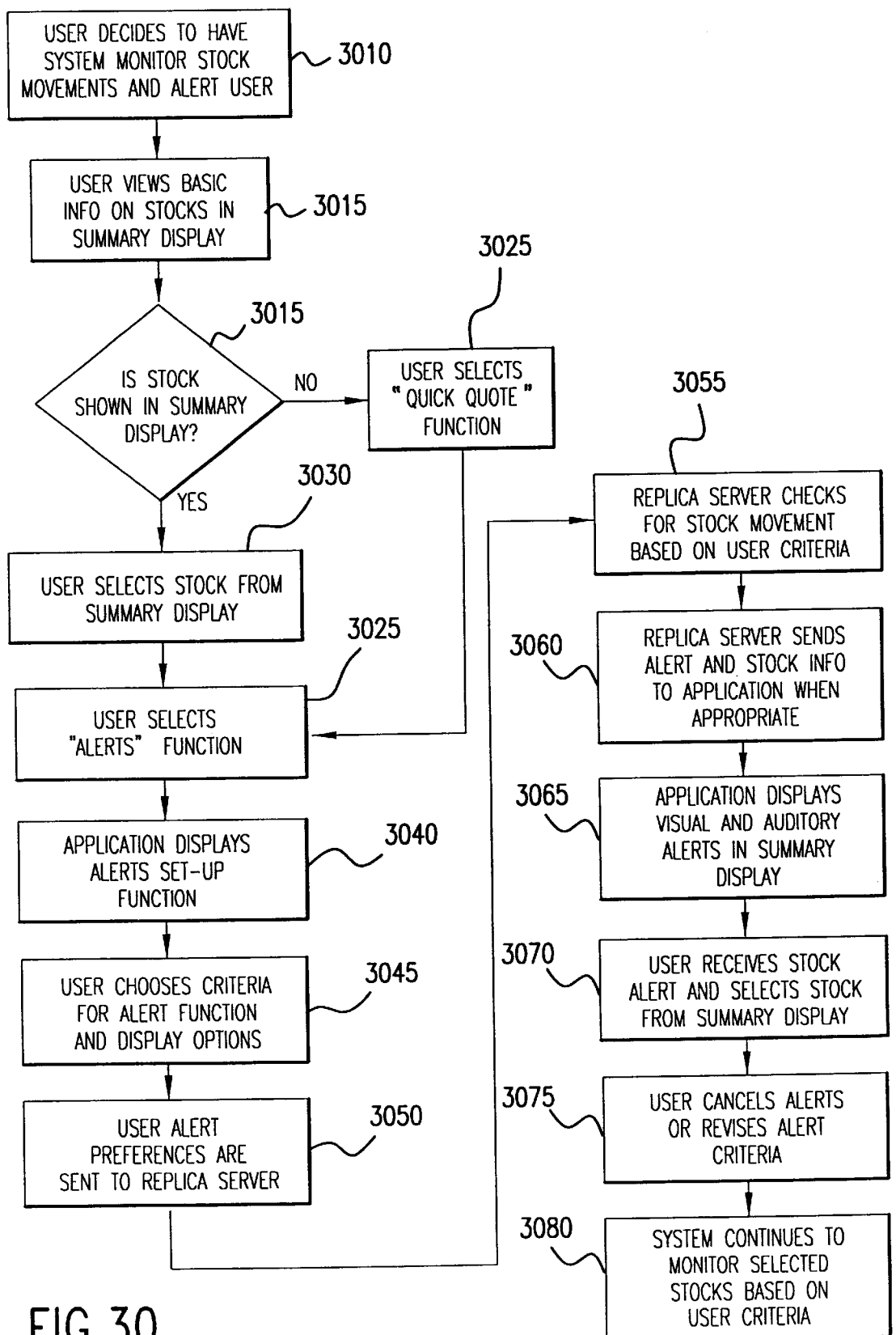
FIG. 30 is a flow diagram illustrating the software of the preferred embodiment for alerting a user to movements on stocks according to user-defined preferences.

FIG. 30 is a flow diagram illustrating software of the preferred embodiment for alerting a user to movements in stock price according to user-defined preferences. Initially, the user makes a decision, at step 3010, to have the system monitor stock movements and alert him/her accordingly. At step 3015, the user views basic information for different stocks by selecting alternate summary screen views, which include: (1) the stocks held in the system by the user; (2) the stocks that are among the most active in the current market; and (3) stocks that the user would like to monitor.

If the stock of interest is shown in the summary display (see 3020), the user selects, at step 3030, the stock from the stock summary display (see FIGS. 5 & 12). If the stock of interest is not shown in the summary display, the user selects, at step 3025, the "Quick quote" function and related options. The user's request is transmitted by the application to the replica server and it is kept updated in real-time by the replica server. Once data about the stock has been displayed, the user selects, at step 3035, the "Alerts function," and the application, at step 3040, displays the "Alerts set-up function" (see FIG. 52).

At step 3045, the user chooses the criteria for the alert function and display options, and the application transmits 3050 the user's alert preferences to the replica server, which updates the user's profile on the replica database. The replica server then 3055 checks for movement in stock price, based on the user's selected criteria, in the stock of interest. The replica server automatically monitors price data and if an alert condition occurs, sends an alert (along with relevant stock information) to the user's application when appropriate (see 3060). In response, the application, at step 3065, displays the alerts in the stock summary display and may provide an audible alert. At step 3070, the user receives the alert(s) and selects the stock from the stock summary display for detailed view in the order book. The user may cancel the alerts or revise the alert criteria (see 3075) and the system continues to monitor the selected stocks based on the user's criteria (see 3080).

Figure 31:
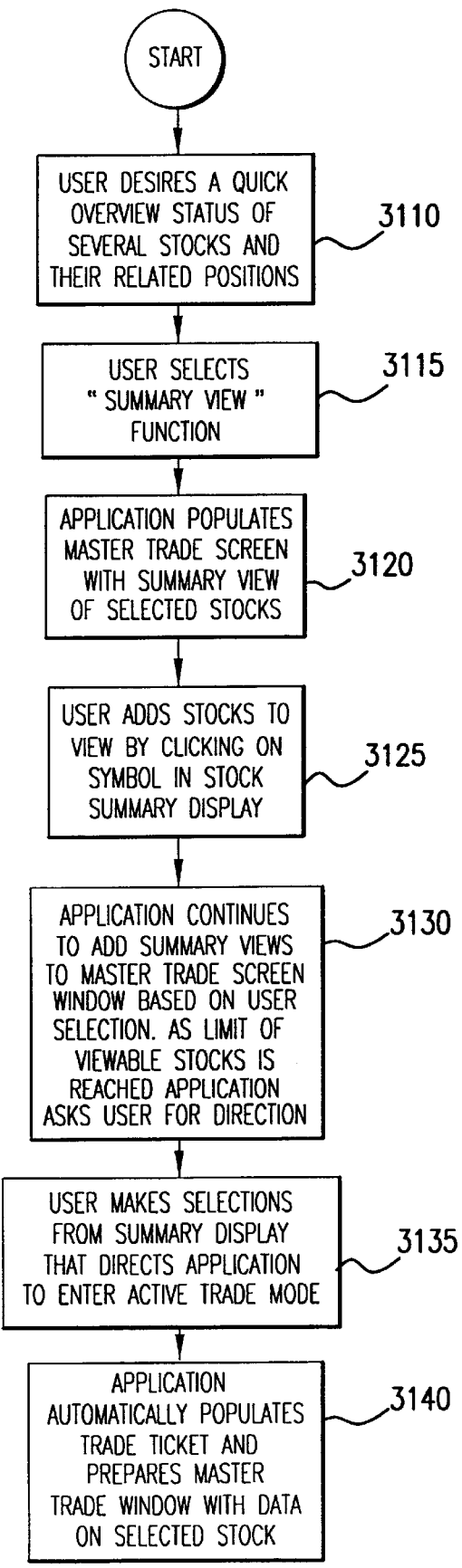
FIG. 31 is a flow diagram illustrating how the preferred embodiment enables a user to visualize the general status of stocks and related positions via an analog graphic display.

FIG. 31 is a flow diagram illustrating software of the preferred embodiment that enables a user to visualize the general status of stocks and related positions via an analog graphic display. Initially, the user desires a quick overview of the status of several stocks (see step 3110) and, at step 3115, selects the Summary view function. In response, the application, at step 3120, populates the master trade screen with a summary view of the selected stocks. The user adds stocks to the view (step 3125) by clicking on the appropriate symbol in the stock summary display (see FIGS. 5 & 12) and the application (at step 3130) adds summary views to the master trade screen based on the user's selections.

If the user wants to trade one of these stocks, at step 3135, the user makes a selection from the summary display that directs the application to enter active trade mode. As a result, the application, at step 3140, automatically populates the trade ticket (see FIGS. 5 & 11) and prepares the master trade screen with data on the selected stock.

Figure 32:
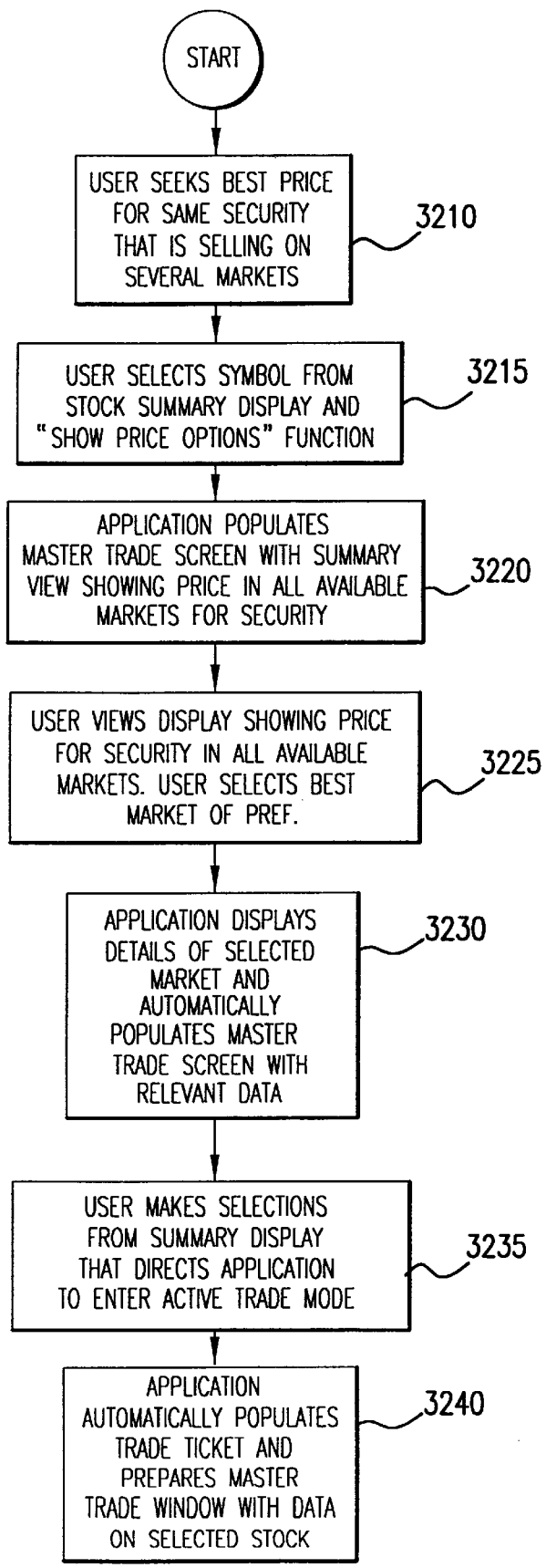
FIG. 32 is a flow diagram illustrating how the preferred embodiment enables a user to visualize the best price in a security from an analog graphic display of alternate markets.

FIG. 32 is a flow diagram illustrating software of the preferred embodiment that enables a user to visualize the best price in a security from an analog graphic display. The user seeks (step 3210) the best price for the same security that is selling on different markets (see FIG. 39) and, at step 3215, selects the symbol for this security from the stock summary display (see FIGS. 5 & 12) and the Show price options function. The application transmits the user's request to the replica server which, in response, transmits information to the application concerning the price of the stock in different markets. The replica server continues to transmit that information in real-time until it receives notice from the application to terminate the transmission.

The application, at step 3220, populates the master trade screen with a summary view showing the price in all available markets for the security. At step 3225, the user views the display showing the prices for the security in the available markets, and selects the preferred market and, at step 3230, the application displays details of the selected market and automatically populates the master trade screen with relevant data (after requesting and receiving that data from the replica server). If a trade is desired, the user, at step 3235, makes a selection from the summary display that directs the application to enter the active trade mode and, at step 3240, it automatically populates the trade ticket (see FIGS. 5 & 11) and prepares the master trade screen with data on the selected stock.

Figure 33:
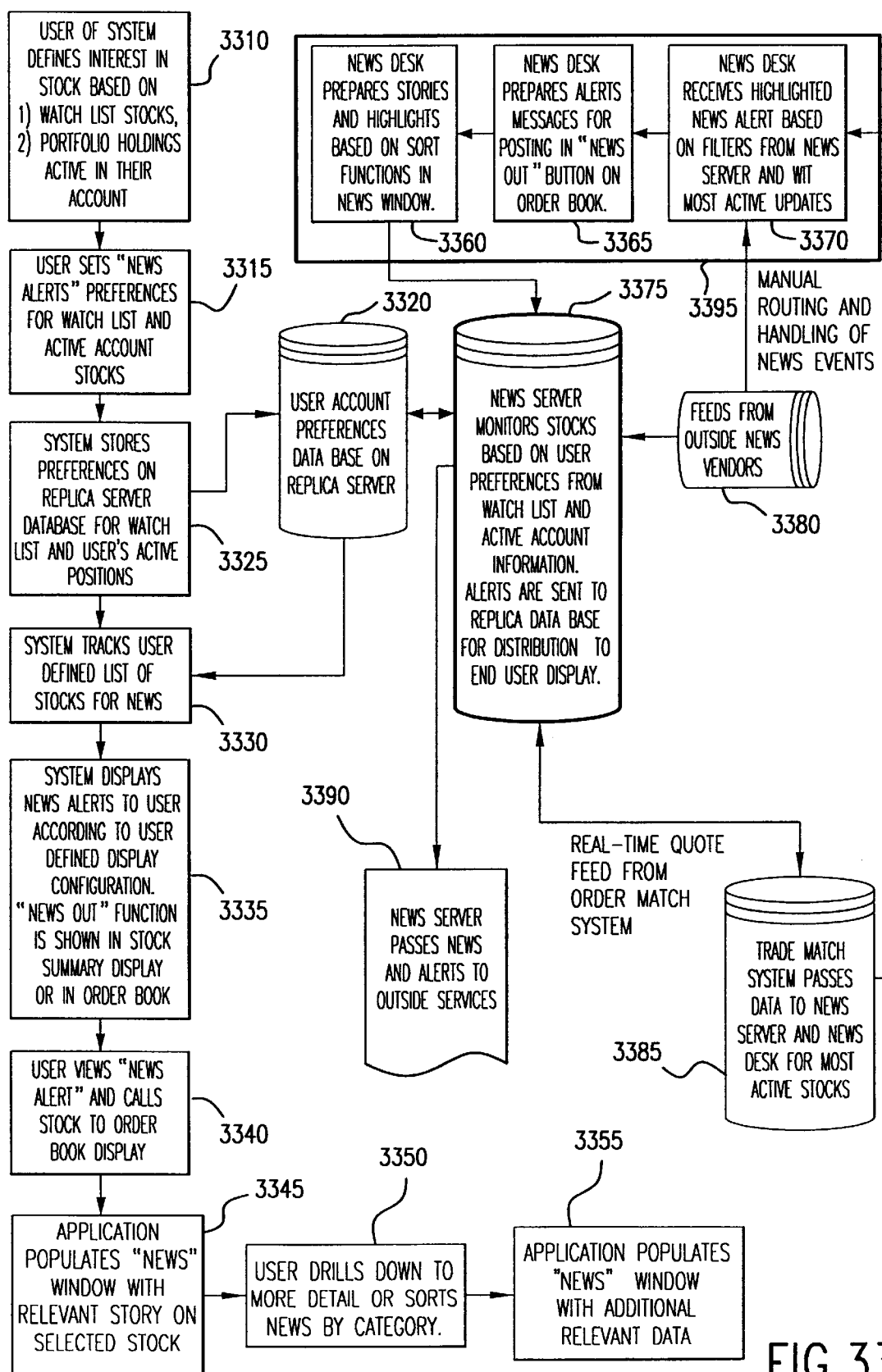
FIG. 33 is a flow diagram illustrating the operation of the news gathering and distribution system of the preferred embodiment.

FIG. 33 is a flow diagram illustrating the operation of the news gathering and distribution system of the preferred embodiment. Initially, at step 3310, the user defines his interest based on watch list stocks and portfolio holdings active in his account. The user then, at step 3315, sets "News alerts" preferences for the watch list and active account stocks. At step 3325, the system stores the user's preferences on the replica server database for the watch list and the user's active positions. At step 3320, that stored information is also transmitted to the user account preferences database on the replica server. The same information is transmitted to the news server, at step 3375, which monitors stocks based on user preferences from the watch list and active account information. Alerts are sent from the news server, at step 3375, back to the replica database and server for distribution to the end user display at step 3320. The news server, at step 3375, also passes news and alerts, at step 3390 to outside services. Data out may include: news of the system's most active stocks; news of other stocks; news forecasts; real-time quotes; an order book applet; a chart applet; a most active applet; a news applet; or other specific news on the overall market on the system.

At step 3395, the news desk of the subject system performs three general functions. First, at step 3370, it receives highlighted news alerts based on filters from the news server and the system's most active updates, received from the trade match system via step 3385. These filters are applied to news feeds received via step 3380, from outside vendors. Second, the news desk prepares alerts messages, at step 3365, for posting in the "News out" button on the order book of the end user display. This information is transmitted, at step 3375, to the user via the news server and the replica database and server, at step 3320. Third, the news desk, at step 3360, prepares stories and highlights based on the sort functions in the news display. Again, this information is transmitted to the end user at step 3375 via the news server and the replica database and server at step 3320. The system then tracks, at step 3330, the user-defined list of stocks for news. The application displays, at step 3335, news alerts to the user according to a user-defined display configuration. The "News out" function is shown in the stock summary display (see FIGS. 5 & 12) or in the order book. At step 3340, the user then views a "News alert" and calls the stock to the order book display (see FIGS. 5 & 6). At step 3345, the application populates the "News" display (see FIGS. 5 & 10) with relevant news on the selected stock. At step 3350, the user chooses to see more detail or sorts the news by category. At step 3355, the application then populates the "News" display with additional relevant data.

Figure 34:
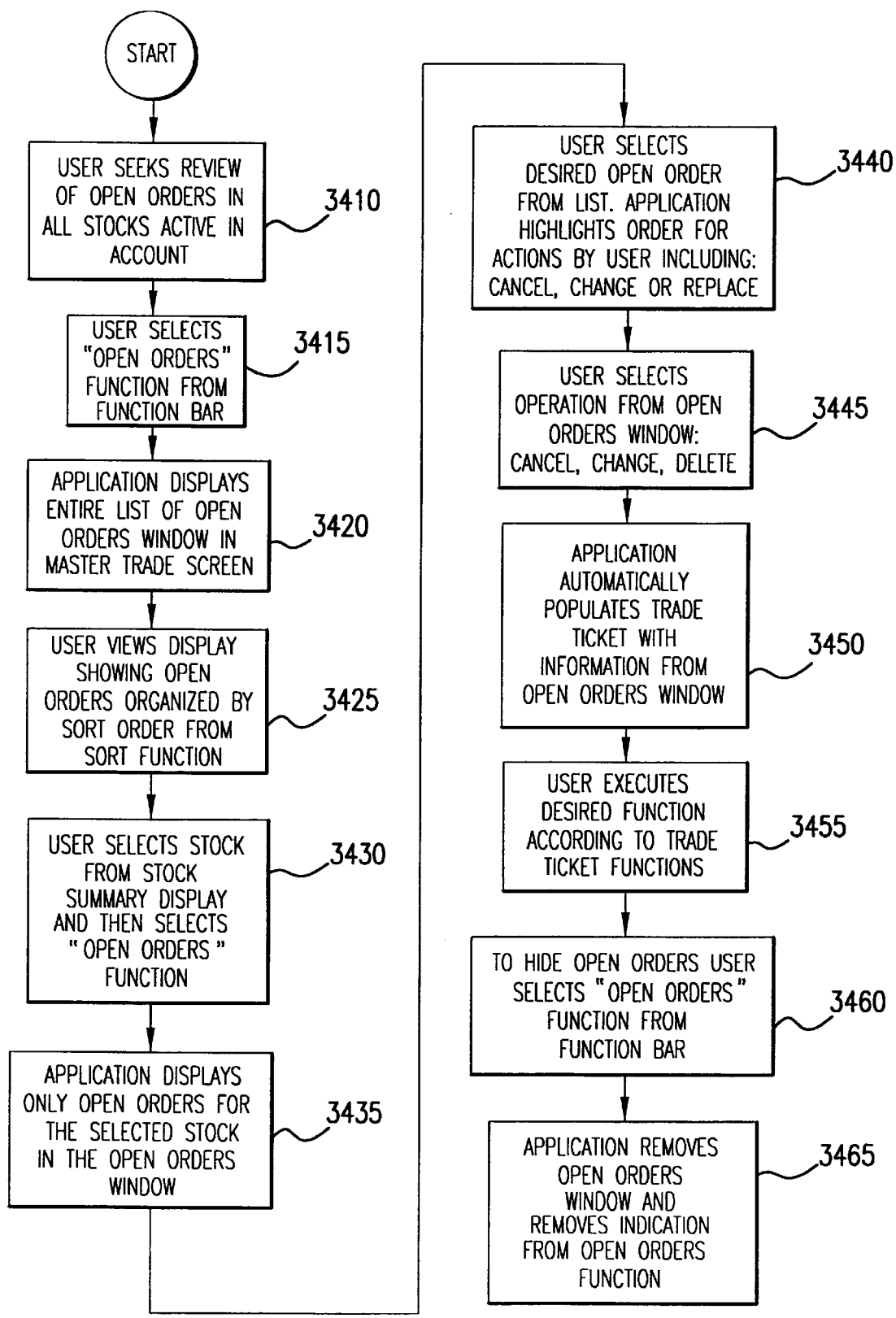
FIG. 34 is a flow diagram illustrating software which enables a user to view the status of his open orders in a stock.

FIG. 34 is a flow diagram illustrating software which enables a user to view the status of his open orders in a stock. Initially, at step 3410, the user seeks to review his open orders in all stocks active in his account. At step 3415, the user selects the open orders function from the function buttons display (see FIGS. 5 & 15). At step 3420, the application displays the entire list of open orders in the open orders (see display in FIGS. 5 & 7) display of the master trade screen. At step 3425, the user views the display showing the open orders. The user selects a stock, at step 3430, from the stock summary display (see FIGS. 5 & 12) and selects the "Open orders" function. The application then, at step 3435, displays only open orders for the selected stock in the open orders display. The user selects, at step 3440, the desired open order from the list. The application highlights the order for actions by the user, such actions including cancel, change, or replace. At step 3445, the user selects an operation (e.g., cancel, change, or delete) from the open orders display. The application automatically populates the trade ticket, at step 3450 (see FIGS. 5 & 11), with information from the open orders display on the selected stock. At step 3455, the user executes the desired function as requested in the trade ticket. To hide open orders, the user selects, at step 3460, the Open orders function from the function button display (function bar). The application then removes the open orders display and removes the indication from the open orders function, at step 3465.

Figure 35:
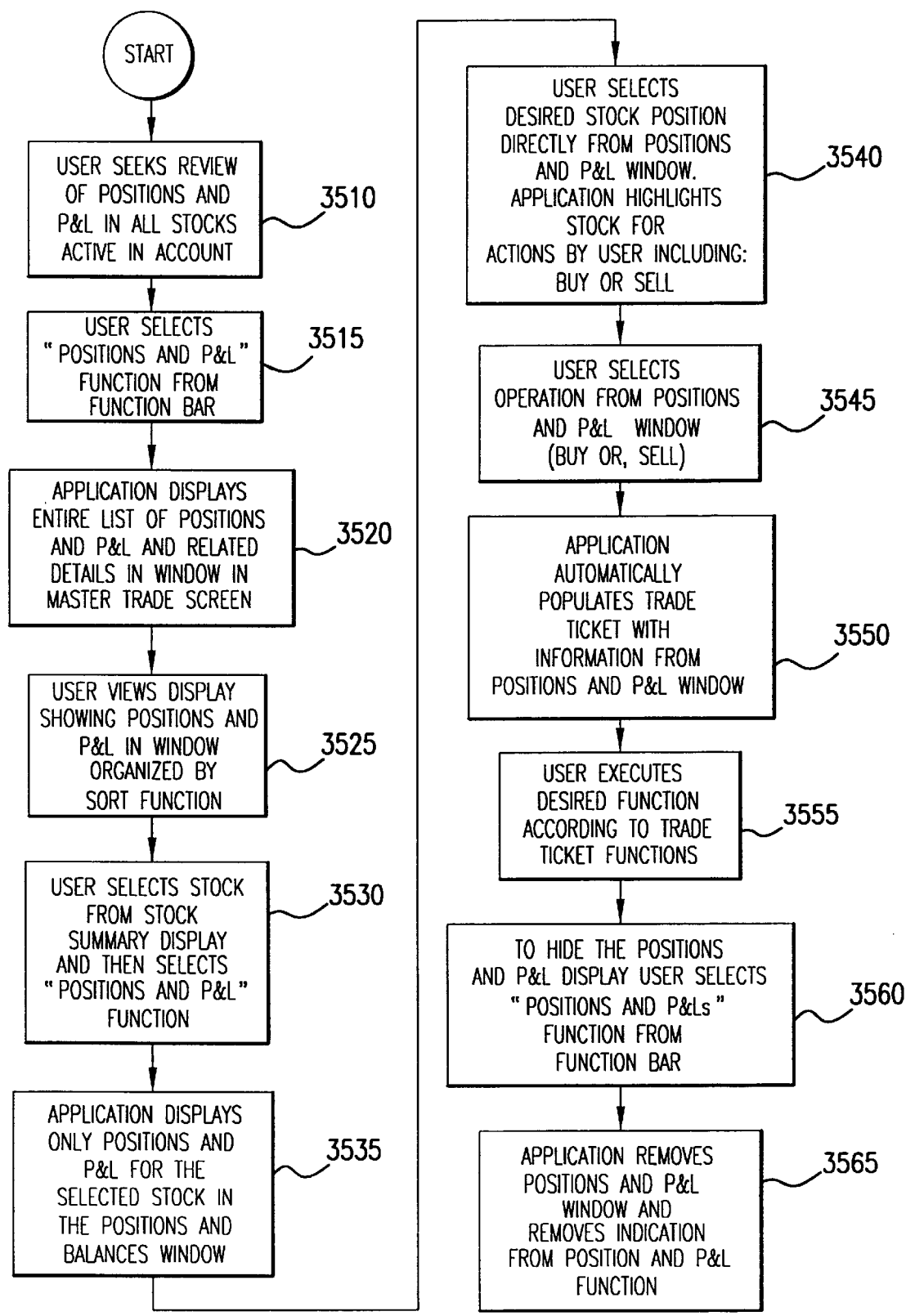
FIG. 35 is a flow diagram of software which enables a user to view the status of positions and profit and loss information (P&L).

FIG. 35 is a flow diagram illustrating software which enables a user to view the status of positions and profit and loss information (P&L). Initially, at step 3510, to review his positions and P&L in the stocks held in his account, the user selects the "Positions and P&L" button 1540 from the function bar, at step 3515. The application displays, at step 3520, the user's entire list of positions and P&L and related details in positions and P&L displays, 550, in the master trade screen. At step 3525, the user views the display showing the user's positions and P&L in the display, organized by the sort function. At step 3530, the user selects a stock from the stock summary display (see FIGS. 5 & 12) and selects the "Positions and P&L" function. The application then requests updated information from the broker/dealer server on the user's positions and P&L in the selected stock. In an alternate embodiment, the application calculates the user's P&L based on the updated stock price and user account information stored on the user's computer. The stock price information is kept updated in real-time by the replica server. At step 3535, the application displays only positions and P&L for the selected stock in the positions and P&L display. At step 3540, the user selects the desired stock position directly from the "Positions and P&L" display. The application highlights the stock for actions (e.g., buy, or sell) by the user. The user selects, at step 3545, an operation from the positions and P&L display (e.g., buy, or sell). The application automatically populates the trade ticket, at step 3550 (see FIGS. 5 & 11), with information from the positions and P&L display. The user executes the desired function, at step 3555, according to the trade ticket functions. To hide the positions and P&L display, the user selects, at step 3560, the "Positions and P&L" function from the function bar. At step 3565, the application removes the positions and P&L display and removes the indication from the positions and P&L button.

Figure 36:
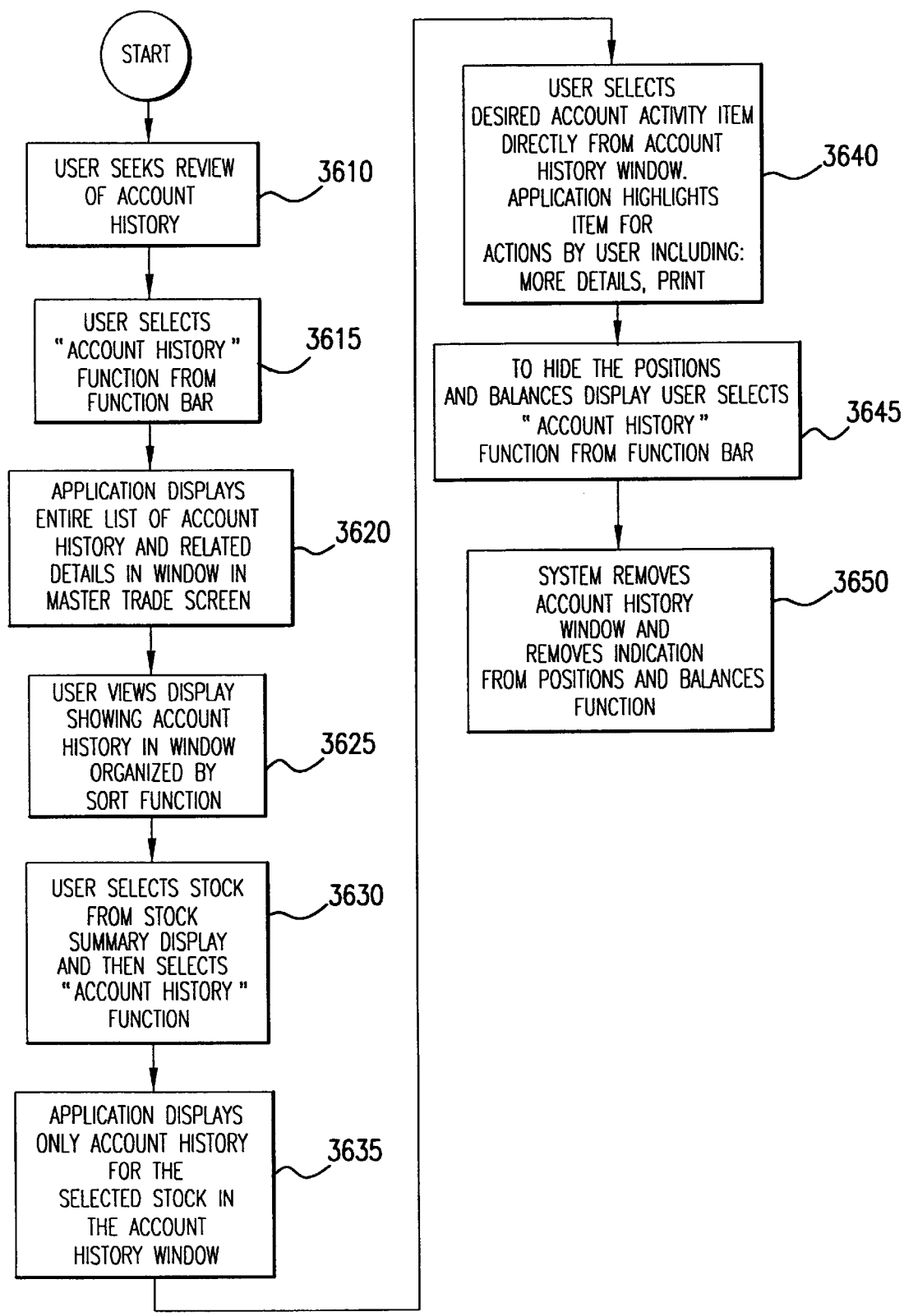
FIG. 36 is a flow diagram illustrating software which enables a user to view the status of his account history.

FIG. 36 is a flow diagram illustrating software which enables a user to view account history. Assuming that, initially, at step 3610, the user seeks to review his account history, at step 3615, the user then selects the "Account History" function 1545 from the function bar. The application displays, at step 3620, the entire list of the user's account history and related details in a display in the master trade screen. The user views the display showing his account history at step 3625, organized by the sort function. At step 3630, the user selects a stock from the stock summary display (see FIGS. 5 & 12) and selects the "Account History" function. At step 3635, the application displays only account history for the selected stock in the Account History display. The user selects the desired account activity item, at step 3640, directly from the Account History display. The application highlights the item for actions (e.g., more details, print) by the user. To hide the account history display, the user selects the "Account History" button from the function bar. The application then, at step 3650, removes the "Account History" display and removes the indication from the "Account History" button.

Figure 37:
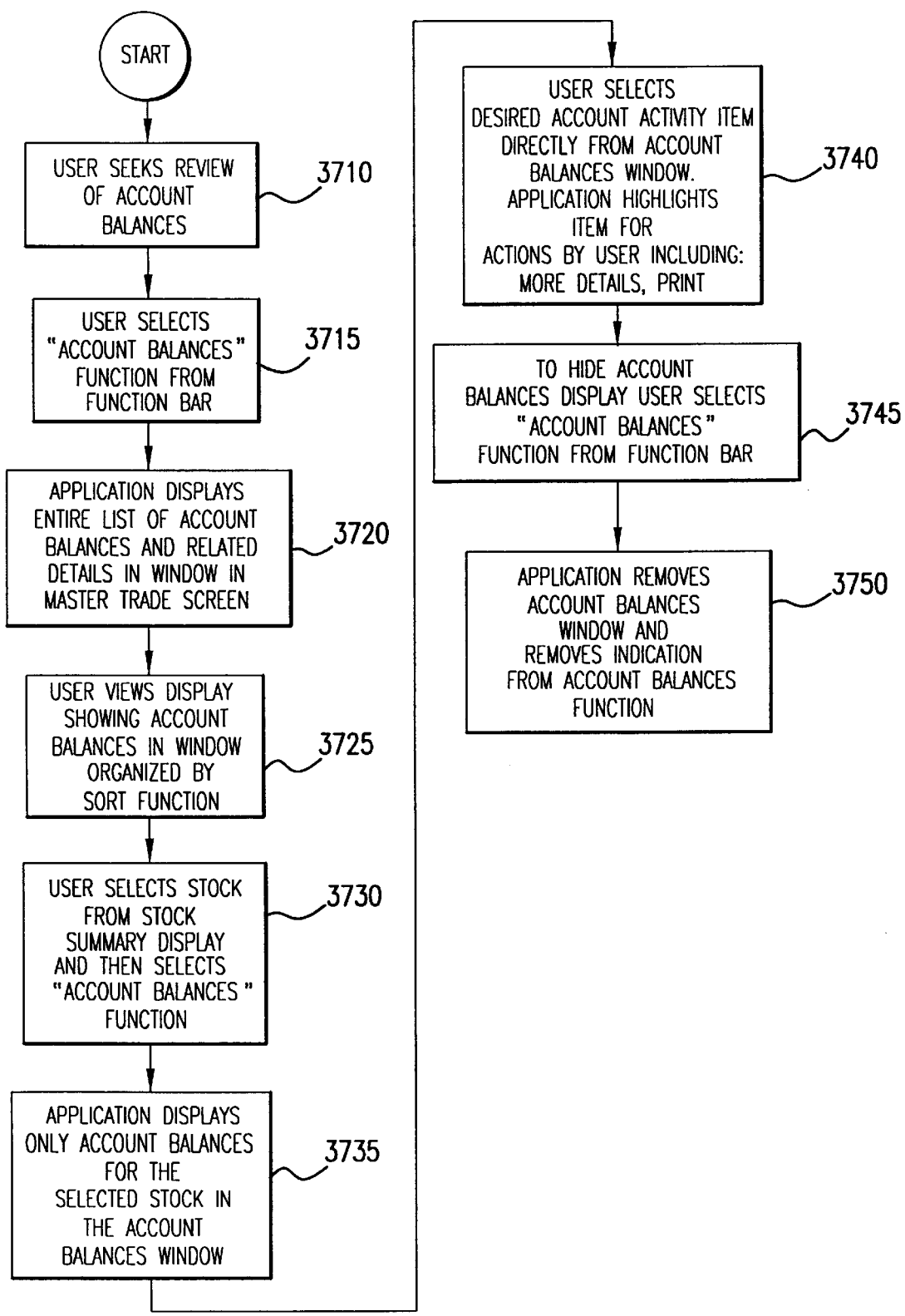
FIG. 37 is a flow diagram illustrating software which enables a user to view the status of his account balances.

FIG. 37 is a flow diagram illustrating software which enables a user to view the status of his account balances. Initially, at step 3710, the user seeks to review his account balances. The user then, at step 3715, selects the "Accounts" account balances function 1550 from the function bar. The application displays, at step 3720, the entire list of account balances and related details in the "Accounts" display of the master trade screen. The user views, at step 3725, the display showing his account balances in the display, organized by the sort function. The user, at step 3730, selects a stock from the stock summary display (see FIGS. 5 & 12) and selects the "Accounts" function 1550. The application, at step 3735, displays only account balances for the selected stock in the Account Balances display. The user then selects, at step 3740, the desired account activity from the Account Balances display. The application highlights the item for actions (e.g., more details, print) by the user. To hide the account balances, the user selects, at step 3745, the "Accounts" function 1550 from the function bar. At step 3750, the application removes the Account Balances display and removes the indication from the Account Balances function.

Figure 38:
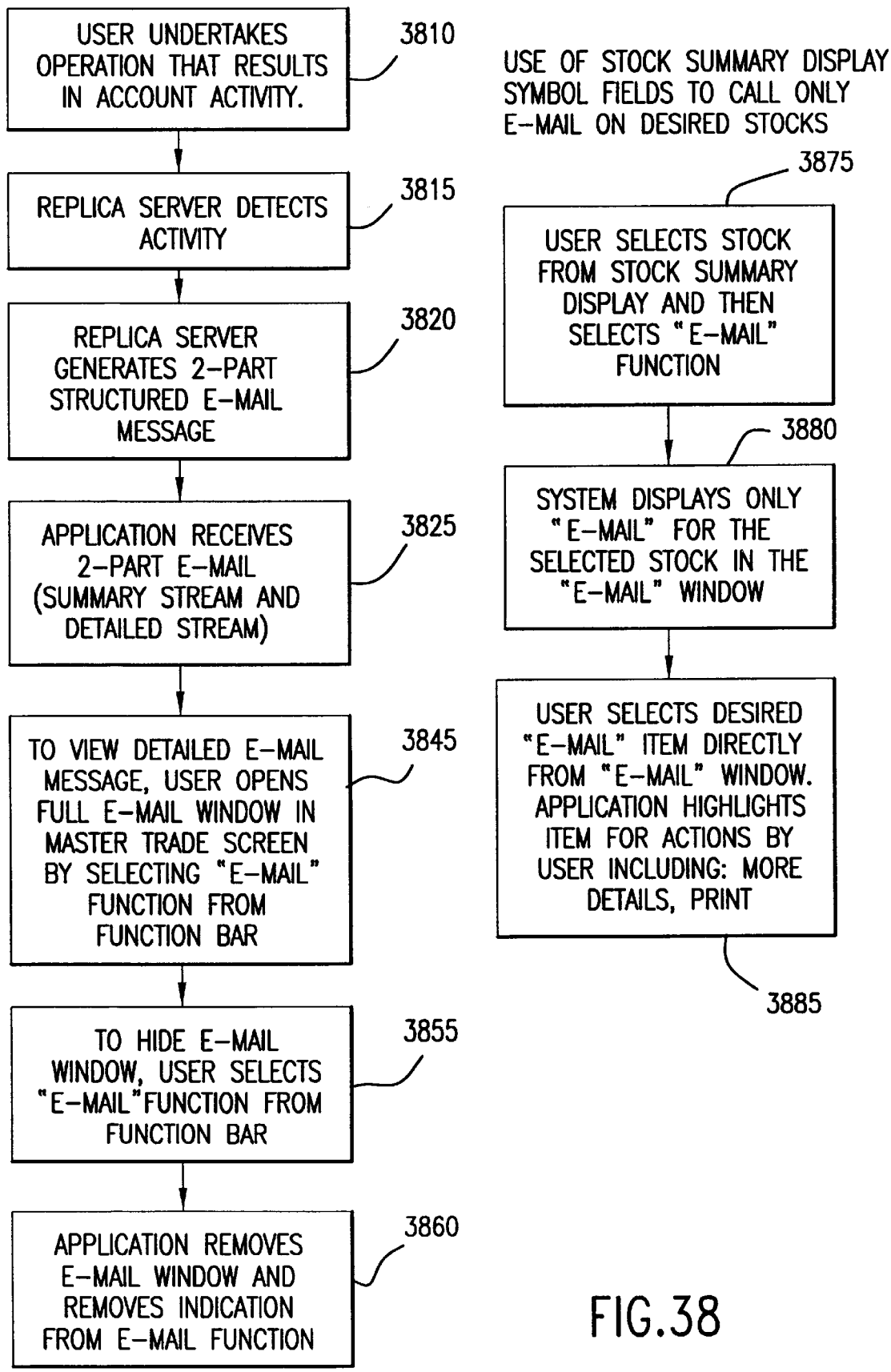
FIG. 38 is a flow diagram illustrating software which enables a user to receive and view email messages for account activity functions.

FIG. 38 is a flow diagram illustrating software which enables a user to receive and view e-mail messages for account activity functions. Initially, at step 3810, the user undertakes an operation that results in activity in his account. The replica server, at step 3815, detects said activity and generates a structured e-mail message. At step 3820, the replica server sends the structured e-mail message to the user's application in two parts, a summary stream and a detailed stream. The application receives and displays at step 3825, the summary e-mail message in the status display in the stock summary display (see FIGS. 5 & 12), in color-coded text. If the user does not have the full e-mail display open, the user selects the "E-mail" function, at step 3845, from the function bar. At step 3850, the application displays the full e-mail display in the master trade screen. To hide the e-mail display, the user selects the "E-mail" function, at step 3855, from the function bar. The application removes the e-mail display, at step 3860, and removes the indication from the "Email" function.

The preferred embodiment also enables the user to use the stock summary display fields to call only e-mail on desired stocks. Initially, at step 3875, the user selects a stock from the stock summary display and then selects the "E-mail" function. The application transmits the user's preference to the replica server, which updates the user's preference file, and transmits e-mail messages for the selected stock back to the user's application. The application, at step 3880, displays e-mail for the selected stock in the "E-mail" display. At step 3885, the user selects the desired e-mail item directly from the "E-mail" display. The application highlights the selected item for actions (e.g., more details, print) by the user.

Figure 39:
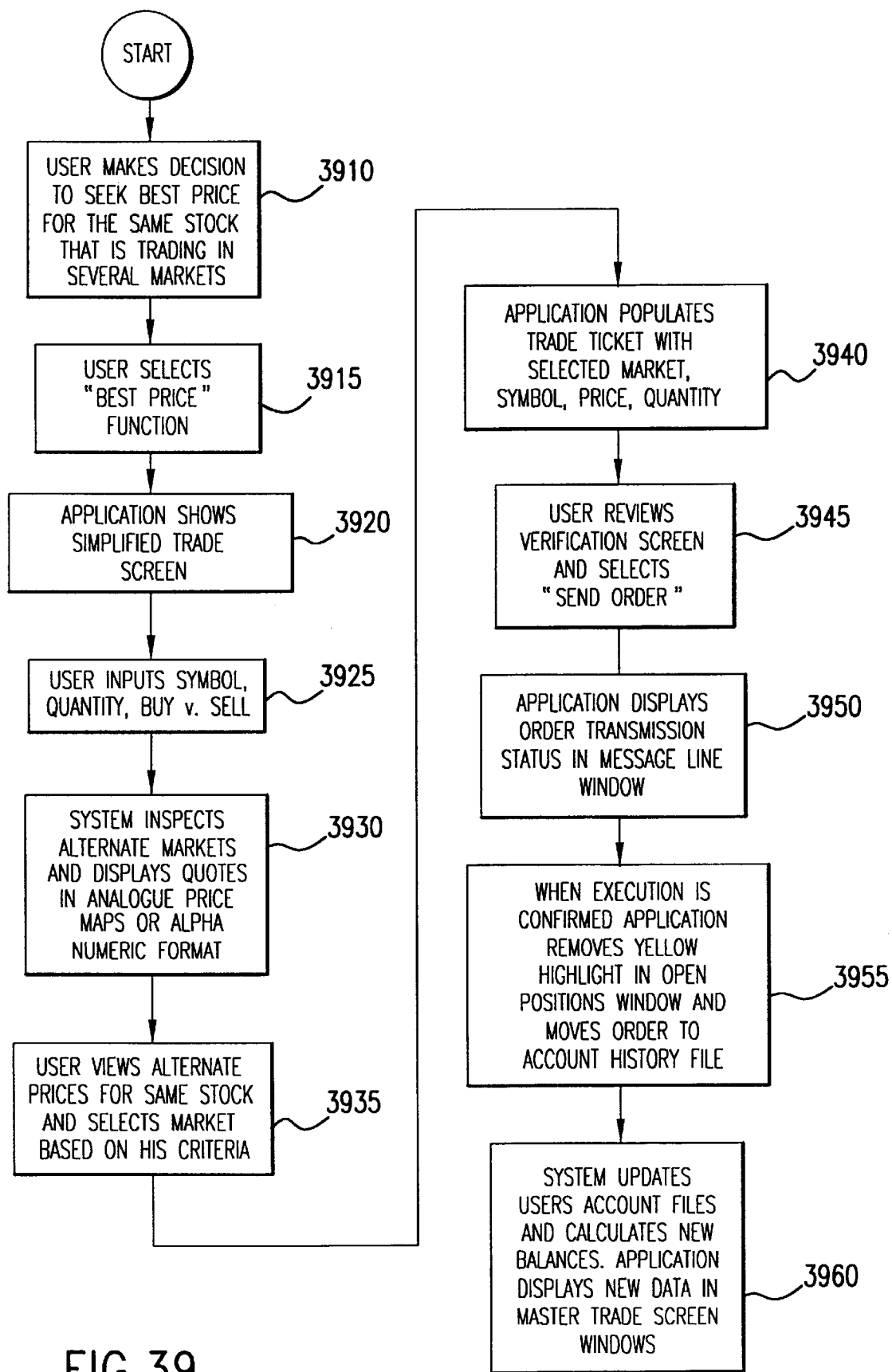
FIG. 39 is a flow diagram illustrating software which enables a user to view and select the best price for the same stock sold in several markets.

FIG. 39 is a flow diagram illustrating software which enables a user to view and select the best price for the same stock sold in several markets. Initially, at step 3910, the user makes the decision to seek the best price for the same stock that is trading in several different markets. At step 3915, the user selects the "Best Price" function. The application shows the simplified trade screen at step 3920. The user inputs the symbol for the stock, at step 3925, the quantity, and whether he wants a buy price or a sell price. The application transmits the user's request to the replica server. The replica server searches its database which contains stock market information updated in real-time. The replica server then transmits information for that stock to the user's application, which, at step 3930, displays information on alternate markets and displays quotes in analog price maps (see FIG. 57) or in alphanumeric format. At step 3935, the user views alternate prices for the same stock and selects a market. At step 3940, the application populates the trade ticket (see FIGS. 5 & 11) with selected market, symbol, price, and quantity information. The user reviews the verification screen, at step 3945, and selects Send order. The application transmits the user's order to the broker/dealer server, which in turn transmits the order to the requested market. In the meantime, at step 3950, the application displays the order transmission status in the message line display. When execution is confirmed, at step 3955, the broker/dealer server notifies the user's application. The application removes the yellow highlight in the open positions display and moves the order to the account history file. The broker/dealer server updates the user's account files, at step 3960, and calculates new balances. The application updates new data in the master trade screen displays.

Figure 40:
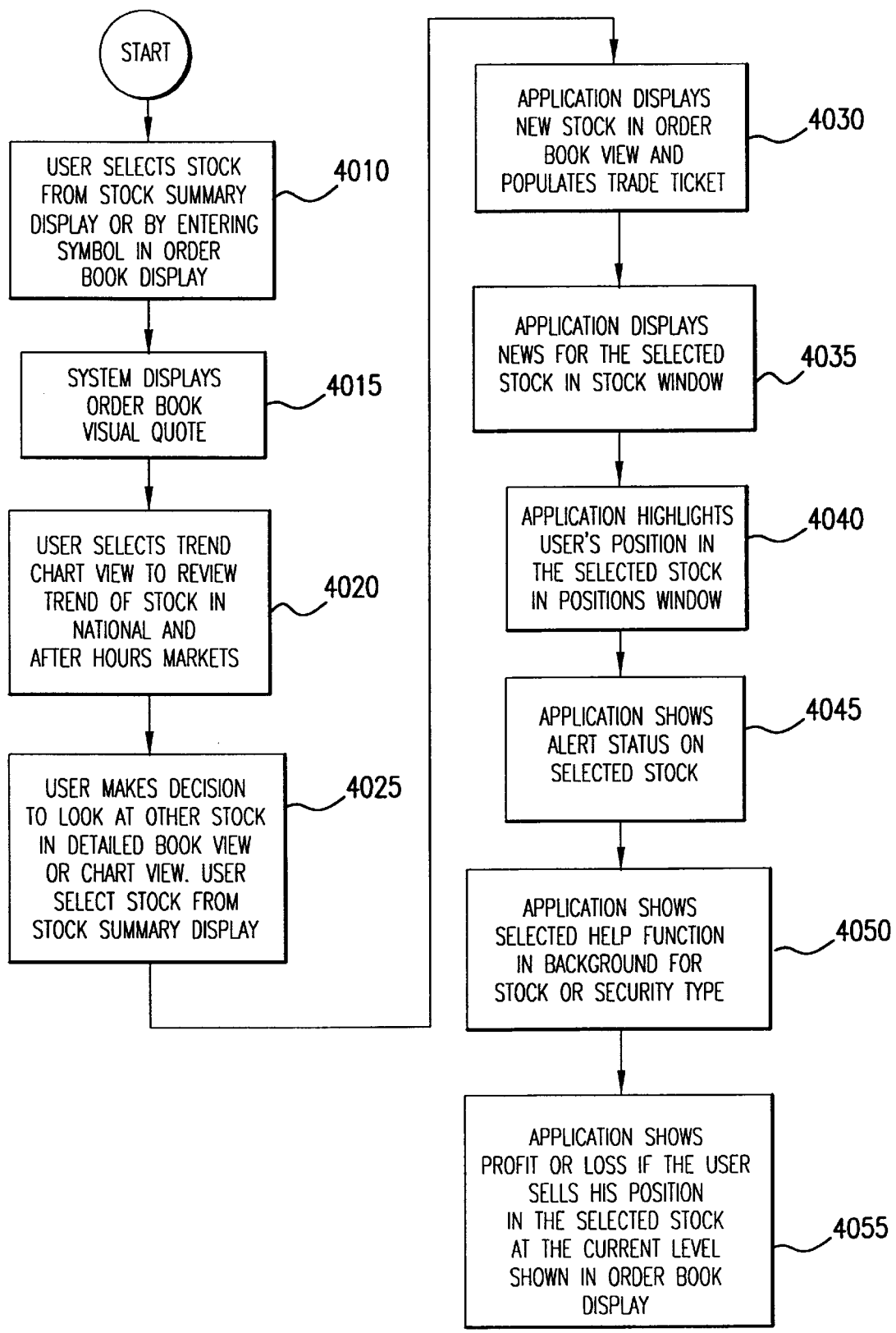
FIG. 40 is a flow diagram illustrating software which enables a user to view the market in a stock by accessing the visual quote and providing visual display of stock performance.

FIG. 40 is a flow diagram illustrating software which enables a user to view the market in a stock by accessing the visual quote (see FIGS. 5 & 6) and price map display. Initially, at step 4010, the user selects a stock from the stock summary display (see FIGS. 5 & 12) or by entering the stock symbol in the order book display (see FIGS. 5 & 6). The application transmits the user's request to the replica server, which sends the requested information back to the user's application. This information is kept updated in real-time by the replica server. At step 4015, the application displays the order book visual quote, which includes the following information: (1) prices in descending order; (2) quantities at a given price level; (3) the user's orders at a price level; (4) buy side best price; (5) sell side best price; (6) the bid-offer spread; (7) an alphanumeric quote for the stock; (8) all-or-none orders at price levels; (9) a chart function button; (10) a most active button; (11) the news out indicator; (12) the market open/closed indicator; (13) the symbol entry field; and (14) the compress spread function. If the price map display (see FIG. 13) is selected, the display includes: (1) a low-resolution price scale; (2) a closing price in the national market(s); (3) the current spread in the after-hours market; (4) the last sale in the after-hours market; (5) the user's average price on shares held; (6) the user's current P&L; (7) the user's current total position; (8) the user's numeric price average; and (9) the Buy and Sell buttons.

At step 4020, the user selects the trend chart view (see FIG. 14) to review the trend of the stock in the national and after-hours markets. The user makes the decision, at step 4025, to look at another stock in the detailed book view or chart view, and selects the stock from the stock summary display. The application transmits the user's request to the replica server, which transmits the requested information back to the user's application. This new information is kept updated in real-time by the replica server. The application displays the new stock in the order book view, at step 4030, and populates the trade ticket (see FIGS. 5 & 11). At step 4035, the application displays news for the selected stock in the stock display. At step 4040, the application highlights the user's position in the selected stock in the positions display. The application shows the alert status on the selected stock at step 4045. The application also, at step 4050, shows the selected help function in the background for the selected stock or security type. The application shows profit or loss, at step 4055, if the user sells his position in the selected stock at the current level shown in the order book display (see FIGS. 5 & 6).

As noted, the invention may be used in negotiations between two users relating to the sale of a security. Display screens useful in such negotiations are set forth in FIGS. 41–48.

FIG. 41 is the "Set defaults" display for the user-to-user negotiation mechanism of the preferred embodiment. This display allows the user to set parameters to screen out unreasonable (according to the user's standards) counteroffers. The user inputs his desired parameters in the boxes 4105, 4110, 4115, and 4120 under questions 1 through 4. In the box 4105 under line 1, the user inputs the price above and below his limit price within which he is willing to negotiate, in increments of sixteenths of a dollar. For example, if his limit price is $50 per share, and he is willing negotiate at prices between $49.75 and $50.25 per share (depending on whether the order is a buy or sell order), he would enter 0.25 into the box 4105 under question 1. The user enters the number of shares above or below his stated order size that he is willing to negotiate in the box 4110 under question 2. For example, if the user is offering to sell 100 shares, but would consider selling 80–120 shares, he would enter 20 in the box 4110 under question 2. If zero is entered, the order is an all-or-none order. This negotiation floor and ceiling is expressed alternatively in percentages; see FIG. 42. The user enters his default preferred negotiation time in the box 4115 under question 3. For example, if the user would prefer to have 10 minutes to respond to any buy offers, he would enter "10 min." in box 4115. The user enters the lower time limit he will accept in the box 4120 under question 4. For example, if the user would not consider any offers which require him to respond in less than 2 minutes, he would enter "2 min." in box 4120.

The user sets the defaults for the incremental changes caused by clicking the adjustment buttons in the negotiations screen (see FIG. 42) by inputting the desired increment sizes into boxes 4125, 4130, and 4135 under questions 5, 6, and 7. The user inputs the desired size incremental change to be caused by clicking the size change buttons ("Qty Up" and "Qty Down") (see FIG. 42) into the box 4125 under question 5. This size change is shown here in terms of number of shares; alternatively, the size change can be a percentage (see FIG. 42). The user inputs the desired time incremental change to be caused by clicking the time change buttons ("Time Up" and "Time Down") (see FIG. 42) into the box 4130 under question 6. The user inputs the desired price incremental change to be caused by clicking the price change buttons ("Price UP" and "Price Down") (see FIG. 42) into the box 4135 under question 7.

FIG. 42 is a negotiations screen. Users of the system can undertake direct, real-time on-line negotiations with other traders on the system. The purpose of the negotiations system is to permit traders to attempt to better the price of buying or selling stock as compared against the best bid and offer shown in the order book display. The negotiations screen has three main components: the "Traders at a price level" screen 4200, the "Out-going negotiations" screen 4205, and the "In-coming negotiations" screen 4210. The traders listed in the screen 4200 are called up by double-clicking on a quantity away from the best bid and offer shown in the order book display (see FIG. 25). The price corresponding to the quantity double-clicked in the order book display is the price listed in the "Price" column 4260 of the negotiations display traders screen 4200. In the example shown in FIG. 42, that price is 52.5. The numbers 4215 in parentheses adjacent to the best price amounts are the numbers entered by the traders designating the price above/below their limit price at which they are willing to negotiate. In the example shown, Fred D. is willing to negotiate within 3/16 (0.1875) of 52.5. Analogously, the numbers in the Qty column represent the number of shares each seller is offering for sale, and the numbers 4220 in parentheses adjacent to the share numbers have been entered by the sellers to designate the variation from the stated number of shares with respect to which they are willing to negotiate. Thus Fred D. is offering to sell 200 shares, but he might be willing to sell between 160 and 240 shares. The numbers in the "Time" column have been entered by the sellers, and designate their preferred negotiation times. The numbers 4225 in parentheses designate the lower time limit each trader will accept. The numbers in the "Activity" column 4230 represent the trader's level of trading activity in the selected stock. The numbers are in the set {0, 1, 2, 3, 4}, where 0 means that the trader has never negotiated a trade in that stock and 4 means that the trader is among the most active traders in that stock. The P/L-BBO column 4284 displays the user's loss or gain as compared to the current best bid or ask for the stock being negotiated. The price buttons 4240, the size buttons 4245, and the time buttons 4250 are located near the bottom of the negotiations display. Default incremental changes are set in the "Set defaults" screen (see FIG. 41) (the "Set defaults" screen is called up by clicking the "Set defaults" button 4235). Incorporated in the negotiation interface is a "Speed Function": if the user holds down the Shift key while selecting a trader, the application populates the trade window with the lowest acceptable values for the selected trader. This feature reduces typing and starts the negotiations at the lower limits. For example, the minimum values for Larry 22 are 52 (52.5−0.5), 500 (1000−50% of 1000), and 2 minutes (the lowest time limit he will accept). To initiate negotiations with a given trader, the user double-clicks on the trader line 4255 in the trader screen 4200. In the example shown, the selected trader is Larry 22. The "Best offer" button 4265 is used to arrange the order of the listed buyers or sellers according to the ones which most closely satisfy criteria set by the user. Available parameters include: widest price variation counteroffer; most time allowed; and highest activity level. A "not-to-exceed" field can be selected to limit order size above or below a certain amount. The button 4270 adjacent to the "Best offer" button displays a price 1/16 lower, in this case, from the listed price (52.5). The user can click button 4270 to have the application display parties selling at 52.438. This improves the trading efficiency of the user by not requiring him to return to the order book display and click on a different price. The three buttons to the right of button 4270 work the same way. The "Sort" button 4275 allows the user to specify the parameters according to which the traders are listed; for example, according to price, quantity, or time. The "FIND" bar 4214 at the bottom of the negotiations screen allows a user to modify the negotiations screen display without having to return to the order book display. Clicking on the "Action" button 4216 creates a pop-up menu with the choices "Buy" and "Sell." Clicking the "Stock" button 4222 creates a pop-up menu listing recently checked stocks, along with a box into which the user can input the symbol of a stock not displayed. Entering or selecting a stock pulls up a display of trades in that stock. The first price level displayed is that of one price increment away from the best bid and offer (BBO) as shown in the order book. The user can select price increments above or below the first increment by selection of the price increment buttons. Clicking the "Trader" button 4232 creates a pop-up menu with a box into which the user can input the name of a trader of interest. The application will display the selected trader's current limit order or outstanding negotiations in all stocks in which the trader has limit orders posted. Clicking the "Trader list" button 4242 creates a pop-up "hot list" of traders. This hot list is created by the user using the "Add" button 4252 and the "Delete" button 4262. Clicking the "Add" button 4252 after the user has typed in the name of a trader using the "Trader" button 4232 adds that trader's name to the "Trader list." Also, if a user has highlighted a trader's name in the "Traders at a price level" display 4200, that user's name is added to the "Trader list" when the "Add" button 4252 is clicked. Clicking the "Delete" button 4262 when a trader's name in the "Trader list" removes that trader's name from the Trader list. When the user highlights a selection of trader names in the Trader list and hits "Enter," the "Traders at a price level" screen 4200 displays the selected traders and the selected stock, along with those traders' outstanding offers in that stock.

When a user enters a limit order by using the trade ticket, he has the option (by checking the "Negotiations allowed" box on the trade ticket display—see FIG. 11) to allow negotiations or not. If the user checks the "Negotiations allowed" box, the application will allow the user's order to appear in the negotiations screen. If the "Negotiations allowed" box is not checked, the user's order will not be displayed in the negotiations screen.

The "Broadcast" button 4212 permits a user to send the same offer to more than one trader. The first trader to respond is the one with whom the user negotiates. The user selects the traders to whom the offer will be sent by highlighting their names in the "Traders at a price level" screen 4200.

FIG. 43 shows how the negotiation screen 4200 fits into the master trade screen (see FIG. 5). The user requests the negotiation display by selecting a negotiation button 1530. In response, the application displays at 4200 the negotiation screen as discussed in connection with FIG. 42.

FIG. 44 illustrates how a user adjusts the values in his counteroffer. Once Larry 22's trader line 4255 has been selected and double-clicked, a copy 4415 of his trader line appears in the Out-going Negotiations screen 4205. The activity level of the trader is displayed, along with the identity 4425 of the stock to which the activity level refer. This helps the user keep clear which stock he is making offers and counteroffers on, and is especially helpful when several offers on different stocks have been made. The user in the example illustrated in FIG. 44 is RON-3, and the "counter-line" below Larry 22's line 4415 is highlighted in yellow and automatically pre-filled with the user's name and related data. If the Speed Function is used (by holding down the Shift key when line 4255 is double-clicked), the counter-line is filled with Larry 22's minimum values.

The size change buttons 4240 are used to adjust the value 4410 displayed in the user's counter-line 4405. The size buttons 4245 are used to adjust the number of shares 4420 displayed in the user's counter-line 4405. The time buttons 4250 are used to adjust the time values 4430 displayed in the user's counter-line 4405. The numbers shown in parentheses in the user's counter-line are the default values set in the "Set defaults" display (see FIG. 41). The user can adjust these values by directing typing over them in the counter-line 4405.

FIG. 45 illustrates how the application displays the potential effect of a user's counteroffer. Once the price, quantity, and time parameters are set for the user's counteroffer, the application displays the cost 4520 of the user's proposed transaction (if the transaction is a purchase; if the transaction is a sale, the price to be received for the shares would be displayed—see FIG. 47). The number 93.50 4725 in the P/L column is the difference between what the user would pay at the best ask price displayed on the system and what the user would pay at the price per share in that negotiations row. In the example shown, the best ask price per share is assumed to be 52.187. Thus, if the user buys 500 shares at 52, he will 4725 pay $93.50 less than he would have paid at the best bid price.

FIG. 46 illustrates how an offering trader responds to a user's counteroffer. The trader in the example, Larry 22, has made a counteroffer 4610 ("Counter 2") to the user's Counter 1 offer. Larry 22 has responded with an offer to sell at 52.25 4615 instead of 52, to sell 800 shares 4620 instead of the 500 the user offered to buy, and has specified a response time 4625 of 1 minute. The application displays Larry 22's level of trading activity 4640, and displays the amount 4630 the user would have to pay to accept Larry 22's counteroffer.

FIG. 47 illustrates how a user makes an offer to sell and then receives buy counteroffers. In the example, the user is RON-3. The user has made a sell offer 4710, which is displayed in the In-coming negotiations screen 4210. The user is offering to sell 2000 shares of the stock whose symbol is "T" 4750, at a price per share of 152.5, and would prefer to have 10 minutes to consider counteroffers. Further, the user is only willing to consider counteroffers of 152 per share or above, of at least 1000 shares, and demands at least 2 minutes to consider such offers. If the user's offer to sell is accepted as is, the user would sell his 2000 shares for $305,000. The number 1,567 4725 in the P/L column is the difference between what the user would receive at the best bid price displayed on the system and what the user would receive at the price per share in that negotiations row. In the example shown, the best bid price per share is assumed to be 153.284. Thus, if the user sells his 2000 shares at 152.5, he will 4725 receive $1,567.00 less than he would have received at the best bid price. The counteroffer 4720 has been made by Fred 4U. He is offering to buy 1000 shares at 152 per share and requests a response in 2 minutes. Note that these are the minimum values of the user's offer, so Fred 4U may have used the speed function to initiate his counteroffer. The application has calculated the dollar amount of Fred 4U's counteroffer and displayed that value in the "Total $" column.

FIG. 48 illustrates how the preferred embodiment enables a user to conduct more than one in-coming negotiation and more than one out-going negotiation simultaneously. In the example shown, the user, RON-3, has an out-going negotiation 4810 with Larry 22 on shares of IBM stock. The user also has an out-going negotiation 4820 with Frank5 on shares of DELL stock. At the same time, the user has two in-coming negotiations. The first is a negotiation 4830 with Fred 4U for shares of T stock. The second in-coming negotiation 4840 is with David44 for shares of YHOO stock. Although it would be obvious to one of ordinary skill in the art to modify the preferred embodiment to enable a user to conduct more than 4 negotiations at once, the preferred embodiment is restricted to displaying only two incoming and two outgoing negotiations so as to maximize the trading efficiency of the user.

Figure 48A:
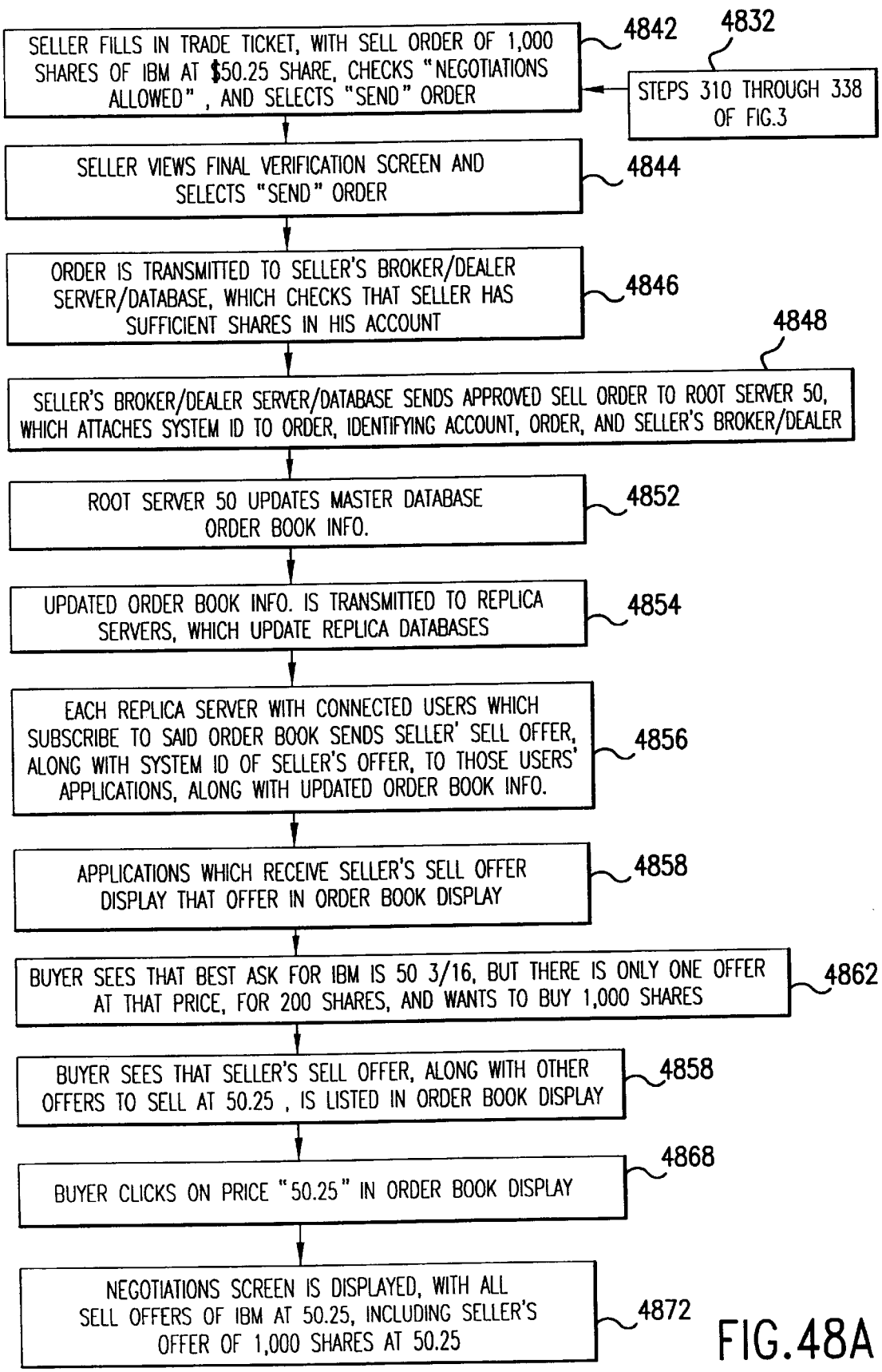
FIGS. 48A and 48B show a flow diagram illustrating how the system enables one user to negotiate with another user.
Figure 48B:
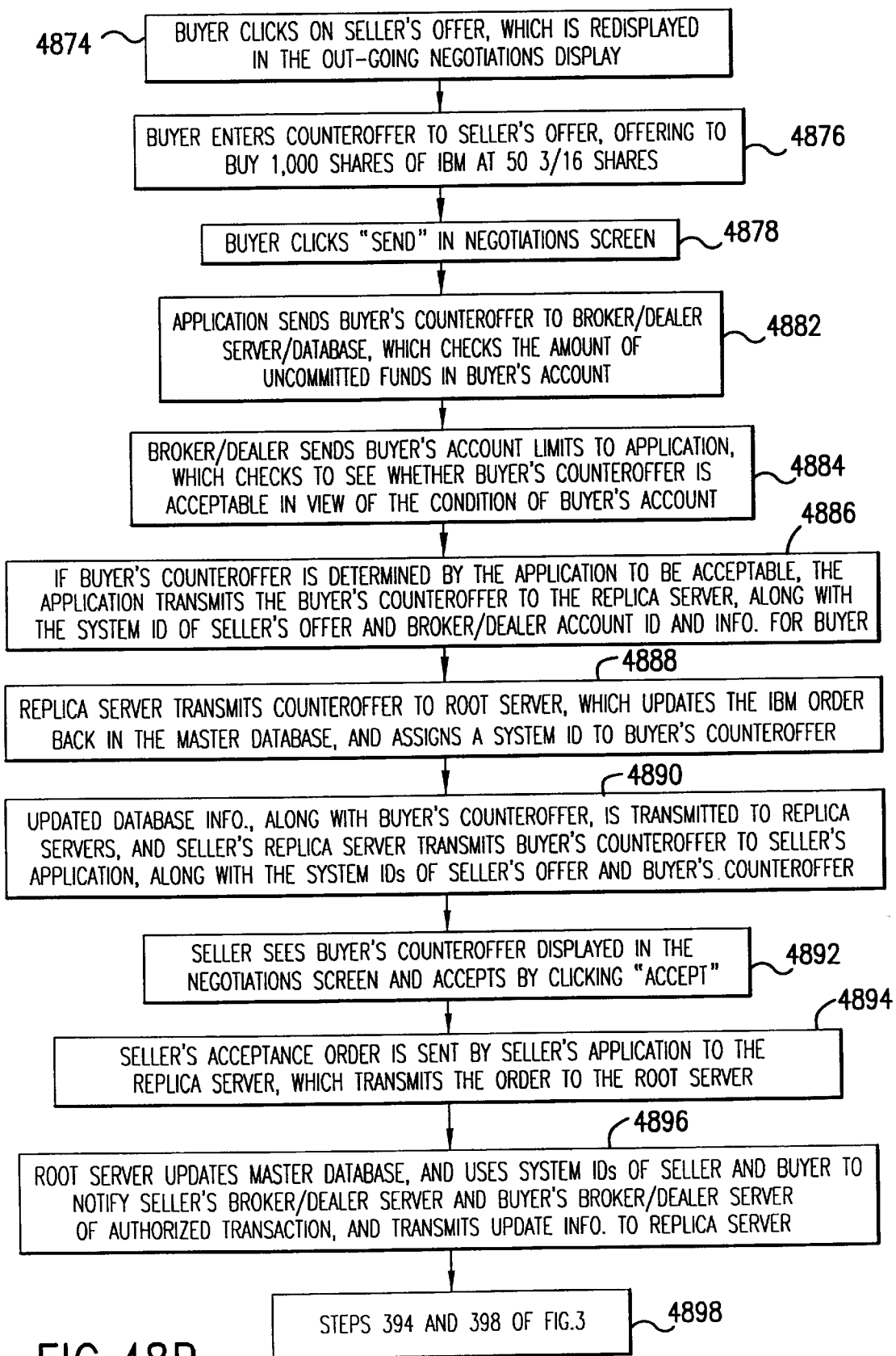

FIGS. 48A and 48B show a flow diagram illustrating how the system enables one user to negotiate with another user. Step 4832 involves a seller activating the application and viewing the order book for a particular stock. This done the same as for a standard buy or sell order, by following steps 310 through 338 as described in FIG. 3. At step 4842, the seller wishes to sell 1000 shares of IBM at $50.25 per share. The user fills in the trade ticket 510 with the relevant information, and checks the box for "Negotiations allowed" 1175. The seller then the send order button (the "Verification" button 1110). The final verification screen is displayed at step 4844, and the seller selects the "Send' order button. At step 4846 the seller's order is transmitted to the seller's broker/dealer server/database, which checks that seller has at least 1000 shares of IBM available to sell. The broker/dealer server/database sends the approved sell order (with a user account ID and the size, price, stock, and side (whether buy or sell) of the order) to the root server 50, which attaches a system ID to the order, said system ID containing sufficient information to enable the system to match the ID to the seller, the order, and the seller's broker/dealer. At step 4852, the root server accepts the seller's order and updates the IBM order book in the master database to reflect the seller's order. The updated order book is transmitted at step 4854 to the replica servers 30, which update the replica databases. At step 4856, each replica server/database with connected users which subscribe to the IBM order book sends seller's sell offer (along with the system ID of the seller's offer), along with any other updated order book information, to the IBM subscribers' applications. At step 4858, the applications which receive the seller's sell offer display that offer in the context of the IBM order book display. At step 4862, a buyer sees from the IBM order book display that the best ask price for IBM is 50 3/16, but there is only one offer at that price, the offer is to sell only 200 shares, and the buyer wishes to buy 1000 shares of IBM. At step 4864, the buyer sees in the order book display that there are more than 1000 shares for sale at 50.25. The sell orders at 50.25 are aggregated in the order book display, and the seller's order is included in that aggregation. At step 4868, the buyer decides to try to negotiate, so he clicks on the price $50.25 in the order book display. The negotiations screen 4200 is displayed at step 4872, with sell offers of IBM stock at $50.25 displayed, including the seller's offer to sell 100 shares of IBM at $50.25. At step 4874, the buyer clicks on the seller's offer that is displayed in the negotiations screen. The seller's offer is then re-displayed in the out-going negotiations display 4205 in line 4280. At step 4876 the buyer enters a counteroffer to seller's offer into the line 4285 below the seller's offer as displayed in line 4280, offering to buy 1000 shares of IBM stock at 50 3/16. The buyer then selects the "Send" button at step 4882 to send his counteroffer to seller. At step 4882 the application sends the buyer's counteroffer to the buyer's broker/dealer server/database, which then checks the amount of uncommitted funds in the buyer's account and sends the buyer's account limit information back to the application. The application at step 4884 checks to see whether the buyer's counteroffer is permissibly under the limits on the buyer's account. At step 4886, if the buyer's counteroffer is determined by the application to be acceptable, the application transmits the buyer's counteroffer to the replica server, along with the system ID of the seller's offer and the broker/dealer account ID for buyer. The replica server at step 4888 transmits the buyer's counteroffer, seller's offer's system ID, and buyer's broker/dealer account ID to the root server, which then updates the IBM order book in the master database and assigns a system ID to the buyer's counteroffer. The updated order book information, including the buyer's counteroffer to seller and the system ID for seller's offer, is then transmitted at step 4890 to the replica servers, which update the replica databases. The replica server connected to seller transmits buyer's counteroffer to seller's application, along with the system IDs of the seller's offer and the buyer's counteroffer. At step 4892, the seller's application displays the buyer's counteroffer as an incoming negotiation and the seller accepts the buyer's offer by selecting the "Accept" button (see FIG. 47). If the buyer's counteroffer has affected the prior account approval of seller's offer by the seller's broker/dealer (say, e.g., that buyer had offered to buy 2000 shares and seller accepted), seller's acceptance would be first be routed to seller's broker/dealer for approval before the application would transmit the acceptance to the replica server. At step 4894, the seller's acceptance order, including the system IDs of the seller's original offer and the buyer's counteroffer, is transmitted by the seller's application to the replica server 30, which transmits the order to the root server 50. At step 4896, the root server updates the master database, including the IBM order book; uses the system IDs of the buyer's counteroffer and the seller's original sell offer to notify the seller's broker/dealer server and the buyer's broker/dealer server of the nature of the approved transaction; and transmits updated order book information to the replica servers. Step 4998 is the final step of closing the transaction, and is the same as steps 394 and 398 of FIG. 3. In an alternate embodiment of the negotiations system and method, all buy sell orders and all offers and counteroffers are routed through and approved by the broker/dealer(s) in a manner analogous to that described in FIG. 3.

Several additional displays that are useful in the practice of the invention are shown in FIGS. 49–62.

Figure 49:
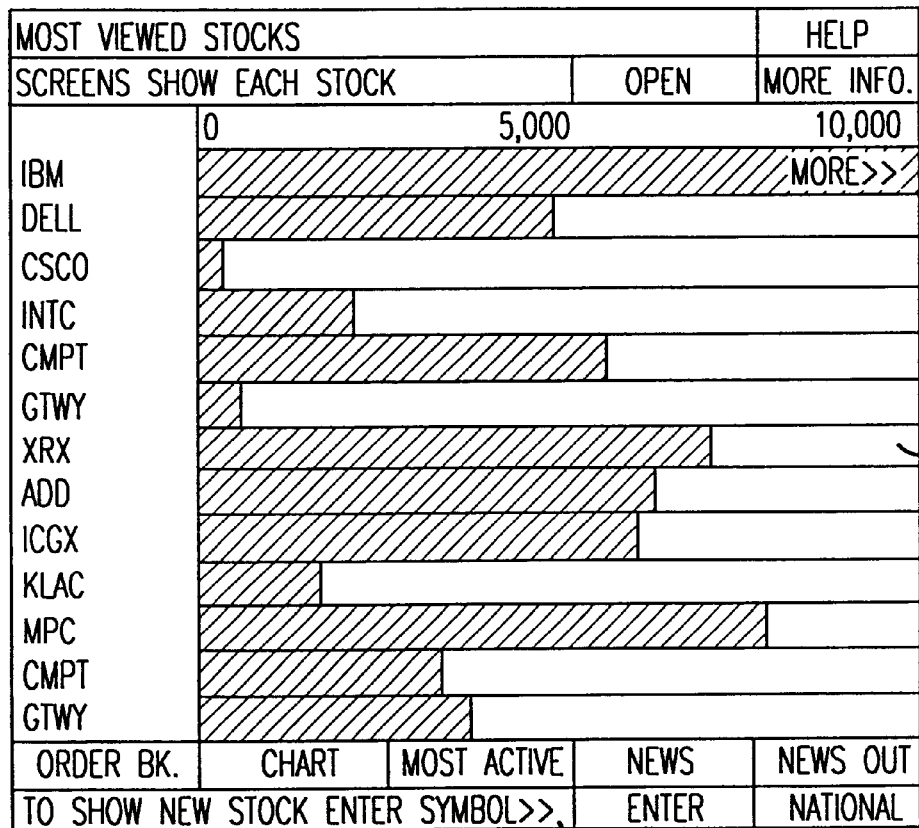
FIG. 49 is a "Most viewed stocks" display.

FIG. 49 is a "most viewed stocks" display. The most viewed stocks display is displayed in the same part of the master trade screen as the order book display, the multiple pricing map display, and the chart of stock activity display (see also FIG. 57B). The bars 4910 represent the number of participants in the system who have recently viewed the listed stocks. As a default, the stocks are listed in descending order of the number of shares traded in the most recent period. The user can enter the symbol into the box 4920 of a stock of interest that is not displayed in order to have that stock displayed at the top of the Most viewed stocks display.

The advantage of the most viewed stocks display is that it enables a user to determine what stocks other users have been checking. This in turn aids the user to determine, for example, what stocks he needs to be searching for news reports on.

Figure 50:
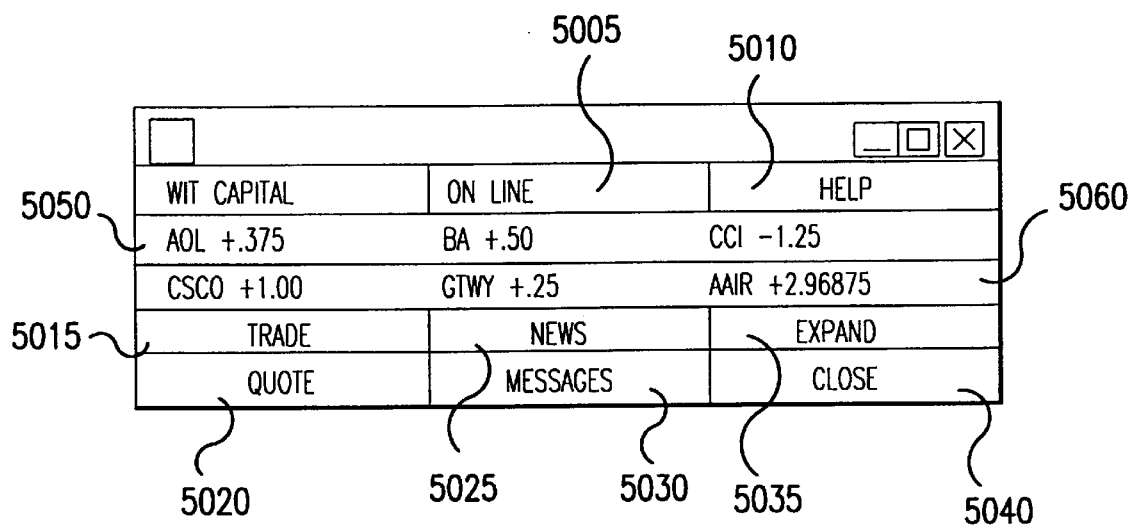
FIG. 50 is a fully compressed view of the GUI of the application (see FIG. 16).

FIG. 50 is a fully compressed view of the GUI of the application (see FIG. 16). A frequent problem with current on-line trading systems is the need for the user to open up an entire browser to view the status of stocks of interest. Such a process wastes time and requires the user to rearrange his screen work space or cover other work while viewing the status of stocks of interest. FIG. 50 shows the fully compressed stock display that can be displayed on the user's screen at all times while not obstructing the user's workspace. The component is a real-time display that shows the current status of user-defined stock portfolios, indexes, or any other electronically delivered status indicators. The "On Line" indicator 5005 shows whether or not the user is connected to the system. If the "Help" button 5010 is selected, context-sensitive help data is displayed. Selection of a stock followed by selection of the "Trade" button 5015 opens the master trade screen to the fully expanded position with the selected stock shown in the order book and the trade ticket populated. Selecting the "Quote" button 5020 calls up the "Quick Quote" screen (see FIG. 51). The "News" button 5025 flashes if news is out on any stocks on which alerts have been set. The "Messages" button 5030 flashes when the user has e-mail messages, and clicking the button opens the e-mail window. Clicking the "Expand" button 5035 opens the stock summary display (see FIG. 16) and closes the compressed display. Clicking the "Close" button 5040 closes the compressed display and closes the application. Rows 5050 and 5060 display three stock data fields each. The user can type a stock symbol in a data field and receive current status information on that stock. The fields can contain stocks, mutual funds, bonds, any security, index, or related variable. If the user has set visual alarms for a stock displayed in a data field, the background of that field will highlight based on user-defined criteria.

Figure 51:
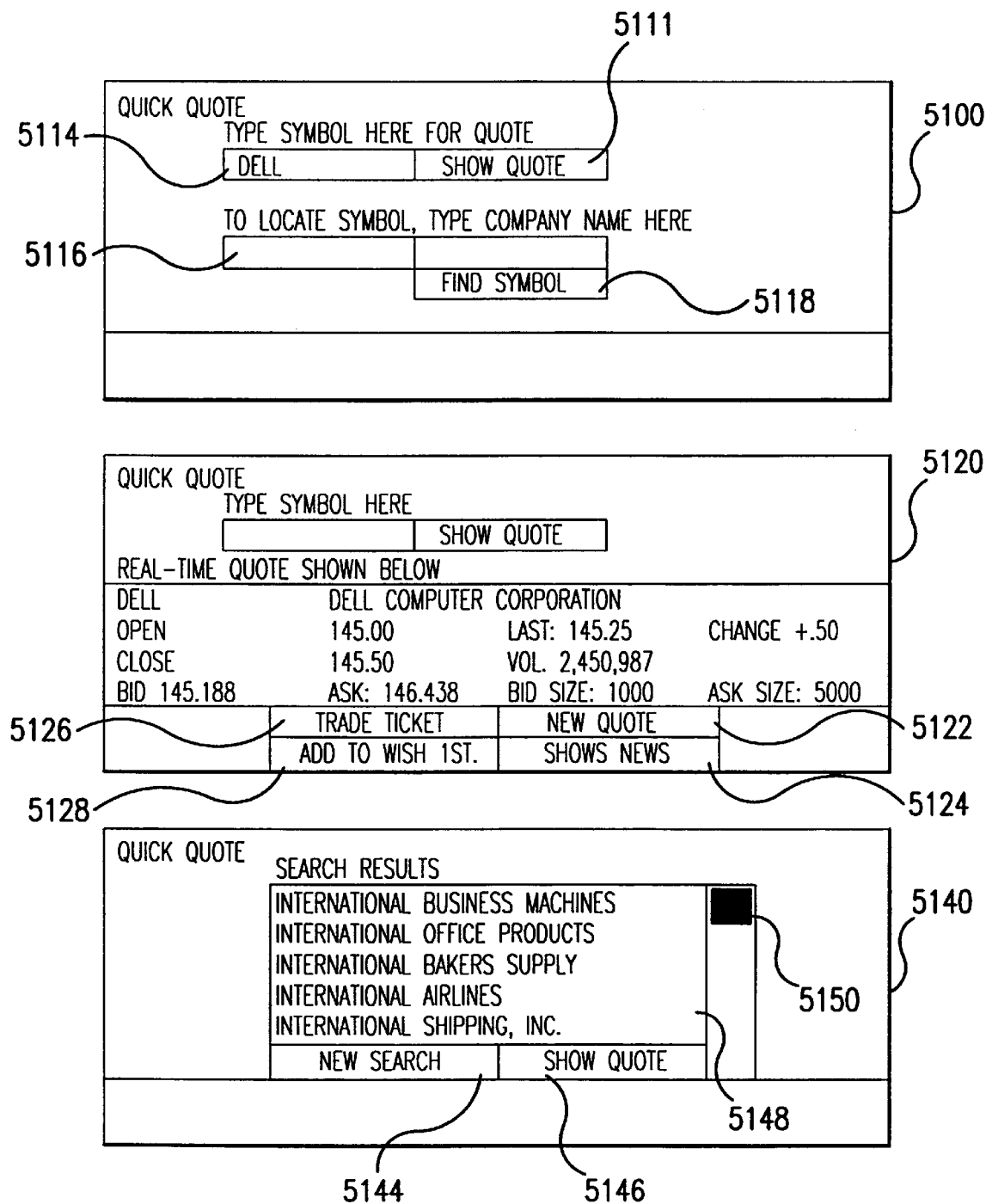
FIG. 51 shows a "Quick Quote" display.

FIG. 51 shows a "Quick Quote" display. The default display 5100 is called up when the user selects the "Quick Quote" button from the function button display (see, e.g., FIG. 5). The user types the symbol for the desired stock in the box 5114 and selects the "Show quote" button 5112 to have data on the stock displayed in the screen 5120. If the user selects the "Trade ticket" button 5126, the trade ticket 510 is pre-filled with the appropriate data on the selected stock, including the user's positions if applicable. If the user selects the "Add to wish lst." button 5128, the stock is added the user's wish (watch) list for further monitoring. If the user selects the "New Quote" button 5122, an empty quote screen 5100 is displayed. If the user selects the "Show News" button 5124, the news window is opened and news on the selected stock is displayed. If the user does not know the correct symbol for the stock, he can enter the name of the company into the box 5116, and then click on the "Find symbol" button 5118. If the company name is not a perfect match with one listed in the master database of the system, the screen 5140 is displayed, with the closest matches 5148 to what the user has typed in displayed. The scroll bar 5150 allows the user to scroll up and down the list of companies. The "New Search" button 5144 calls up the screen 5100. If a company name is selected from the list, the "Show quote" button 5146 calls up the screen 5120, with the stock data for the selected company displayed.

Figure 52:
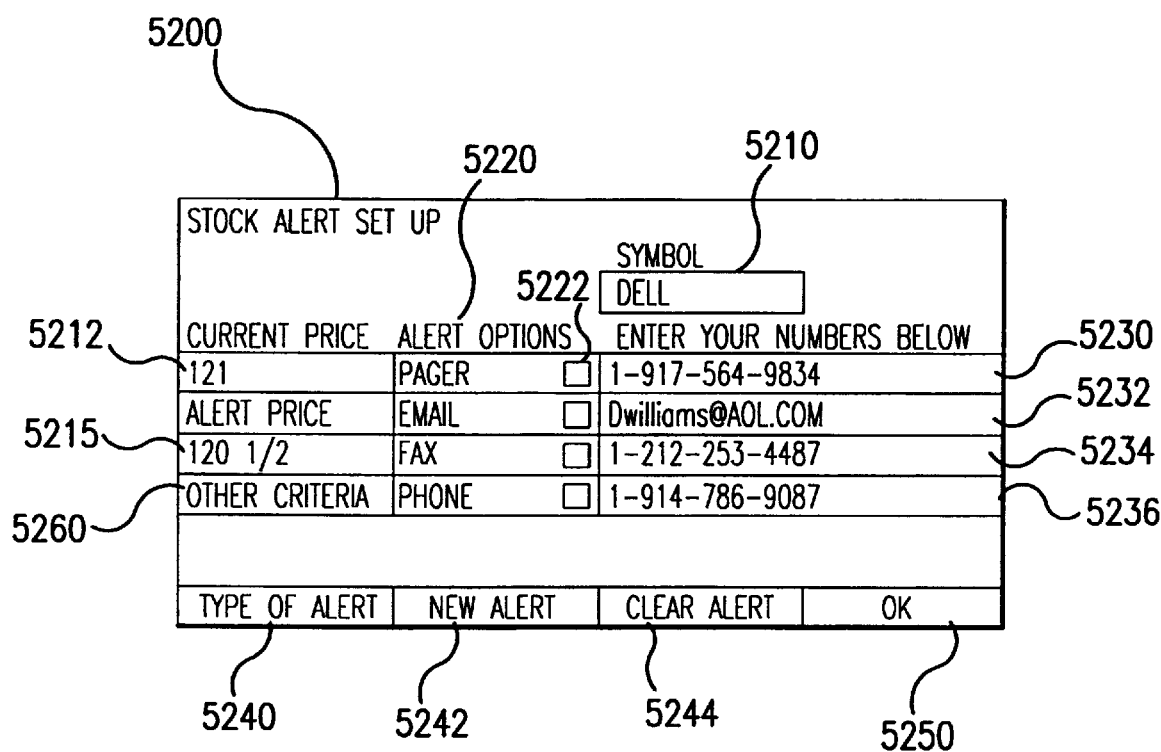
FIG. 52 shows a "Stock alert set up" display.

FIG. 52 shows a "Stock alert set up" display, which allows a user to track the movement of selected stocks. The user calls the stock alert set up display by selecting the "Alerts" button 1525 in the function button display (see FIG. 15). If a stock is first selected from the stock summary display (see FIG. 12) and then the "Alerts" button is selected, the "Stock alerts set up" screen is pre-filled with information from the user's positions and the current status of the stock in the market. If the stock symbol is not pre-filled into the box 5210, the user inputs the symbol for the stock of interest. Once the symbol is input, the current price 5212 of the stock is automatically filled in by the application. The user inputs the price at which he wants to be alerted in the box 5215. The user selects the method by which he wishes to be alerted in the column 5220, by checking the appropriate box 5222. Available options include: pager, email, fax, and phone. The user enters his pager number in the box 5230; his email address in the box 5232; his fax number in the box 5234; and his phone number in the box 5236. If the user selects "Type of Alerts" 5240 and then "visual alerts," the user can have the application highlight the stock in the stock summary display according to various criteria: direction of movement, rate of movement, profit/loss against the user's current positions. The visual alert works on several of the displays where the stock symbol occurs. The "Other criteria" button 5260 calls up a list of alert criteria options for tracking the status of the stock of interest. The "New alert" button 5242 clears the screen for the input of a new stock symbol or new alert parameters. The "Clear alert" button 5244 cancels an alert that has already been set. The "OK" button 5250 records the alert that has been set and removes the "Stock alert set up" screen.

Figure 53:
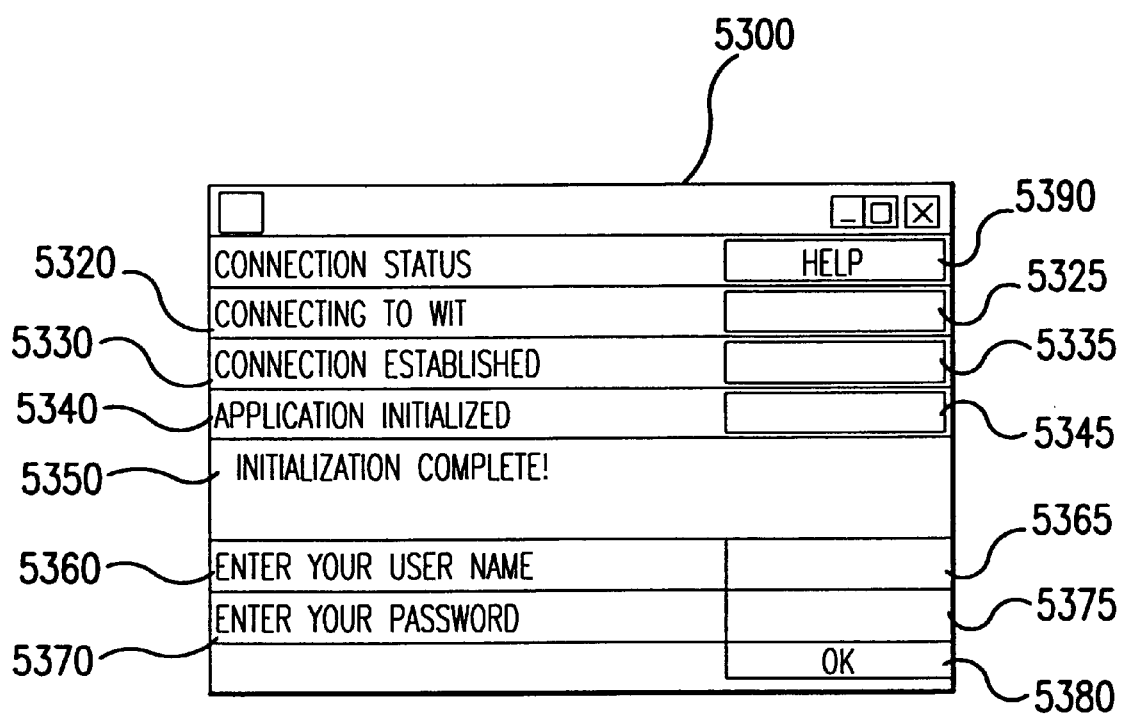
FIG. 53 shows a connection status indication display.

FIG. 53 shows a connection status indication display. Current on-line trading systems do not provide users with a clear, concise status indication of the initial connection process as they log on to the trading system. The connection status display 5300 of the preferred embodiment shows users each step of the connection process. The first connection status indicator 5320 "Connecting to [the trading system]," is indicated by the button 5325 being lit while the connection to the trading system is being established. When the connection is established, the button 5335 opposite the "Connection established" label 5330 is lit. When the application is initialized, the button 5345 opposite the "Application initialized" label 5340 is lit. Once the application is initialized, the message 5350 "Initialization complete!" is either displayed (if not displayed already) or highlighted (if already displayed). The user's name and password input areas do not appear until the connection to the network is established. The user then enters his user name in the box 5365 opposite the "Enter your user name" label 5360. The user also enters his user password in the box 5375 opposite the "Enter your password" label 5370. The user then clicks the "OK" button 5380 to submit his login information to the system and to close the connection status screen. If the user encounters problems connecting, he can access the context-sensitive help function, including detailed problem FAQs and a troubleshooting index, by clicking the "HELP" button 5390.

FIG. 54 shows a compressed spread display (see FIG. 6). The compressed spread screen is called up by clicking the "Compress spread" button 656. The "Compress spread" button 656 compresses the spread, and orders included in the spread, down to one line. The horizontal bar 5460 representing the compressed spread is red. The compressed view shows the last bid, best offer, and a single line spread shown on a red background with white characters. The quantity shown in the red bar is the total price of the spread in one line. "All or none" orders 5440 and 5450 contained within the spread are shown as total amounts. The magnitude 5430 of the spread is displayed numerically in the center of the bar 5460. The magnitude of the spread is displayed graphically by the vertical bar 5410 on the right side of the display.

Figure 55:
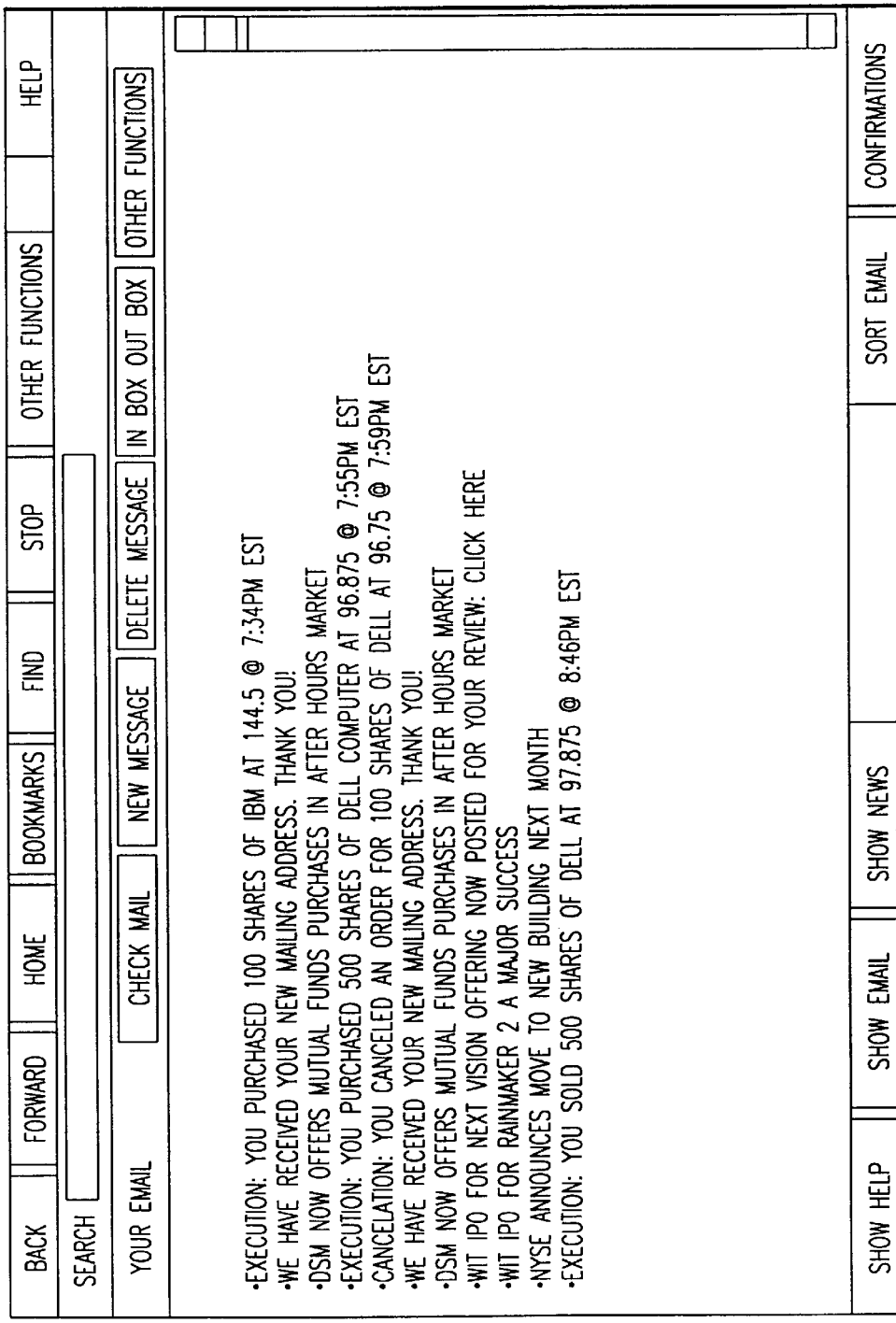
FIG. 55 shows an email display.

FIG. 55 shows an email display. The email display is displayed within the web browser of the application (see FIG. 10). The "Show news" button 5520 is clicked to return to the news display of the browser. The "Show Email" button 5510 is clicked to go from the news display to the email display.

FIG. 56 shows a "Final Verification" screen. The dark area 5610 flashes to alert the user to the significance of completing this step. A real-time quotation 5670 for the selected stock is displayed. The user's buying power 5640 is displayed, along with 5650 what his balance will be if the trade is executed and what the corresponding commission 5630 will be. The total cost 5620 of the trade is displayed at the bottom of the screen in color-coded characters.

Figure 57:
FIG. 57 shows an analog graphic display for viewing the price of a stock on several markets at one time.

FIG. 57 shows an analog graphic display for viewing the price of a stock on several markets at one time (see FIG. 39). The price scale 5710 is at the left. The numbers 1 5720, 2 5730, and 3 5740 represent markets 1, 2, and 3.

FIG. 57A is a "Most Active Stocks" display. The most active stocks in both the Day market (NM) and the Nite Market (AHM) are shown. The scroll bar 5782 allows the user to scroll up and down the list of most active stocks.

Figure 57B:
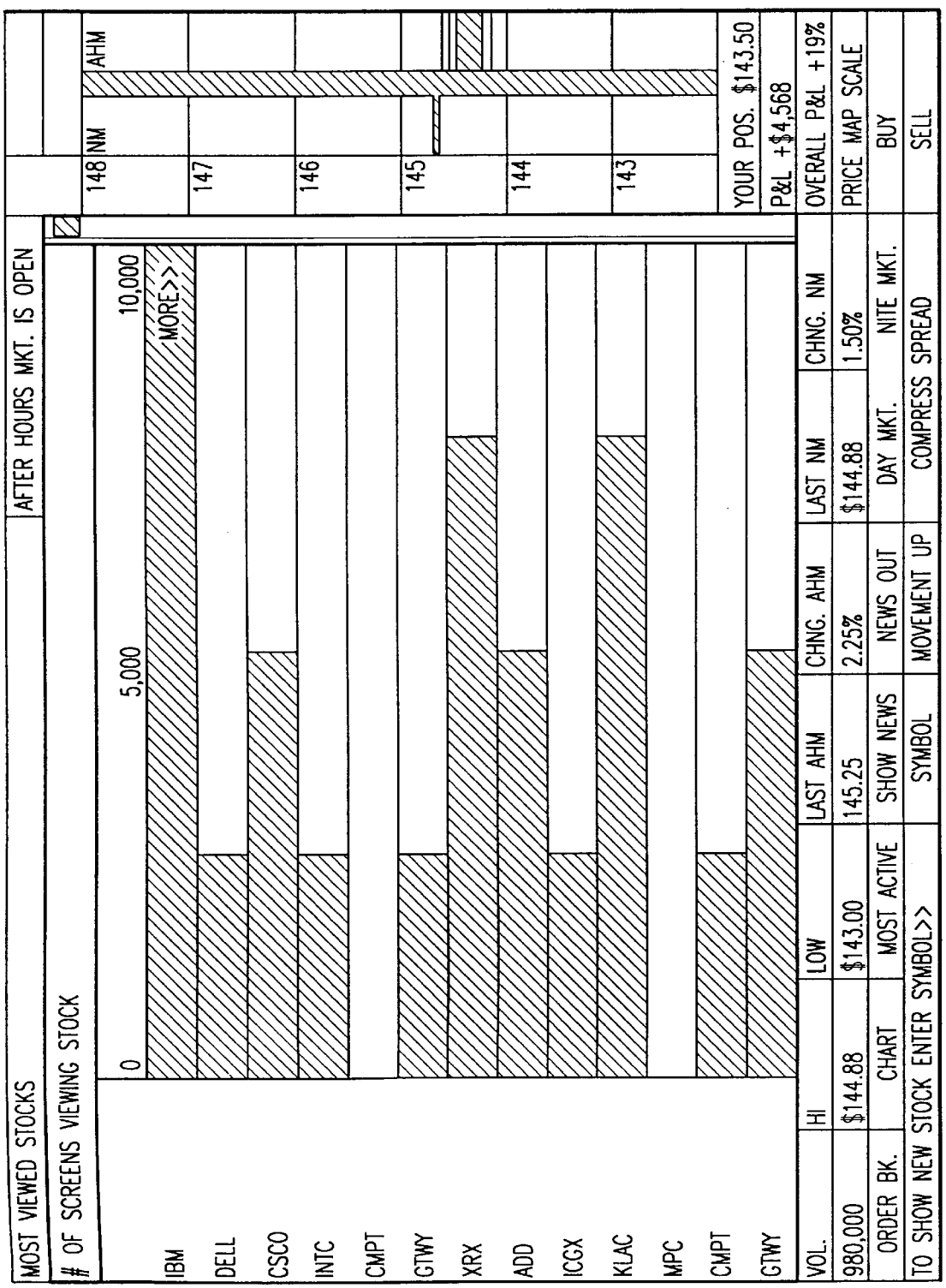
FIG. 57B shows how the most viewed stocks display shown in FIG. 49 is displayed in the same screen as the Order book display, chart display, and most active stocks display.

FIG. 57B shows how the most viewed stocks display shown in FIG. 49 is displayed in the same screen as the Order book display, chart display, and most active stocks display.

Figure 57C:
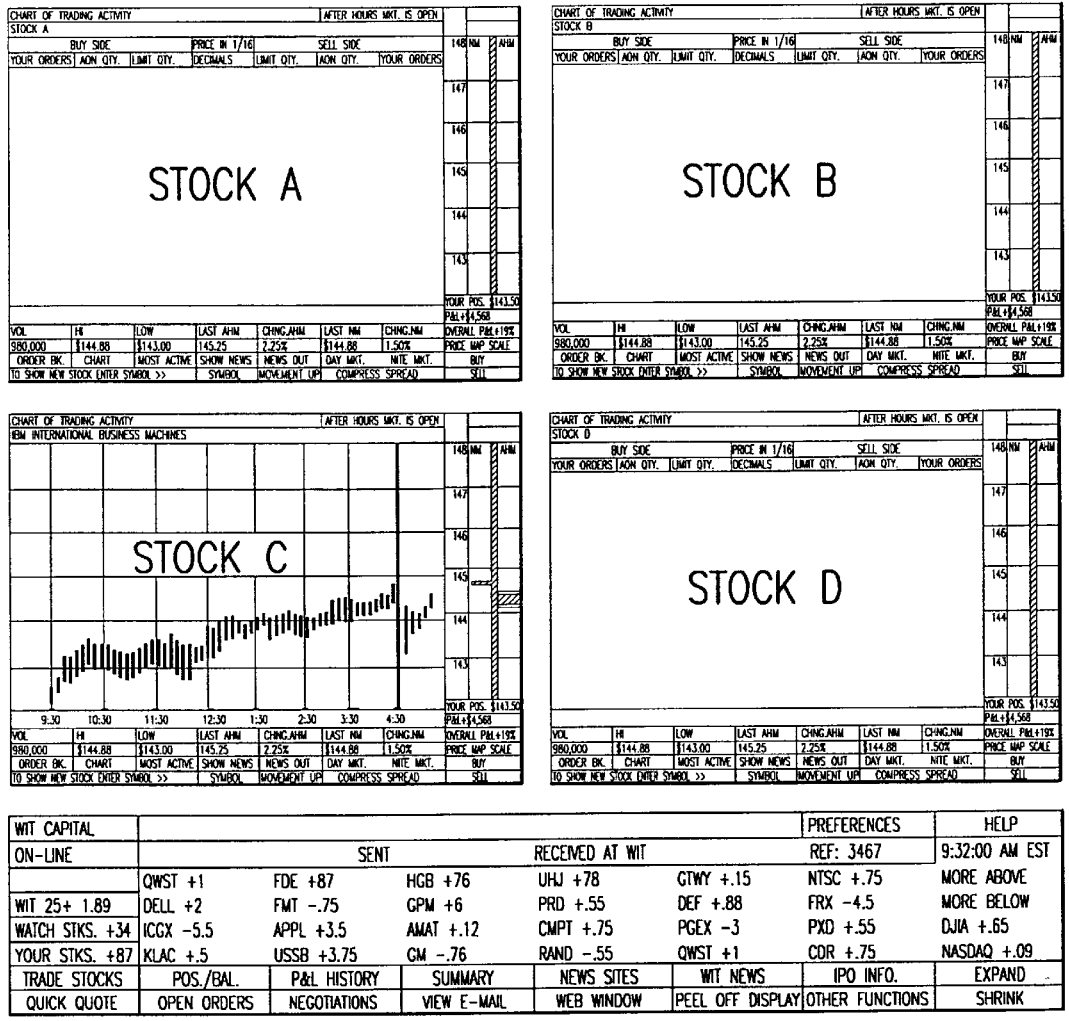
FIG. 57C shows a multi-screen view created by a "Peel off display" function.

FIG. 57C shows a multi-screen view created by the "Peel off display" function (see FIG. 27).

In an alternate embodiment of the disclosed system, instead of being in a stand-alone application, the GUI is displayed within an Internet web browser, and the application is a Java applet. In the applet version, no software remains resident on the user's computer when the system is not being accessed. The functionality of the various components of the GUI remains essentially the same, except for routine modifications (for example, some functionality may be scaled back to reduce the size and download time of the applet). In each display, the scalable price map display (see FIG. 14) is on the right-hand side.

Figure 58:
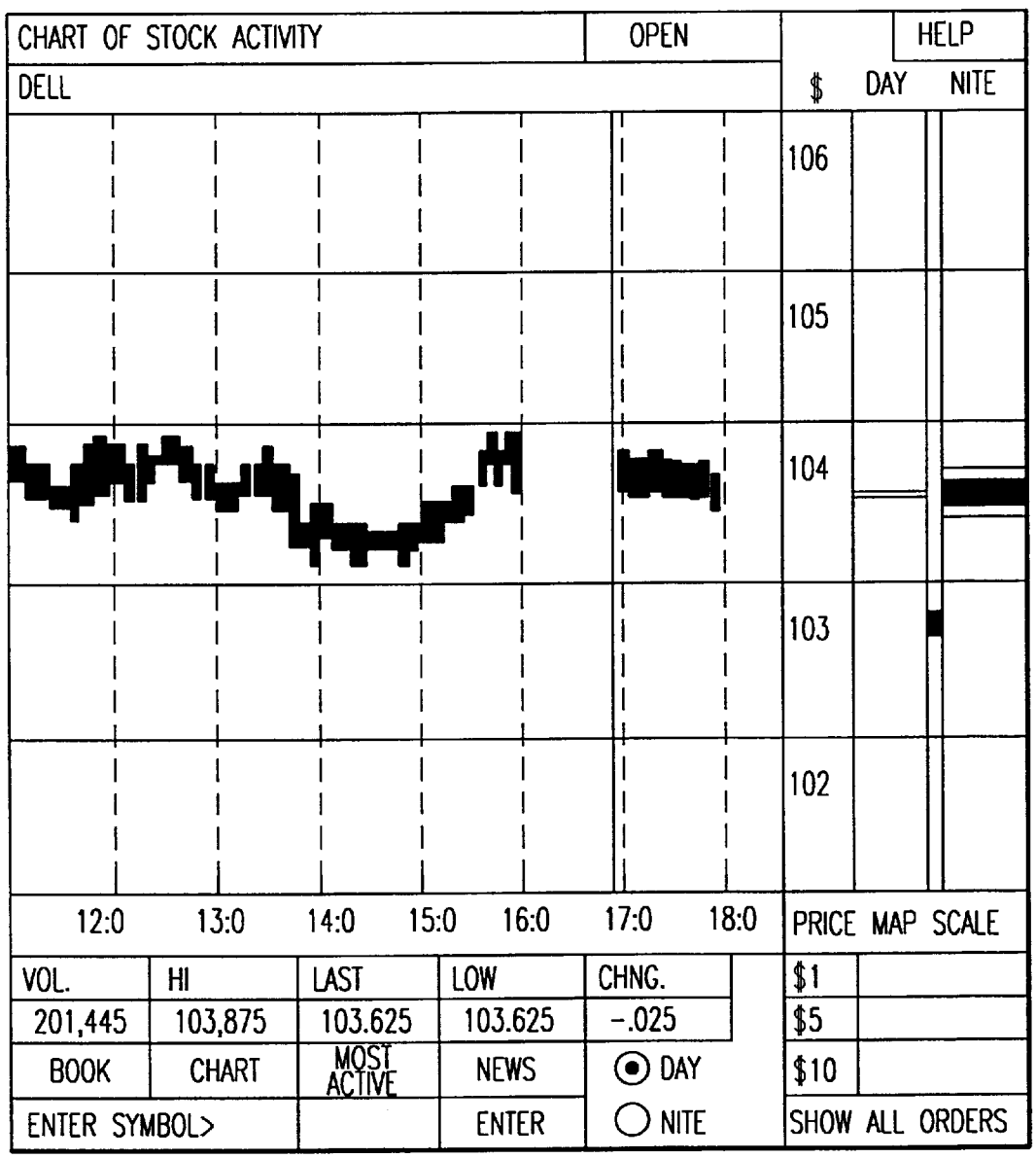
FIG. 58 shows an applet version of the display of a real-time chart of the stock activity shown in FIG. 15.

FIG. 58 shows an applet version of the real-time chart of stock activity display shown in FIG.15.

FIG. 59 shows an applet version of the most active stocks display shown in FIG. 57A.

Figure 60:
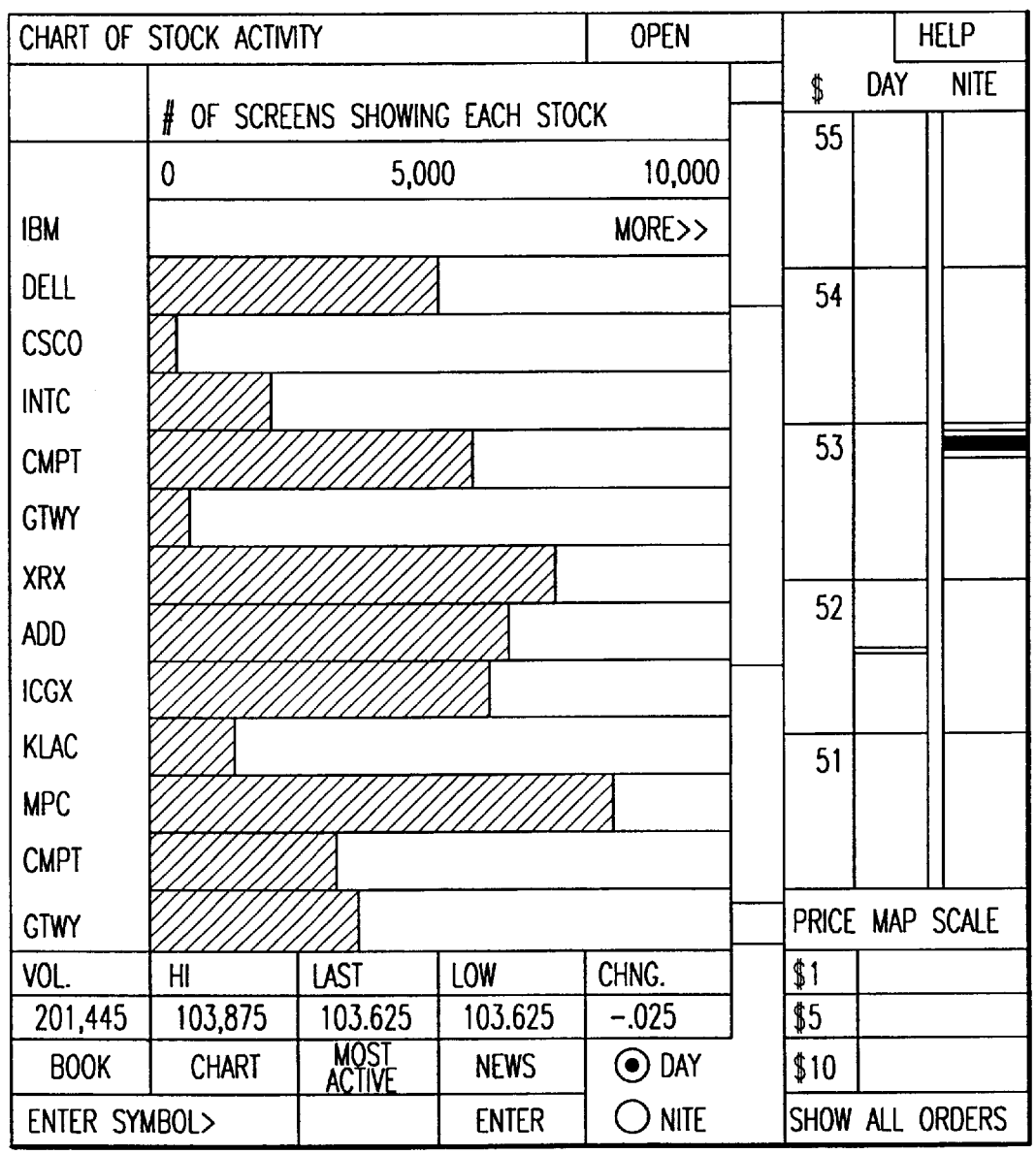
FIG. 60 shows an applet version of the most viewed stocks display shown in FIG. 57B.

FIG. 60 shows an applet version of the most viewed stocks display shown in FIG. 57B.

FIG. 61 shows an applet version of the order book display shown in FIG. 6.

FIG. 62 shows an applet version of the news display shown in FIG. 10.

In a further alternate embodiment of the disclosed system, either the entire master trade screen display (see FIG. 5), or individual displays (e.g., the order book display, shown in FIG. 6, or the displays shown in FIGS. 58–62), are presented in static versions on the Internet. These static versions of the primary market displays are presented in the form of "graphic snapshots" in a standard format such as GIF. These snapshots are transmitted and displayed in standard HTML pages without the need to call Java applets or to utilize other secondary implementation strategies. This allows the displays to be widely distributed over the Internet without requiring users to have the latest updated browsers. It further allows for very wide distribution of the market indications to a broad audience such as would be available at a portal or other high-traffic website.

Other embodiments of the disclosed system will be clear to those skilled in the art.

The present invention is not to be limited in scope by the specific embodiments described herein. Indeed, modifications of the invention in addition to those described herein will become apparent to those skilled in the art from the foregoing description and accompanying figures. Doubtless, numerous other embodiments can be conceived that would not depart from the teaching of the present invention, which scope is defined by the following claims.

What is claimed is:

1. A computer system supporting user-to-user trading of securities comprising:

software for receiving over a network an offer to sell a fixed amount of a certain security from a first user computer;

software for revising a first list of offers to sell said certain security stored in a first database, wherein said first list of offers to sell comprises current offers to sell fixed amounts of said certain securities received from user computers, and wherein said revising comprises adding said offer to sell received from said first user computer to said first list stored in said first database;

software for synchronizing a first list of offers to sell stored in said first database with a second list of offers to sell stored in a second database in response to revising of said first list of offers to sell, wherein said synchronizing comprises revising said second list of offers to sell to reflect revisions made to said first list of offers to sell;

software for retrieving from said second list of offers to sell stored in said second database said offer to sell from said first user computer and communicating over the network said offer to sell from said first user to other user computers of users participating in the user-to-user trading and currently subscribed to receive updates of offers to sell the certain securities;

software for electronically receiving over the network an acceptance of said offer to sell from said first user, said acceptance provided by a second user computer;

software for revising said second list of offers to sell stored on said second database by removing said offer to sell from said first user from said second list of offers to sell stored in said second database; and software for synchronizing said second list of offers to sell with said first list of offers to sell in response to revising of said second list of offers to sell, wherein said synchronizing comprises revising said first list of offers to sell to reflect revisions made to said second list of offers to sell.

2. The system of claim 1 further comprising:

software for receiving over the network from a third user computer an offer to buy a fixed amount of said security and for adding said order to a first list of offers to buy stored in said first database or to a second list of offers to buy stored in said second database;

software for synchronizing said second list of offers to buy into said first list of offers to buy in response to revising of said second list of offers to buy, wherein said synchronizing comprises revising said first list of offers to buy to reflect revisions made to said second list of offers to buy; and software for synchronizing said first list of offers to buy stored in said first database with said second list of offers to buy stored in said second database in response to revising of said first list of offers to buy, wherein said synchronizing comprises revising said second list of offers to buy to reflect revisions made to said first list of offers to buy.

3. The system of claim 2 further comprising software for updating data transmitted to user computers of users participating in the user-to-user trading and currently subscribed to receive updates of offers to sell or of offers to buy the certain securities to reflect revisions to said first list of offers to buy stored in said first database or to said second list of offers to buy stored in said second database.

4. The system of claim 3 further comprising software electronically enabling a fourth user computer to accept said offer to buy received from said third user computer.

5. The system of claim 4 further comprising software for revising said first list of offers to buy stored in said first database or second list of offers to buy stored in said second database to reflect that said fourth user computer has accepted said third user's offer to buy.

6. The system of claim 5 wherein said offer to buy is received from a broker/dealer, after transmission thereto by said third user computer.

7. The system of claim 6 wherein said offer to sell is received from a broker/dealer, after transmission thereto by said first user computer.

* * * * *